(12) United States Patent
Park et al.

(10) Patent No.: US 12,395,858 B2
(45) Date of Patent: Aug. 19, 2025

(54) METHOD AND APPARATUS FOR CELL OPERATION IN COMMUNICATION SYSTEM

(71) Applicant: ELECTRONICS AND TELECOMMUNICATIONS RESEARCH INSTITUTE, Daejeon (KR)

(72) Inventors: Soon Gi Park, Daejeon (KR); Young-Jo Ko, Daejeon (KR); Il Gyu Kim, Daejeon (KR); Jun Sik Kim, Daejeon (KR); Sung Cheol Chang, Daejeon (KR); Sun Mi Jun, Daejeon (KR); Yong Seouk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 523 days.

(21) Appl. No.: 17/961,767

(22) Filed: Oct. 7, 2022

(65) Prior Publication Data

US 2023/0189013 A1 Jun. 15, 2023

(30) Foreign Application Priority Data

Oct. 7, 2021 (KR) .................. 10-2021-0133525
Oct. 7, 2022 (KR) .................. 10-2022-0128937

(51) Int. Cl.
 *H04W 16/24* (2009.01)
 *H04W 24/10* (2009.01)
(52) U.S. Cl.
 CPC ........... *H04W 16/24* (2013.01); *H04W 24/10* (2013.01)

(58) Field of Classification Search
 CPC ..... H04W 16/24; H04W 24/10; H04W 92/12; H04W 92/20; H04W 76/15; H04W 28/0861; H04L 5/001
 See application file for complete search history.

(56) References Cited

U.S. PATENT DOCUMENTS

| 10,237,882 B2 | 3/2019 | Lee et al. |
| 10,567,033 B2 | 2/2020 | Kang et al. |
| (Continued) | | |

FOREIGN PATENT DOCUMENTS

| KR | 10-2019-0034024 A | 4/2019 |
| WO | 2016/095078 A1 | 6/2016 |

*Primary Examiner* — Ashley Shivers
(74) *Attorney, Agent, or Firm* — LRK PATENT LAW FIRM

(57) ABSTRACT

An operation method of a first cell in a communication system may include: receiving, from a first communication node that is an upper node of the first cell, a first signal including second cell configuration information of a second cell connected with the first communication node and a second communication node that is a lower node of the first cell; identifying, based on the first signal, that the first cell and the second cell are jointly operated by the first communication node as coordinative PCells; transmitting, to the second communication node, a second signal including information on joint operations of the coordinative PCells by the first communication node; and performing communication with the first communication node and the second communication node based on the joint operations of the coordinative PCells.

20 Claims, 80 Drawing Sheets

(56) References Cited

U.S. PATENT DOCUMENTS

| | | | |
|---|---|---|---|
| 2015/0172014 A1* | 6/2015 | Zhao | H04L 5/0035 370/329 |
| 2015/0358913 A1* | 12/2015 | Xu | H04W 52/40 455/522 |
| 2017/0230086 A1* | 8/2017 | Chen | H04L 1/1845 |
| 2020/0014453 A1 | 1/2020 | Takeda et al. | |
| 2020/0252914 A1 | 8/2020 | Yang et al. | |
| 2020/0337110 A1 | 10/2020 | Kim | |
| 2020/0389906 A1 | 12/2020 | Kim et al. | |
| 2021/0329608 A1 | 10/2021 | Bang et al. | |

\* cited by examiner first CC operation scheme second CC operation scheme third CC operation scheme fourth CC operation scheme fifth CC operation scheme sixth CC operation scheme seventh CC operation scheme eighth CC operation scheme

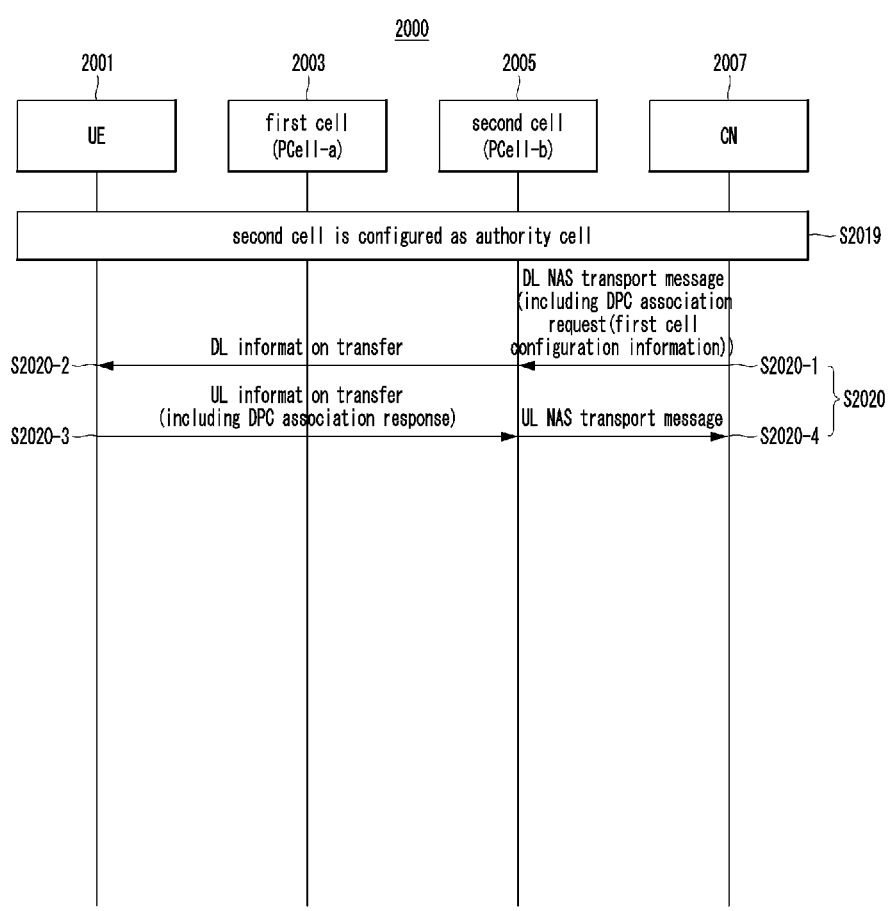

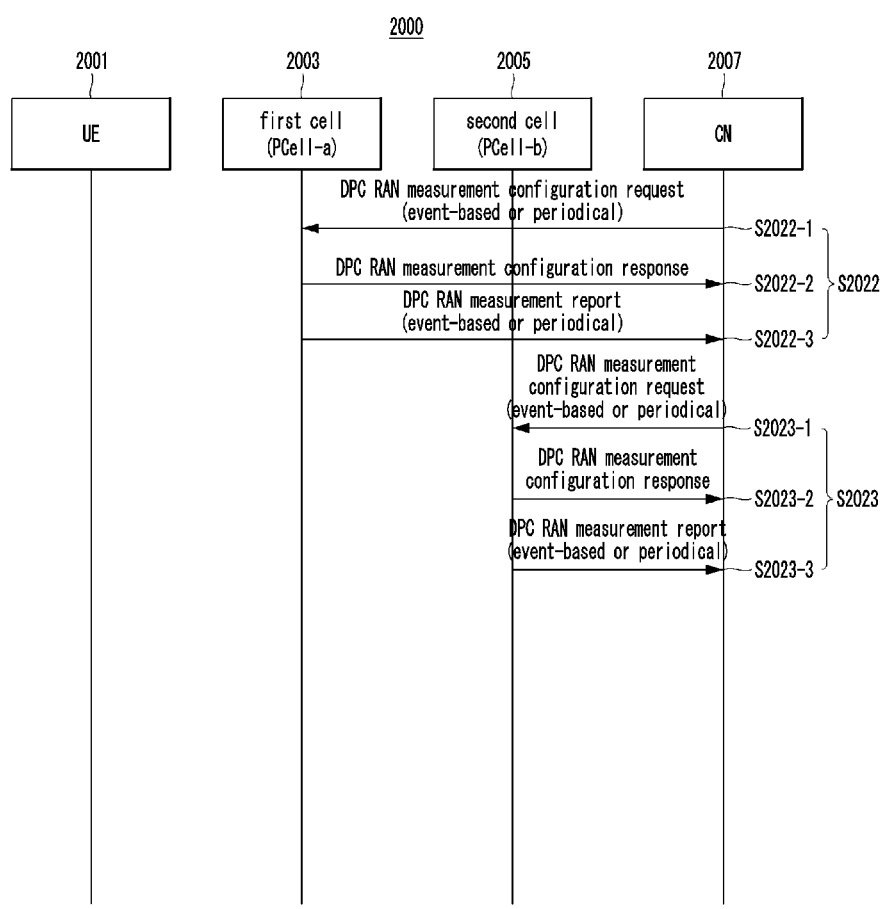

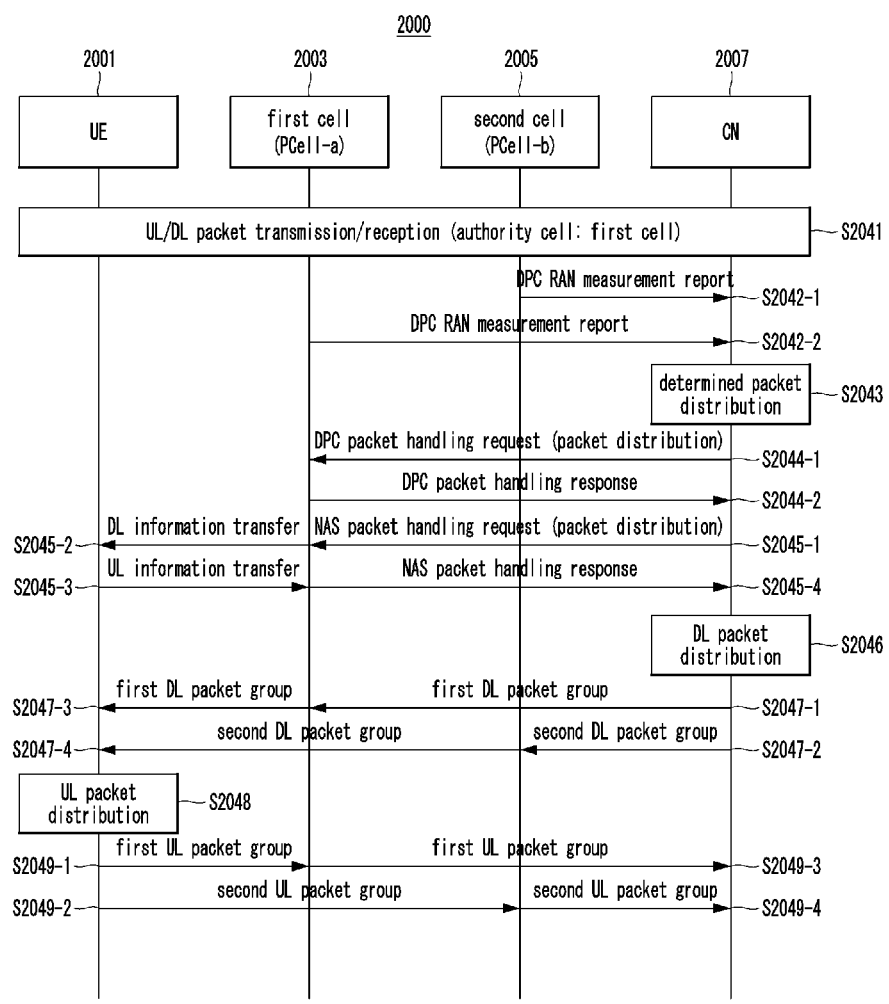

METHOD AND APPARATUS FOR CELL OPERATION IN COMMUNICATION SYSTEM

CROSS-REFERENCE TO RELATED APPLICATIONS

This application claims priority to Korean Patent Applications No. 10-2021-0133525, filed on Oct. 7, 2021, and No. 10-2022-0128937, filed on Oct. 7, 2022, with the Korean Intellectual Property Office (KIPO), the entire contents of which are hereby incorporated by reference.

BACKGROUND

1. Technical Field

The present disclosure relates to a cell operation technique in a communication system, and more particularly, to a cell operation technique for improving efficiency and reliability of control plane operations in a primary cell (PCell).

2. Description of Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

In an exemplary embodiment of a communication system, a radio connection for a user equipment (UE) connected to one primary cell (PCell) may be extended based on carrier aggregation (CA), dual connectivity (DC), and/or the like. Accordingly, a service for one UE can be performed more efficiently through a plurality of component carriers (CCs), and service stability and communication quality can be improved. However, when the PCell to which the UE is connected is changed to another PCell due to a problem such as unstable connection between the UE and the PCell, all connections previously configured based on CA and/or DC may be disconnected. That is, even when the radio connection to the UE is extended based on CA, DC, etc. after the UE connects to one PCell (i.e., single PCell), if the connection between the UE and the single PCell is disconnected, all data transmissions may be interrupted. Therefore, a technique for preventing a data transmission rate from deteriorating and a data delay from occurring may be required.

Matters described as the prior arts are prepared to help understanding of the background of the present disclosure, and may include matters that are not already known to those of ordinary skill in the technology domain to which exemplary embodiments of the present disclosure belong.

SUMMARY

Exemplary embodiments of the present disclosure provide a method and an apparatus for cell operations, which support joint operations of a plurality of PCells configured for a terminal (e.g., UE), and a plurality of control plane (CP) interfaces configured between a core network (CN) and a radio access network (RAN).

According to a first exemplary embodiment of the present disclosure, an operation method of a first cell in a communication system may comprise: receiving, from a first communication node that is an upper node of the first cell, a first signal including second cell configuration information of a second cell connected with the first communication node and a second communication node that is a lower node of the first cell; identifying, based on the first signal, that the first cell and the second cell are jointly operated by the first communication node as coordinative primary cells (PCells); transmitting, to the second communication node, a second signal including information on joint operations of the coordinative PCells by the first communication node; and performing communication with the first communication node and the second communication node based on the joint operations of the coordinative PCells, wherein when the joint operations of the coordinative PCells are performed, a first control plane (CP) interface is configured between the first communication node and the first cell, and a second CP interface is configured between the first communication node and the second cell.

The performing of the communication may comprise: receiving, from the first communication node, a third signal requesting a report of first measurement information for the first cell; and reporting the first measurement information to the first communication node, wherein the first measurement information is used by the first communication node to determine at least one of packet switching, packet distribution, or packet duplication based on the joint operations of the coordinative PCells.

The performing of the communication may comprise: receiving, from the first communication node, a fourth signal including information on a packet switching procedure based on the joint operations of the coordinative PCells; performing a forwarding operation of transmitting remaining packets of the first cell to the first communication node based on the packet switching procedure; and when the forwarding operation ends, transmitting, to the first communication node, a fifth signal indicating that the forwarding operation ends, wherein after transmitting the fifth signal to the first communication node, a first downlink (DL) packet for the first cell and a first uplink (UL) packet for the first cell are transmitted and received between the first communication node and the second communication node through the second cell.

The performing of the communication may comprise: receiving, from the first communication node, a sixth signal including information on a first packet distribution procedure based on the joint operations of the coordinative PCells; receiving, from the first communication node, a first DL packet group among DL packets for the first cell based on the first packet distribution procedure; transmitting the received first DL packet group to the second communication node; receiving, from the second communication node, a first UL packet group among UL packets for the first cell; and transmitting the received first UL packet group to the first communication node, wherein a second DL packet group excluding the first DL packet group among the DL packets for the first cell and a second UL packet group excluding the first UL packet group among the UL packets for the first cell are transmitted and received between the first communication node and the second communication node through the second cell.

The performing of the communication may comprise: receiving, from the first communication node, a seventh signal including information on a second packet distribution procedure based on the joint operations of the coordinative PCells; monitoring whether a first forwarding condition for the second packet distribution procedure is satisfied; and when the first forwarding condition is satisfied, performing a forwarding operation of transmitting remaining packets of the first cell to the first communication node, wherein information of the first forwarding condition is included in the information on the second packet distribution procedure, and includes at least one reference value related to packet accumulation.

The performing of the communication may comprise: receiving, from the first communication node, an eighth signal including information on a packet duplication procedure based on the joint operations of the coordinative PCells; receiving, from the first communication node, a second DL packet for the first cell based on the packet duplication procedure; transmitting the received second DL packet to the second communication node; receiving, from the second communication node, a second UL packet for the first cell; and transmitting the received second UL packet to the first communication node, wherein the second DL packet and the second UL packet are transmitted and received between the first communication node and the second communication node also through the second cell as well as through the first cell.

The performing of the communication may comprise: receiving a ninth signal indicating that the second cell is released from a PCell; based on the ninth signal, releasing the joint operations of the coordinative PCells; and performing communication with the first communication node and the second communication node as a single PCell.

The transmitting of the second signal may comprise: receiving, from the first communication node, a tenth signal to be transmitted to the second communication node; and transmitting the tenth signal to the first communication node, wherein the tenth signal includes at least part of the second cell configuration information, and based on the tenth signal, the second communication node identifies that the first cell and the second cell are jointly operated by the first communication node as the coordinative PCells.

According to a second exemplary embodiment of the present disclosure, an operation method of a first cell in a communication system may comprise: receiving, from a first communication node that is an upper node of the first cell, a first signal indicating that a second cell connected with the first communication node and a second communication node that is a lower node of the first cell operates as one of coordinative primary cells (PCells) together with the first cell; transmitting, to the first communication node and based on the received first signal, a second signal requesting to configure the first cell as an authority cell having authority for joint operations of the coordinative PCells; transmitting, to the second communication node, a third signal including information on the joint operations of the coordinative PCells by the first cell; and performing communication with the first communication node and the second communication node based on the joint operations of the coordinative PCells by the first cell, wherein when the joint operations of the coordinative PCells are performed, a first control plane (CP) interface is configured between the first communication node and the first cell, and a second CP interface is configured between the first communication node and the second cell.

The performing of the communication may comprise: transmitting, to the first communication node, a fourth signal including information on a packet switching procedure based on the joint operations of the coordinative PCells; performing a forwarding operation of transmitting remaining packets of the first cell to the first communication node based on the packet switching procedure; and when the forwarding operation ends, transmitting, to the first communication node, a fifth signal indicating that the forwarding operation ends, wherein after transmitting the fifth signal to the first communication node, a first downlink (DL) packet for the first cell and a first uplink (UL) packet for the first cell are transmitted and received between the first communication node and the second communication node through the second cell.

The performing of the communication may comprise: transmitting, to the first communication node, a sixth signal including information on a first packet distribution procedure based on the joint operation for the coordinative PCell; receiving, from the first communication node, a first DL packet group among DL packets for the first cell based on the first packet distribution procedure; transmitting the received first DL packet group to the second communication node; receiving, from the second communication node, a first UL packet group among UL packets for the first cell; and transmitting the received first UL packet group to the first communication node, wherein a second DL packet group excluding the first DL packet group among the DL packets for the first cell and a second UL packet group excluding the first UL packet group among the UL packets for the first cell are transmitted and received between the first communication node and the second communication node through the second cell.

The performing of the communication may comprise: transmitting, to the first communication node, a seventh signal including information on a second packet distribution procedure based on the joint operations of the coordinative PCells; monitoring whether a first forwarding condition for the second packet distribution procedure is satisfied; and when the first forwarding condition is satisfied, performing a forwarding operation of transmitting remaining packets of the first cell to the first communication node, wherein information of the first forwarding condition is included in the information on the second packet distribution procedure, and includes at least one reference value related to packet accumulation.

The performing of the communication may comprise: transmitting, to the first communication node, an eighth signal including information on a packet duplication procedure based on the joint operations of the coordinative PCells; receiving, from the first communication node, a second DL packet for the first cell based on the packet duplication procedure; transmitting the received second DL packet to the second communication node; receiving, from the second communication node, a second UL packet for the first cell; and transmitting the received second UL packet to the first communication node, wherein the second DL packet and the second UL packet are transmitted and received between the first communication node and the second communication node also through the second cell as well as through the first cell.

The performing of the communication may comprise: transmitting, to the first communication node, a ninth signal requesting to change the authority cell from the first cell to the second cell; and performing communication with the first communication node and the second communication node based on the joint operations of the coordinative PCells by the second cell.

According to a third exemplary embodiment of the present disclosure, an operation method of a first cell in a communication system may comprise: performing a first signaling procedure for transitioning a second cell, which is a primary secondary cell (PSCell) connected with a first communication node and a second communication node, to a primary cell (PCell), the first communication node being an upper node of the first cell and the second communication node being a lower node of the first cell; identifying, based on a result of the first signaling procedure, that the first cell and the second cell are jointly operated as coordinative PCells; transmitting, to the second communication node, a first signal including information on joint operations of the coordinative PCells; and performing communication with the first communication node and the second communication node based on the joint operations of the coordinative PCells, wherein when the joint operations of the coordinative PCells are performed, a first control plane (CP) interface is configured between the first communication node and the first cell, and a second CP interface is configured between the first communication node and the second cell.

The performing of the first signaling procedure may comprise: transmitting, to the second cell, a second signal including at least part of first cell configuration information for the first cell; receiving, from the second cell, a first response including at least part of second cell configuration information for the second cell; transmitting, to the first communication node, a third signal including at least part of information included in the received first response; and receiving, from the first communication node, a second response to the third signal.

When the joint operations of the coordinative PCells are performed, a first user plane (UP) interface and a second UP interface for a first path and a second path based on the first cell, and a third UP interface for a third path based on the second cell may be configured between the first communication node and the first cell; a fourth UP interface and a fifth UP interface for a fourth path and a fifth path based on the second cell, and a sixth UP interface for a sixth path based on the first cell may be configured between the first communication node and the second cell; and a seventh UP interface for the second path and an eighth UP interface for the fifth path may be configured between the first communication node and the second cell.

The performing of the communication may comprise: transmitting, to the first communication node, a fourth signal including information on a packet switching procedure based on the joint operations of the coordinative PCells; performing a forwarding operation of transmitting remaining packets of the first cell to the first communication node based on the packet switching procedure; and when the forwarding operation ends, transmitting, to the first communication node, a fifth signal indicating that the forwarding operation ends, wherein after transmitting the fifth signal to the first communication node, a first downlink (DL) packet for the first cell and a first uplink (UL) packet for the first cell are transmitted and received between the first communication node and the second communication node through the second cell.

The performing of the communication may comprise: transmitting, to the first communication node, a sixth signal including information on a first packet distribution procedure based on the joint operations of the coordinative PCells; receiving, from the first communication node, a first DL packet group among DL packets for the first cell based on the first packet distribution procedure; transmitting the received first DL packet group to the second communication node; receiving, from the second communication node, a first UL packet group among UL packets for the first cell; and transmitting the received first UL packet group to the first communication node, wherein a second DL packet group excluding the first DL packet group among the DL packets for the first cell and a second UL packet group excluding the first UL packet group among the UL packets for the first cell are transmitted and received between the first communication node and the second communication node through the second cell.

The performing of the communication may comprise: transmitting, to the first communication node, an eighth signal including information on a packet duplication procedure based on the joint operations of the coordinative PCells; receiving, from the first communication node, a second DL packet for the first cell based on the packet duplication procedure; transmitting the received second DL packet to the second communication node; receiving, from the second communication node, a second UL packet for the first cell; and transmitting the received second UL packet to the first communication node, wherein the second DL packet and the second UL packet are transmitted and received between the first communication node and the second communication node also through the second cell as well as through the first cell.

According to the exemplary embodiments of the cell operation method and apparatus, in the communication system, a plurality of PCells may be configured simultaneously for one UE, and a plurality of CP interfaces may be configured between a core network (CN) and a radio access network (RAN). The communication system may support joint operations of the plurality of configured PCells and the plurality of CP interfaces. Such the joint operations may be implemented in a CN-based, RAN-based, or dual connectivity (DC)-based manner. The plurality of PCells configured for one UE can efficiently support switching, distribution, and duplication of packets between the UE and the network. Accordingly, the reliability of the connection between the UE and the network can be improved, the reliability of data can be improved, and problems such as a decrease in data transmission rate and data delay can be minimized.

BRIEF DESCRIPTION OF DRAWINGS

FIGS. 20A to 20L are sequence charts illustrating exemplary embodiments of a cell operation method according to the first joint operation scheme.

DETAILED DESCRIPTION OF THE EMBODIMENTS

Figure 1:
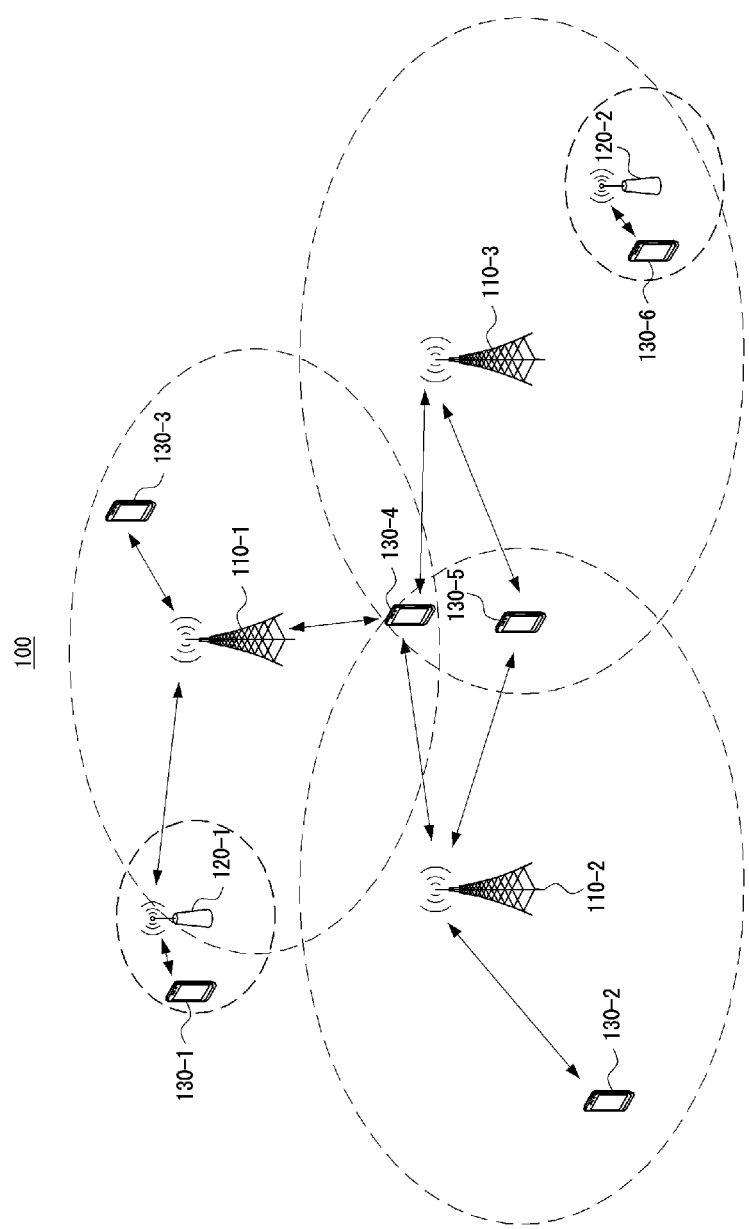
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, B5G mobile communication network (6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
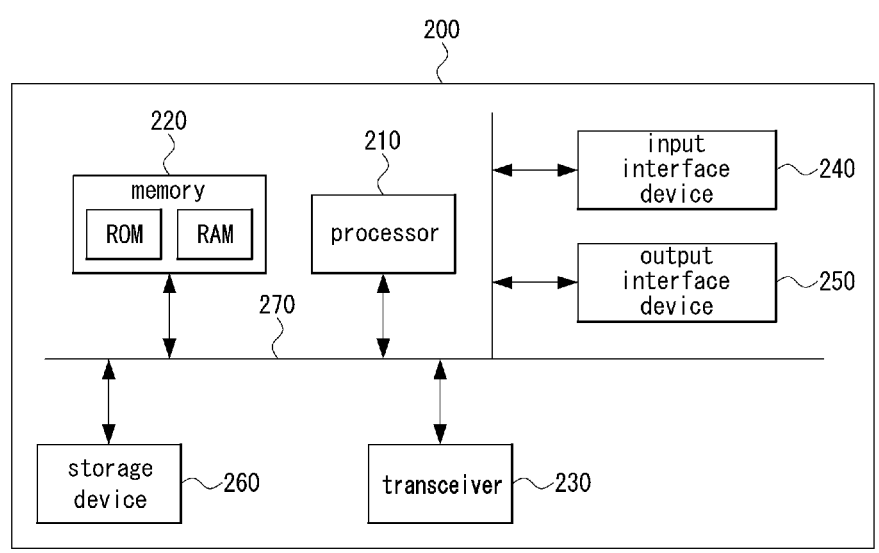
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, cell operation methods in a communication system will be described. Even when a method (e.g., transmission or reception of signals) performed at a first communication node among communication nodes is described, the corresponding second communication node may perform a method (e.g., reception or transmission of the signals) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

[First Exemplary Embodiment of Cell Operation Method]

In a first exemplary embodiment of a cell operation method, a communication system may support UE services based on a single primary cell (PCell). For example, for a service for one user equipment (UE) from one core network (CN), one PCell may be configured. Hereinafter, in describing the first exemplary embodiment of the cell operation method, description overlapping with those described with reference to FIGS. 1 and 2 may be omitted.

Figure 3:
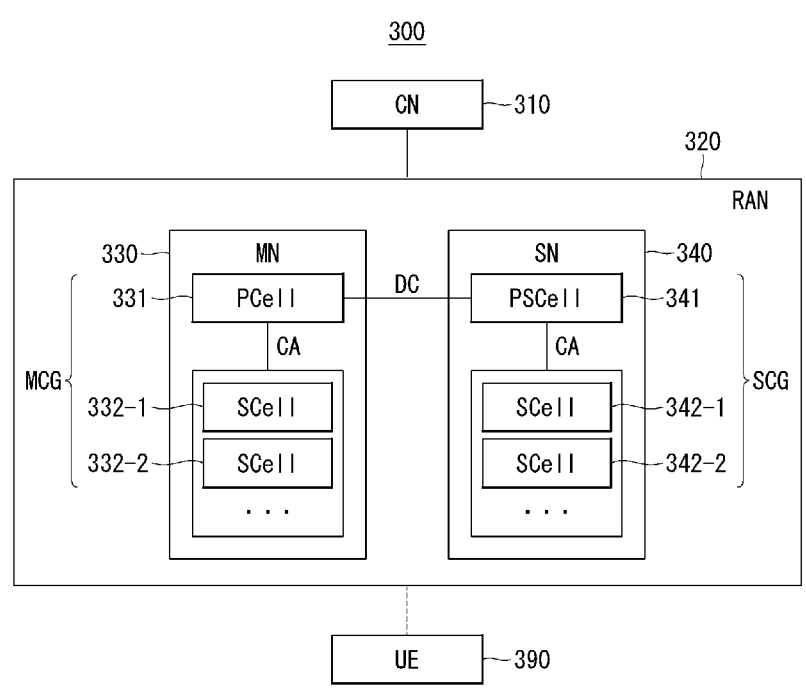
FIG. 3 is a conceptual diagram for describing a first exemplary embodiment of a cell operation method in a communication system.

FIG. 3 is a conceptual diagram for describing a first exemplary embodiment of a cell operation method in a communication system.

Referring to FIG. 3, a communication system 300 may include a CN 310 and a radio access network (RAN) 320. In the communication system 300, the CN 310 may provide services to one or more UEs 390 through one or more communication nodes (e.g., base station), cells, etc. constituting the RAN 320.

The communication system 300 may support the first exemplary embodiment of the cell operation method. In the first exemplary embodiment of the cell operation method, one primary cell (PCell) 331 (i.e., single PCell) may be configured for a service to one UE 390. For example, when the UE 390 performs initial access, a cell accessed by the UE 390 may be determined as the PCell 331. The UE 390 may be connected to the CN 310 through the PCell 331. Here, a communication node (e.g., base station) forming the PCell 331 may be referred to as a 'master node (MN)' 330.

An exemplary embodiment of the communication system 300 may support carrier aggregation (CA), dual connectivity (DC), and/or the like. Through this, the service for one UE 390 can be performed more efficiently through a plurality of component carriers (CCs), and service stability and communication quality can be improved.

Specifically, a radio connection to the UE 390 may be extended based on CA, DC, and/or the like. Based on CA, the UE 390 may additionally connect to another cell of the same node (i.e., the MN 330) as that of the PCell 331 through the PCell 331. One or more cells additionally connected based on CA in this manner may be referred to as 'secondary cells (SCells)' 332-1, 332-2, . . . , and the like. A set of the PCell 331 and the SCells 332-1, 332-2, . . . , and the like connected to the UE 390, which are formed by the MN 330, may be referred to as a 'master cell group (MCG)'.

Meanwhile, based on DC, the UE 390 may be additionally connected to a cell of a node different from that of the PCell 331 through the PCell 331. The cell additionally connected based on DC in this manner may be referred to as a primary secondary cell (PSCell) 341. Here, a communication node (e.g., base station) forming the PSCell 341 may be referred to as a 'secondary node (MN)' 340. Based on CA, the UE 390 may be additionally connected to one or more SCells 342-1, 342-2, . . . , and the like of the same node (i.e., SN 340) as that of the PSCell 341 through the PSCell 341. A set of the PSCell 341 and the SCells 342-1, 342-2, . . . , and the like connected to the UE 390, which are formed by the SN 340, may be referred to as a 'secondary cell group (SCG)'. If the communication system 300 supports multi-connectivity (MC), the UE 390 may be connected to a plurality of PSCells through the PCell 331.

In an exemplary embodiment of the communication system, one or more cells constituting the MCG and SCG within the RAN 320 may be the PCell 331 or may be connected to the UE 390 through the PCell 331. In other words, the UE 390 may be connected to the CN 310 through the single PCell 331 or other cells connected through the single PCell 331.

When a problem such as unstable connection between the UE 390 and the PCell 331 occurs, the PCell 331 to which the UE 390 is connected may be changed to another PCell through a procedure such as a handover (HO), radio link failure (RLF) recovery, beam pairing, beam failure recovery procedure, and/or the like. In this case, the UE 390 may lose its radio connection with the previously connected PCell 331, and radio connection configurations with other cells 332-1, 332-2, 341, 342-1, 342-2, . . . , and the like connected to the UE 390 based on CA or DC may be released or disconnected.

In the above-described situation such as when the radio connection with the PCell 331 to which the UE 390 is connected is disconnected or the PCell is changed, all data transmissions may be temporarily stopped. Therefore, a technique for preventing a data transmission rate from deteriorating and a data delay from occurring may be required.

Figure 4A:
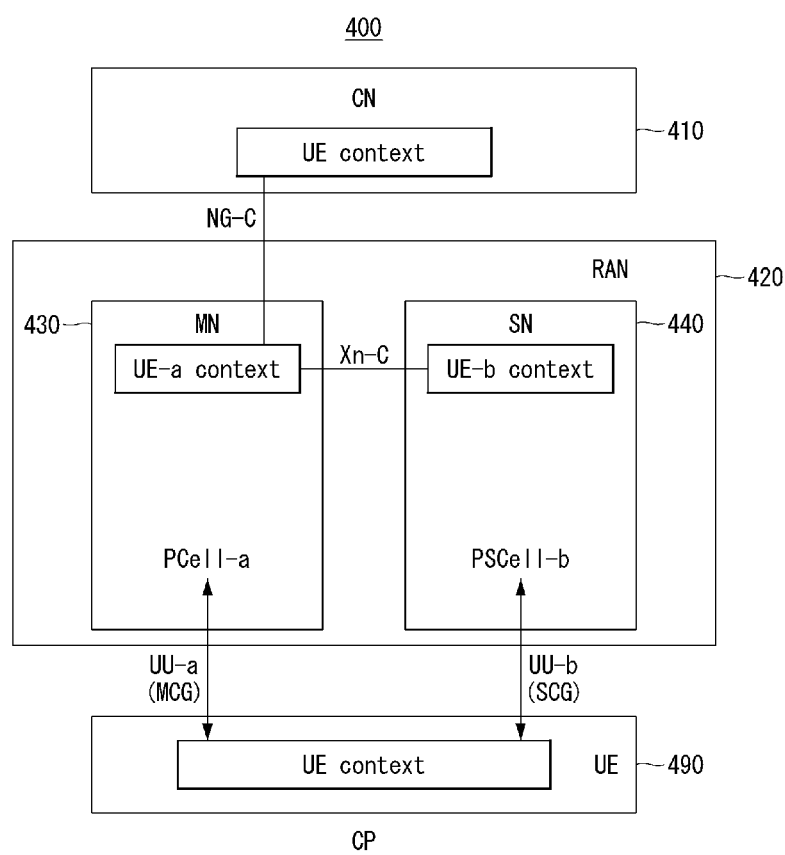
FIGS. 4A and 4B are conceptual diagrams for describing a control plane (CP) structure and a user plane (UP) structure according to the first exemplary embodiment of the cell operation method.
Figure 4B:
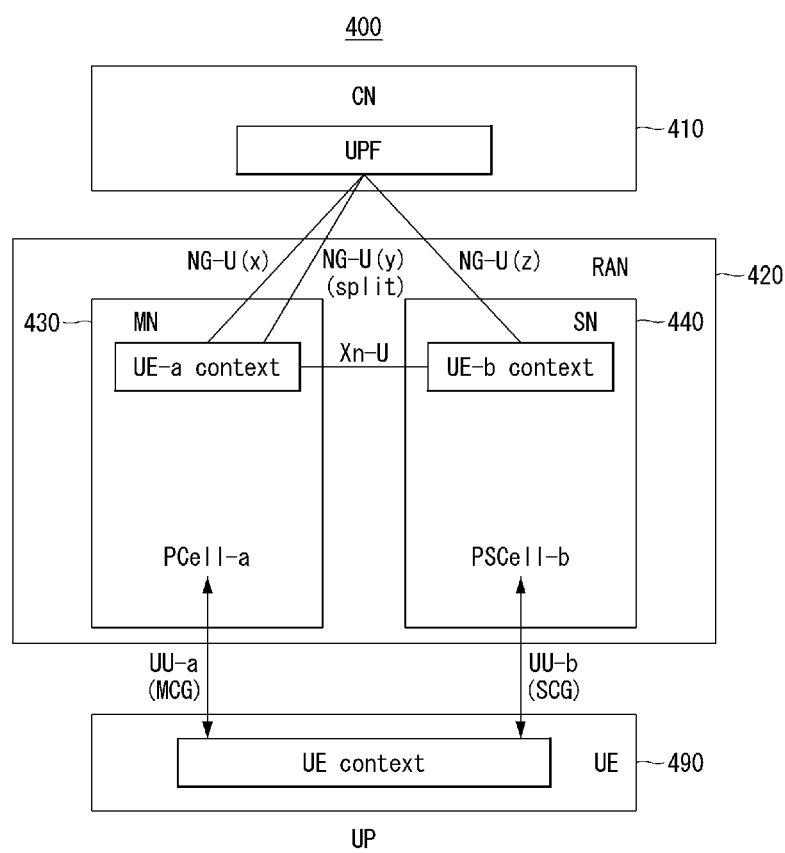

FIGS. 4A and 4B are conceptual diagrams for describing a control plane (CP) structure and a user plane (UP) structure according to the first exemplary embodiment of the cell operation method.

Referring to FIGS. 4A and 4B, a communication system 400 may include a CN 410 and a RAN 420. The communication system 400, CN 410, and RAN 420 may be the same as or similar to the communication system 300, CN 310, and RAN 320 described with reference to FIG. 3. The communication system 400 may support the first exemplary embodiment of the cell operation method. In the communication system 400, one PCell (i.e., single PCell) may be configured for a service to one UE 490. The UE 490 may be connected to the CN 410 through one PCell (hereinafter referred to as 'PCell-a') determined through initial access. A radio connection to the UE 490 may be extended based on CA, DC, and/or the like. For example, one or more SCells may be configured based on CA within an MN 430 forming the PCell-a. Meanwhile, within an SN 440 other than the MN 430, a PSCell-b may be configured based on DC, and one or more SCells may be configured based on CA. The CN 410 may have one UE context for a service to the one UE 490. The UE 490 may have one UE context for the service from the CN 410. Meanwhile, when the PSCell-b is configured based on DC, a UE context for the one UE 490 may be split in the RAN 420. For example, the MN 430 forming the PCell-a may have a UE-a context, and the SN 440 forming the PSCell-b may have a UE-b context. The MN 430 may have configuration information of an MCG (including the PCell-a, one or more SCells, etc.) configured for communication with the UE 490, and the SN 440 may have configuration information of an SCG (including the PSCell-b, one or more SCells, etc.) for communication with the UE 490.

FIG. 4A shows an exemplary embodiment of a CP structure according to the first exemplary embodiment of the cell operation method. Referring to FIG. 4A, one interface may be configured between the CN 410 and the RAN 420 on the CP. For example, a 'next generation-control (NG-C)' interface, which is an interface for transmission and reception of CP packets in a backhaul link, may be configured between the CN 410 and the MN 430. Two UU (or Uu) interfaces may be configured between the RAN 420 and the UE 490. For example, a UU interface (hereinafter referred to as 'UU-a') for communication through the MCG such as the PCell-a may be configured between the MN 430 and the UE 490, and a UU interface (hereinafter referred to as 'UU-b') for communication through the SCG such as the PSCell-b may be configured between the SN 440 and the UE 490. One interface may be configured between the MN 430 and the SN 440 within the RAN 420. For example, 'Xn-C' or 'X2-C', which is an interface for transmission and reception of CP packets between communication nodes such as base stations, may be configured between the MN 430 and the SN 440. In the present disclosure, configurations related to the Xn-C interface may be replaced with configurations for the X2-C interface.

FIG. 4B shows an exemplary embodiment of a UP structure according to the first exemplary embodiment of the cell operation method. Referring to FIG. 4B, when the PSCell-b is configured based on DC, one or more interfaces may be configured between the CN 410 and the RAN 420 on the UP. For example, one or more 'NG-user (NG-U)' interfaces, which are interfaces for transmission and reception of data packets in a backhaul link, may be configured between a user plane function (UPF) of the CN 410 and the RAN 420. A UU-a interface may be configured between the MN 430 and the UE 490, and a UU-b interface may be configured between the SN 440 and the UE 490. One interface may be configured between the MN 430 and the SN 440 within the RAN 420. For example, 'Xn-U' or 'X2-U', which is an interface for transmission and reception of data packets between communication nodes such as base stations, may be configured between the MN 430 and the SN 440. In the present disclosure, configurations related to the Xn-U interface may be replaced with configurations for the X2-U interface.

At least some of the following interfaces may be configured between the UPF of the CN 410 and the RAN 420.

NG-U(x): Interface for user data packets transmitted on a first path. Here, the first path may refer to a path composed of the UPF of the CN 410, the MCG (i.e., UU-a) of the MN 430, and the UE 490.

NG-U(y): Interface for user data packets split and transmitted through the first path or a second path in the RAN 420. Here, the second path may refer to a path composed of the UPF of the CN 410, the SCG (i.e., UU-b) of the SN 440 connected to the MN 430 through the Xn-U, and the UE 490.

NG-U(z): Interface for user data packets transmitted on a third path. Here, the third path may refer to a path composed of the UPF of the CN 410, the SCG (i.e., UU-b) of the SN 440, and the UE 490.

According to the first exemplary embodiment of the cell operation method, one single control interface NG-C may be configured between the CN 410 and the RAN 420 on the CP, and at least some of the three types of interfaces such as NG-U(x), NG-U(y), and NG-U(z) may be configured between the CN 410 and the RAN on the UP.

Figure 5:
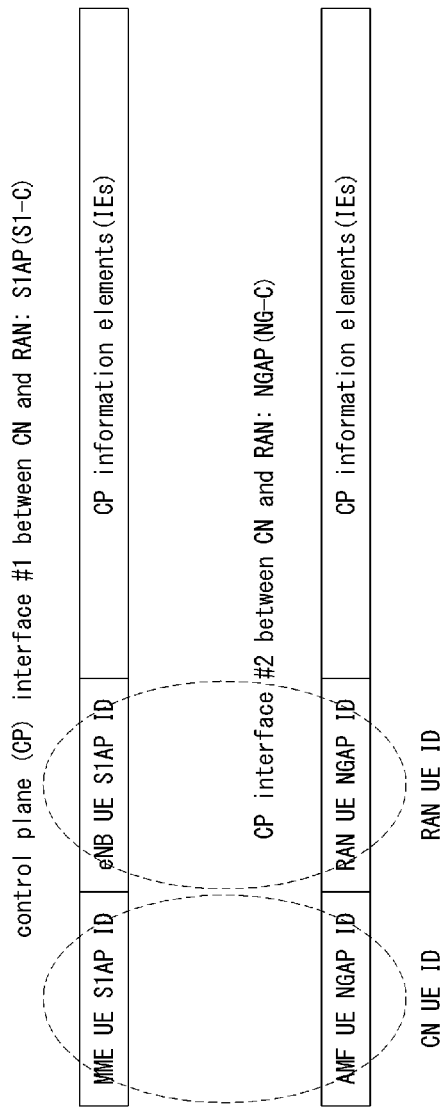
FIG. 5 is a conceptual diagram for describing an exemplary embodiment of identifiers used in a CP interface.

FIG. 5 is a conceptual diagram for describing an exemplary embodiment of identifiers used in a CP interface.

Referring to FIG. 5, a CP interface may be configured for transmission and reception of CP packets between the CN and the RAN on the CP of the communication system. A plurality of types of CP interfaces may exist according to the communication system or a communication technology supported by communication nodes of the communication system. Here, in the CP interface, different identifiers (IDs) may be transmitted and used for identification according to the type of the CP interface.

CP Interface #1: This may correspond to S1-C. In the CP interface #1, identifiers defined according to S1 application protocol (S1AP) may be used for identification. For example, identifiers such as an MME UE S1AP ID generated on the CN side and an eNB UE S1AP ID generated on the RAN side may be used.

CP Interface #2: This may correspond to NG-C. In the CP interface #2, identifiers defined according to next generation application protocol (NGAP) may be used for identification. For example, identifiers such as an AMF UE NGAP ID generated on the CN side and a RAN UE NGAP ID generated on the RAN side may be used.

Regarding the CN interface #1 and the CN interface #2, identifiers generated on the CN side may be collectively referred to as 'CN ID' or 'CN UE ID'. On the other hand, regarding the CN interface #1 and the CN interface #2, identifiers generated on the RAN side may be collectively referred to as 'RAN ID' or 'RAN UE ID'.

Figure 6:
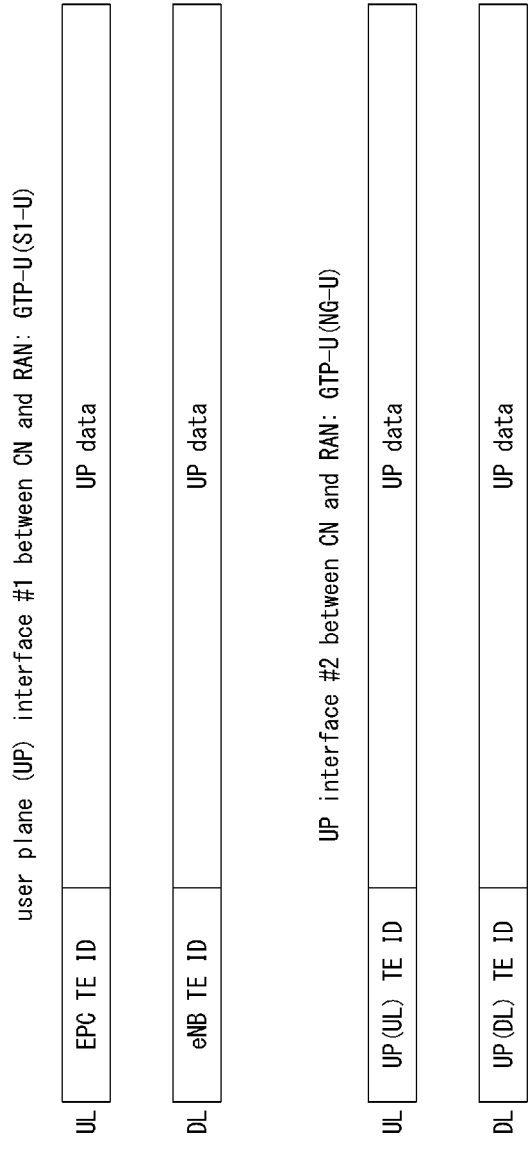
FIG. 6 is a conceptual diagram for describing an exemplary embodiment of identifiers used in a UP interface.

FIG. 6 is a conceptual diagram for describing an exemplary embodiment of identifiers used in a UP interface.

Referring to FIG. 6, a UP interface may be configured for transmission and reception of data packets between the CN and the RAN on the UP of the communication system. A plurality of types of UP interfaces may exist according to the communication system or a communication technology supported by communication nodes of the communication system. Here, in the UP interface, different IDs may be transmitted and used for identification according to the type, transmission direction, etc. of the UP interface.

UP Interface #1: This may correspond to S1-U. In the UP interface #1, identifiers defined according to general packet radio service (GPRS) tunneling protocol-user plane (GTP-U) for GPRS transmission may be used for identification. For example, when transmitting an uplink (UL) UP data packet in the UP interface #1, an identifier such as an evolved packet core (EPC) terminal element (TE) ID generated on the CN side may be used. When transmitting a downlink (DL) UP data packet in the UP interface #1, an identifier such as an eNB TE ID generated on the RAN side may be used.

UP Interface #2: This may correspond to NG-U. In the UP interface #2, identifiers defined according to GTP-U may be used for identification. For example, when transmitting a UL UP data packet in the UP interface #2, an identifier such as a UP (UL) TE ID generated on the CN side may be used. When transmitting a DL UP data packet in the UP interface #2, an identifier such as a UP (DL) TE ID generated on the RAN side may be used.

From the structure of UP interface #1, one evolved packet system (EPS) bearer may be mapped with one E-UTRAN radio access bearer (E-RAB) ID. When there is one data radio bearer (DRB) ID, UL packet, DL packet, etc., identifiers such as EPC TE ID and eNB TE ID may be mapped to a UL tunnel ID, DL tunnel ID, etc.

From the structure of UP interface #2, a radio section and a wired section (between the CN and the RAN) may exist for one protocol data unit (PDU) session ID. When there are UL packets, DL packets, etc. in an N3 tunnel, identifiers such as UP (UL) TE ID and UP (DL) TE ID may be mapped to a UL tunnel ID, DL tunnel ID, etc. A plurality of quality of service (QoS) flows may exist in one tunnel, and in this case, a service data adaptation protocol (SDAP) capable of mapping the plurality of QoS flows and a DRB may exist.

In an exemplary embodiment of the communication system, an ID for the UE may include a temporary assigned ID (e.g., Temporary Mobile Subscriber Identity (TMSI)), an immutable ID unique to the UE (e.g., International Mobile Subscriber Identity (IMSI)), and the like.

[Second Exemplary Embodiment of Cell Operation Method]

In a second exemplary embodiment of a cell operation method, the communication system may support a UE service based on a plurality of PCells. For example, for a service for one UE from one CN, one or more PCells may be configured. Meanwhile, in the second exemplary embodiment of the cell operation method, the communication system may support a UE service based on a plurality of CPs (or CP interfaces). For example, for a service from one CN to one UE, one or more CP interfaces may be configured between the CN and the RAN. The second exemplary embodiment of the cell operation method may be referred to as 'dual PCell joint operation (DPJO)', 'multiple PCell joint operation (MPJO)', 'dual control plane joint operation (DCPJO)', 'multiple control plane joint operation (MCPJO)', and the like. Hereinafter, in describing the second exemplary embodiment of the cell operation method, description overlapping with those described with reference to the first exemplary embodiment of the cell operation method and FIGS. 1 to 6 may be omitted.

Figure 7A:
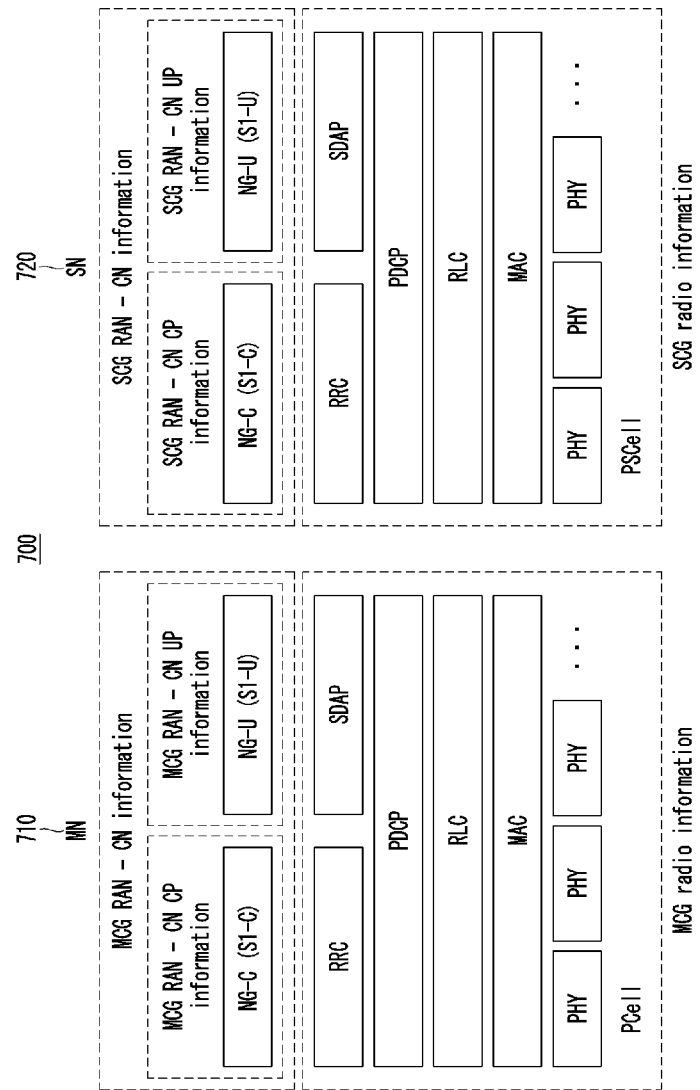
FIGS. 7A and 7B are conceptual diagrams for describing an exemplary embodiment of information groups defined for cell operations in the second exemplary embodiment of the cell operation method.
Figure 7B:
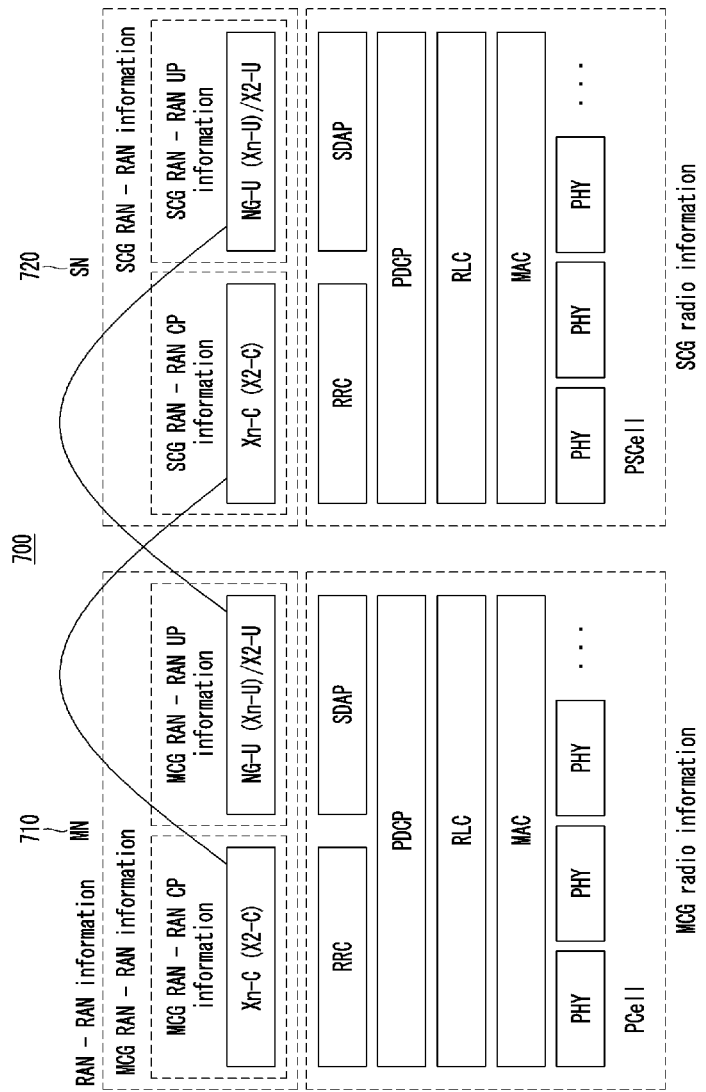

FIGS. 7A and 7B are conceptual diagrams for describing an exemplary embodiment of information groups defined for cell operations in the second exemplary embodiment of the cell operation method.

Referring to FIGS. 7A and 7B, in an exemplary embodiment of the communication system 700, a plurality of information groups may be defined for cell operations. For example, in order to operate cells formed by an MN 710 and an SN 720 constituting a RAN in the communication system 700 according to the second exemplary embodiment of the cell operation method, information groups may be defined for each communication subject, plane, and/or the like.

Referring to FIG. 7A, in an exemplary embodiment of the communication system 700, 'MCG radio information', which is an information group for a radio connection of an MCG formed by the MN 710, may be defined. For example, the MCG radio information may include information on a mutual association relationship between at least some of physical (PHY) layer information, medium access control (MAC) layer information, radio link control (RLC) layer information, packet data convergence protocol (PDCP) layer information, radio resource control (RRC) layer information, or service data adaptation protocol (SDAP) layer information related to cells (e.g., PCell, one or more SCells, etc.) of the MCG.

In an exemplary embodiment of the communication system 700, 'MCG RAN-CN (RAN to CN) information', which is an information group corresponding to a radio connection between the MN 710 forming the MCG and the CN, may be defined. For example, the MCG RAN-CN information may include 'MCG RAN-CN CP information' corresponding to a CP interface (e.g., NG-C, S1-C, etc.) between the CN and the MN 710. In addition, the MCG RAN-CN information may include 'MCG RAN-CN (RAN to CN) UP information corresponding to a UP interface (e.g., NG-U, S1-U, etc.) between the CN and the MN 710.

In an exemplary embodiment of the communication system 700, 'SCG radio information', which is an information group for a radio connection of an SCG formed by the SN 720, may be defined. For example, the SCG radio information may include information on a mutual association relationship between at least some of PHY layer information, MAC layer information, RLC layer information, PDCP layer information, RRC layer information, or SDAP layer information related to cells (e.g., PSCell, one or more SCells, etc.) of the SCG.

In an exemplary embodiment of the communication system 700, 'SCG RAN-CN (RAN to CN) information', which is an information group corresponding to a radio connection between the SN 720 forming the SCG and the CN, may be defined. For example, the SCG RAN-CN information may include 'SCG RAN-CN UP information' corresponding to a CP interface (e.g., NG-C, S1-C, etc.) between the CN and the SN 720. In addition, the SCG RAN-CN information may include 'SCG RAN-CN (RAN to CN) UP information corresponding to a UP interface (e.g., NG-U, S1-U, etc.) between the CN and SN 720.

Referring to FIG. 7B, in an exemplary embodiment of the communication system 700, 'RAN-RAN (RAN to RAN) information', which is an information group corresponding to a radio connection between communication nodes within the RAN, may be defined. The RAN-RAN information may be composed of 'MCG RAN-RAN information', 'SCG RAN-RAN information', etc. between the MN 710 and the SN 720.

In an exemplary embodiment of the communication system 700, the MCG RAN-RAN information may include 'MCG RAN-RAN CP information' corresponding to a CP interface (e.g., Xn-C, X2-C, etc.) on the MN 710 side between the MN 710 and the SN 720. In addition, the MCG RAN-RAN information may include 'MCG RAN-CN UP' information corresponding to a UP interface (e.g., NG-U, Xn-U, X2-U, etc.) on the MN 710 side between the MN 710 and the SN 720.

In an exemplary embodiment of the communication system 700, the SCG RAN-RAN information may include 'SCG RAN-RAN CP information' corresponding to a CP interface (e.g., Xn-C, X2-C, etc.) on the SN 720 side between the MN 710 and the SN 720. In addition, the SCG RAN-RAN information may include 'SCG RAN-CN UP information' corresponding to a UP interface (e.g., NG-U, Xn-U, X2-U, etc.) on the SN 720 side between the MN 710 and the SN 720.

Figure 8:
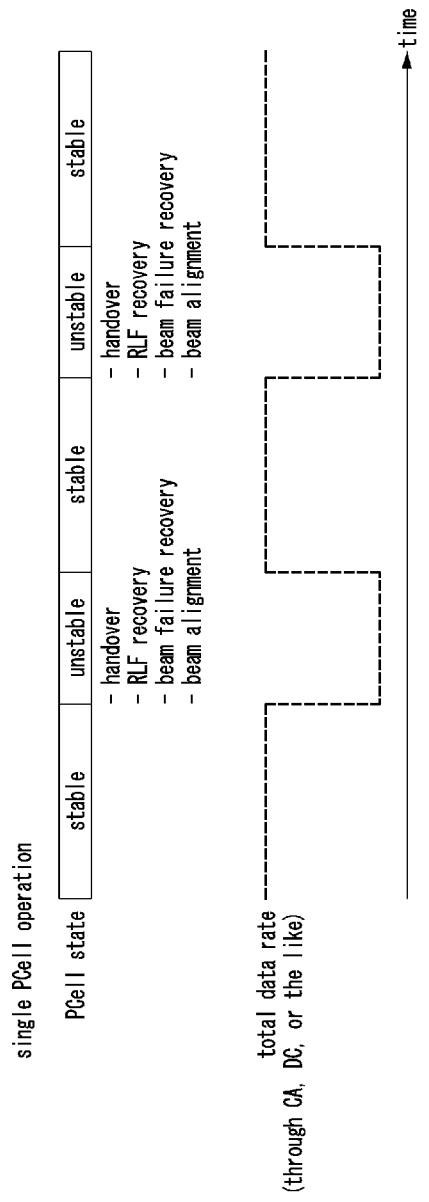
FIG. 8 is a conceptual diagram for describing a change in data transmission rate according to connection stability between the UE and the PCell in the first exemplary embodiment of the cell operation method.

FIG. 8 is a conceptual diagram for describing a change in data transmission rate according to connection stability between the UE and the PCell in the first exemplary embodiment of the cell operation method.

Referring to FIG. 8, in the first exemplary embodiment of the cell operation method, a data transmission rate (or data rate) may appear differently in a situation where a connection between the UE and one PCell is stable or unstable. In a situation where the connection between the UE and the PCell is stable, communication may be effectively performed based on one PCell, one or more SCells added based on CA, and one PSCell added based on DC. For example, data packets may be distributed to one or more cells through radio resource allocation to one or more cells belonging to the MCG, SCG, etc. configured for the UE. In this manner, the data transmission rate may be kept high.

On the other hand, in a situation where the connection between the UE and the PCell is unstable, the connection between the UE and the PCell may be disconnected, or the PCell to which the UE is connected may be changed to another PCell through procedures such as HO, RLF recovery, beam pairing, and beam failure recovery. In this case, as the radio connection with the PCell to which the UE was previously connected is temporarily disconnected, radio connection configurations with other cells (SCell, PSCell, etc.) connected to the UE based on CA or DC may also be released or disconnected. As such, whenever a situation in which the connection between the UE and the PCell is unstable occurs, the data rate may decrease.

Table 1 shows an exemplary embodiment of state classification of a single PCell according to the first exemplary embodiment of the cell operation method.

TABLE 1

| State | Single PCell |
| --- | --- |
| IDLE | RRC_IDLE |
| CONNECTED | RRC_INACTIVE |
|  | RRC_ACTIVE |

According to the first exemplary embodiment of the cell operation method, the state of the single PCell may be classified into an idle (IDLE) state (e.g., RRC_IDLE) and a CONNECTED state (e.g., RRC_INACTIVE or RRC_ACTIVE).

Figure 9:
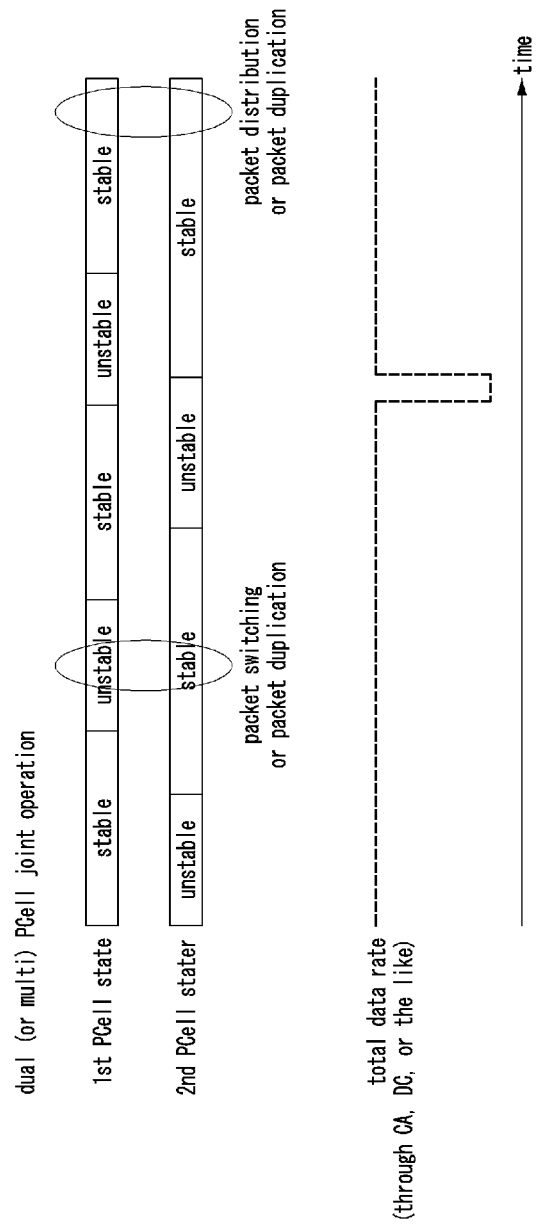
FIG. 9 is a conceptual diagram for describing a change in data rate according to connection stability between the UE and a plurality of PCells in the second exemplary embodiment of the cell operation method.

FIG. 9 is a conceptual diagram for describing a change in data rate according to connection stability between the UE and a plurality of PCells in the second exemplary embodiment of the cell operation method.

Referring to FIG. 9, in the second exemplary embodiment of the cell operation method, a plurality of PCells may be configured for one UE, and the configured PCells may be jointly operated. A radio connection for the configured PCells may be extended based on CA and/or DC. The second exemplary embodiment of the cell operation method supporting a plurality of PCells (multiple PCells) as described above may be referred to as MPJO or MCPJO. When two PCells (double PCells) are configured, the second exemplary embodiment of the cell operation method may be referred to as DPJO or DCPJO.

When two PCells are configured for one UE, the configured two PCells may be referred to as a first PCell and a second PCell. One of the first PCell and the second PCell may have a predetermined authority for joint operations according to the second exemplary embodiment of the cell operation method. As described above, the PCell having authority for joint operations may be referred to as an 'authority cell', 'authority PCell', or the like.

In a situation where both the first and second PCells are stable, one of the first and second PCells may be configured as an authority cell for joint operations. The UE may perform data communication through the first and/or second PCell. On the other hand, in a situation where only one of the first and second PCells is stable, a stable PCell among the first and second PCells may be configured as an authority cell. The UE may perform data communication mainly with the stable PCell. In the second exemplary embodiment of the cell operation method, a data rate may be temporarily decreased only when both the first and second PCells are unstable.

Based on the joint operations of the first and second PCells, packet switching may be performed. Based on packet switching, data packets, such as DL data packets to the UE and UL data packets from the UE, may be switched over the first and second PCells. That is, based on packet switching, data packets may be switched (forwarded) from one side to the other among the first PCell (or MCG, SCG, etc. associated with the first PCell) and the second PCell (or MCG, SCG, etc. associated with the second PCell).

Based on the joint operations of the first and second PCells, packet distribution may be performed. Based on packet distribution, data packets may be distributed over the first and second PCells. That is, based on packet distribution, data packets may be transmitted and received as being distributed to the first PCell (or MCG, SCG, etc. associated with the first PCell) or the second PCell (or MCG, SCG, etc. associated with the second PCell).

Meanwhile, based on the joint operations of the first and second PCells, packet duplication or packet diversity delivery may be performed. Based on packet duplication (or packet diversity deliver), data packets may be duplicated or multiplexed over the first and second PCells. That is, based on packet duplication (or packet diversity delivery), data packets may be duplicated so as to be transmitted and received through both the first PCell (or MCG, SCG, etc. associated with the first PCell) and the second PCell (or associated with the second PCell) MCG, SCG, etc.).

In the second exemplary embodiment of the cell operation method, in a situation where only one of the first and second PCells is stable, data packets of an unstable PCell may be forwarded to a stable PCell based on packet switching, or the same packets may be transmitted to both the first and second PCells based on packet duplication. On the other hand, in the second exemplary embodiment of the cell operation method, in a situation where both of the first and second PCells are stable, data packets may distributed to the first and second PCells based on packet distribution, or the same packets may be transmitted to both the first and second PCells based on packet duplication. Based on packet switching, packet distribution, packet duplication, etc. according to the joint operations of the first and second PCells, a packet loss, packet delay, etc. can be reduced, a packet transmission reliability can be improved, and a data transmission rate can be easily maintained.

Table 2 shows an exemplary embodiment of state classification of a single PCell and a dual PCell according to the second exemplary embodiment of the cell operation method.

TABLE 2

| State | Dual PCell | |
| --- | --- | --- |
| | First PCell | Second PCell |
| IDLE | RRC_IDLE (single PCell) | |
| CONNECTED | RRC_INACTIVE (single PCell) | |
| | RRC_ACTIVE (single PCell) | |
| | RRC_INACTIVE | RRC_INACTIVE |
| | RRC_ACTIVE | RRC_INACTIVE |
| | RRC_INACTIVE | RRC_ACTIVE |
| | RRC_ACTIVE | RRC_ACTIVE |

The second exemplary embodiment of the cell operation method may support one or more PCells. Here, a state of a single PCell may be classified into an idle state (e.g., RRC_IDLE) and a connected state (e.g., RRC_INACTIVE or RRC_ACTIVE) as in Table 1. Meanwhile, in a situation of a dual PCell in which both the first PCell and the second PCell are connected, each PCell may have a state of either RRC_INACTIVE or RRC_ACTIVE. That is, in some cases, both the first and second PCells may correspond to RRC_INACTIVE, either one of the first and second PCells may correspond to RRC_INACTIVE and the other may correspond to RRC_ACTIVE, or both the first and second PCells may correspond to RRC_ACTIVE.

In FIG. 9, the second exemplary embodiment of the cell operation method has been described by taking a dual PCell situation in which two PCells are configured as an example, but this is only an example for convenience of description, and the second exemplary embodiment of the cell operation is not limited thereto. For example, in the second exemplary embodiment of the cell operation method, more than two PCells may be configured at the same time, and one of the configured PCells may be configured as an authority cell (i.e., 'multi-PCell' situation). In describing the second exemplary embodiment of the cell operation method with reference to FIGS. 9 to 27B, contents described based on the dual PCell situation may be equally or similarly applied to the multi-PCell situation.

FIGS. 10A to 10H are conceptual diagrams for describing exemplary embodiments of a component carrier (CC) operation scheme according to the second exemplary embodiment of the cell operation method.

Referring to FIGS. 10A to 10H, in the second exemplary embodiment of the cell operation method, a plurality of CCs may be operated based on one or more PCells. For example, one of CC1 to CC6 may be operated as a PCell, and each of other cells may be operated as an SCell, PSCell, PCell, or the like. FIGS. 10A to 10H show first to eighth CC operation schemes for CC operations.

Figure 10A:
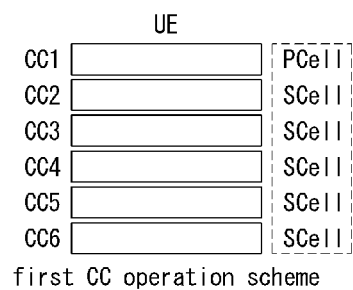
FIGS. 10A to 10H are conceptual diagrams for describing exemplary embodiments of a component carrier (CC) operation scheme according to the second exemplary embodiment of the cell operation method.

Referring to FIG. 10A, in the first CC operation scheme, one CC may be operated as a PCell. In addition, other CCs may be added as SCells based on CA, and operated together with the PCell. For example, CC1 may be operated as a PCell, and CC2 to CC6 may be operated as SCells together with CC1 (i.e., PCell).

Figure 10B:
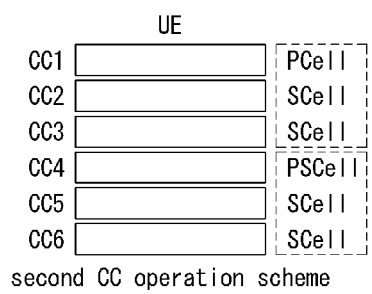

Referring to FIG. 10B, in the second CC operation scheme, one CC may be operated as a PCell, and another CC may be operated as a PSCell based on DC. In addition, other CCs may be added as SCells based on CA, and operated together with the PCell or PSCell. For example, CC1 may be operated as a PCell, CC2 and CC3 may be operated as SCells with CC1 (i.e., PCell), CC4 may be operated as a PSCell, and CC5 and CC6 may be operated as SCells with CC4 (i.e., PSCell).

Figure 10C:
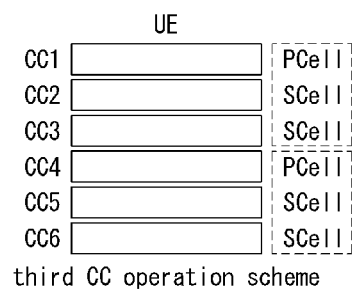

Referring to FIG. 10C, in the third CC operation scheme, two CCs may be operated as PCells. In addition, other CCs may be added as SCells based on CA, and be operated with one of the two PCells. For example, CC1 may be operated as a PCell, CC2 and CC3 may be operated as SCells with CC1 (i.e., PCell), CC4 may be operated as a PCell, and CC5 and CC6 may be operated as SCells with CC4 (i.e., PCell).

Figure 10D:
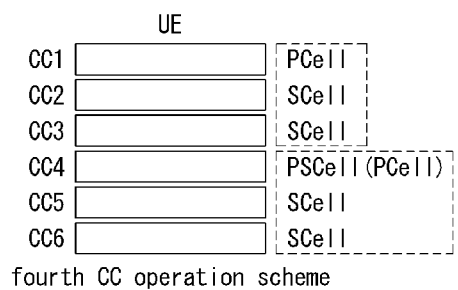

Referring to FIG. 10D, in the fourth CC operation scheme, one CC may be operated as a PCell, and another CC may be operated as a PSCell or PCell. In addition, other CCs may be added as SCells based on CA and operated with one of the PCell or the PSCell. For example, CC1 may be operated as a PCell, CC2 and CC3 may be operated as SCells together with CC1 (i.e., PCell), CC4 may be operated as a PSCell or PCell, and CC5 and CC6 may be operated as SCells with CC4 (i.e., PSCell or PCell).

Figure 10E:
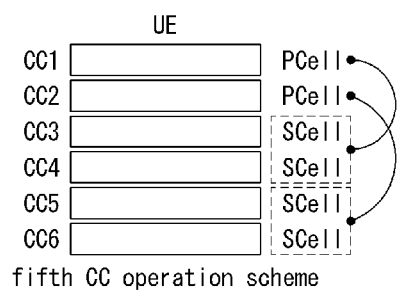

Referring to FIG. 10E, in the fifth CC operation scheme, two CCs may be operated as PCells. In addition, other CCs may be added as SCells based on CA and operated with one of the two PCells. CCs operating together may not be adjacent. For example, CC1 may be operated as a PCell, CC2 may be operated as a PCell, CC3 and CC4 may be operated as SCells with CC1 (i.e., PCell), and CC5 and CC6 may be operated as SCells with CC2 (i.e., PCell).

Figure 10F:
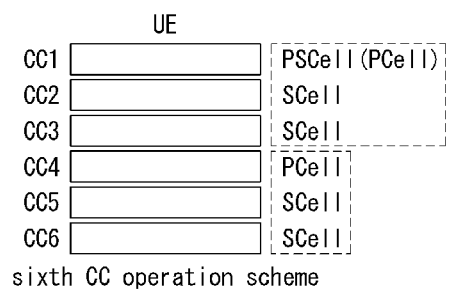

Referring to FIG. 10F, in the sixth CC operation scheme, one CC may be operated as a PCell, and another CC may be operated as a PSCell or PCell. In addition, other CCs may be added as SCells based on CA and operated with one of the PCell or PSCell. For example, CC1 may be operated as a PSCell or PCell, CC2 and CC3 may be operated as SCells with CC1 (i.e., PSCell or PCell), CC4 may be operated as a PCell, and CC5 and CC6 may be operated as SCells with CC4 (i.e., PCell). The sixth CC operation scheme may be seen as symmetrical with the fourth CC operation scheme described with reference to FIG. 10F.

Figure 10G:
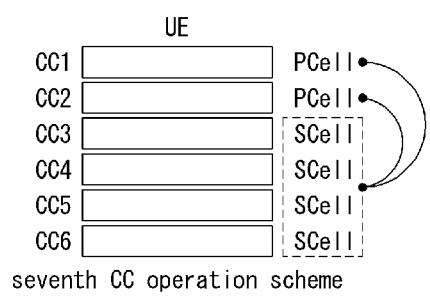

Referring to FIG. 10G, in the seventh CC operation scheme, two CCs may be operated as PCells. In addition, other CCs may be added as SCells based on CA and operated with the two PCells. For example, CC1 may be operated as a PCell, CC2 may be operated as a PCell, and CC3 to CC6 may be operated as SCells flexibly with one of CC1 (i.e., PCell) or CC2 (i.e., PCell).

Figure 10H:
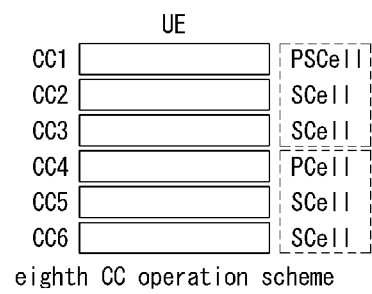

Referring to FIG. 10H, in the eighth CC operation scheme, one CC may be operated as a PCell, and another CC may be operated as a PSCell based on DC. In addition, other CCs may be added as SCells based on CA and operated together with the PCell or PSCell. For example, CC1 may be operated as a PSCell, CC2 and CC3 may be operated as SCells with CC1 (i.e., PSCell), CC4 may be operated as a PCell, and CC5 and CC6 may be operated as SCells with CC4 (i.e., PCell). The eighth CC operation scheme may be seen as symmetrical with the second CC operation scheme described with reference to FIG. 10B.

Figure 11:
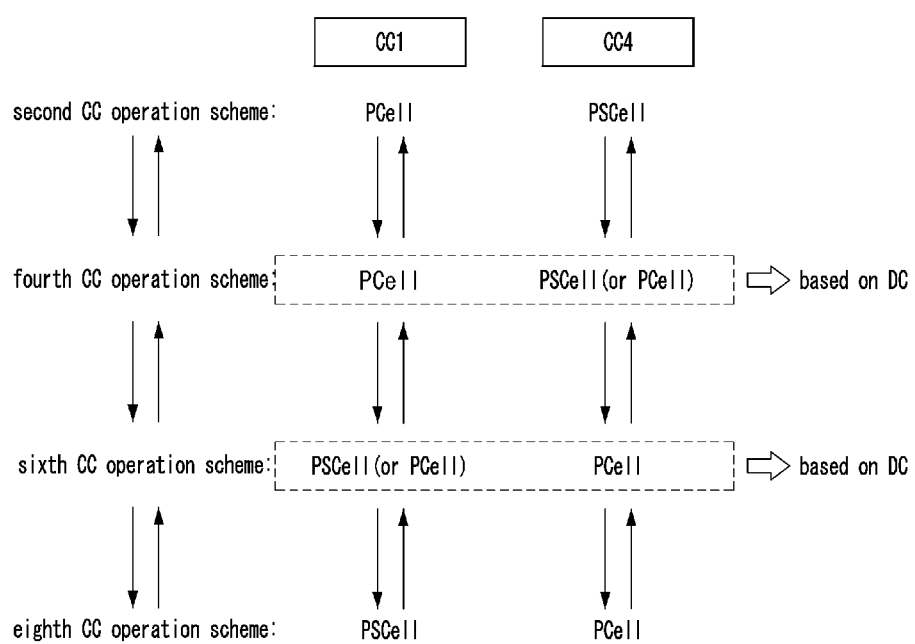
FIG. 11 is a conceptual diagram for describing an exemplary embodiment of a transition method between the exemplary embodiments of the CC operation scheme in the second exemplary embodiment of the cell operation method.

FIG. 11 is a conceptual diagram for describing an exemplary embodiment of a transition method between the exemplary embodiments of the CC operation scheme in the second exemplary embodiment of the cell operation method.

Referring to FIG. 11, the second CC operation scheme described with reference to FIG. 10B, the fourth CC operation scheme described with reference to FIG. 10D, the sixth CC operation scheme described with reference to FIG. 10F, and the eighth CC operation scheme described with reference to FIG. 10H may be transitioned to each other. For example, assuming that CC1 corresponds to a first cell and CC4 corresponds to a second cell, the first cell and the second cell may operate by transitioning between a PCell and a PSCell, respectively, depending on circumstances.

For example, as the UE performs initial access, the first cell may be configured as a PCell, and the second cell may be added as a PSCell based on DC (i.e., second CC operation scheme). Here, the second cell configured as the PSCell based on DC may be operated as a PSCell or PCell based on the second exemplary embodiment of the cell operation method, and the first cell may operate as an authority cell (i.e., fourth CC operation scheme). Meanwhile, due to a transfer of authority, the second cell may operate as an authority cell, and in this case, the first cell may operate as a PCell or PSCell (i.e., sixth CC operation scheme). Here, when joint operations for the first cell are terminated, the first cell may operate as a PSCell and the second cell may operate as a PCell (i.e., eighth CC operation scheme).

The second exemplary embodiment of the cell operation method may be classified into a first joint operation scheme, a second joint operation scheme, and a third joint operation scheme. Here, the first joint operation scheme may be referred to as a 'CN-based joint operation scheme'. The second joint operation scheme may be referred to as a 'RAN-based joint operation scheme'. The third joint operation scheme may be referred to as a 'DC-based joint operation scheme'.

Figure 12:
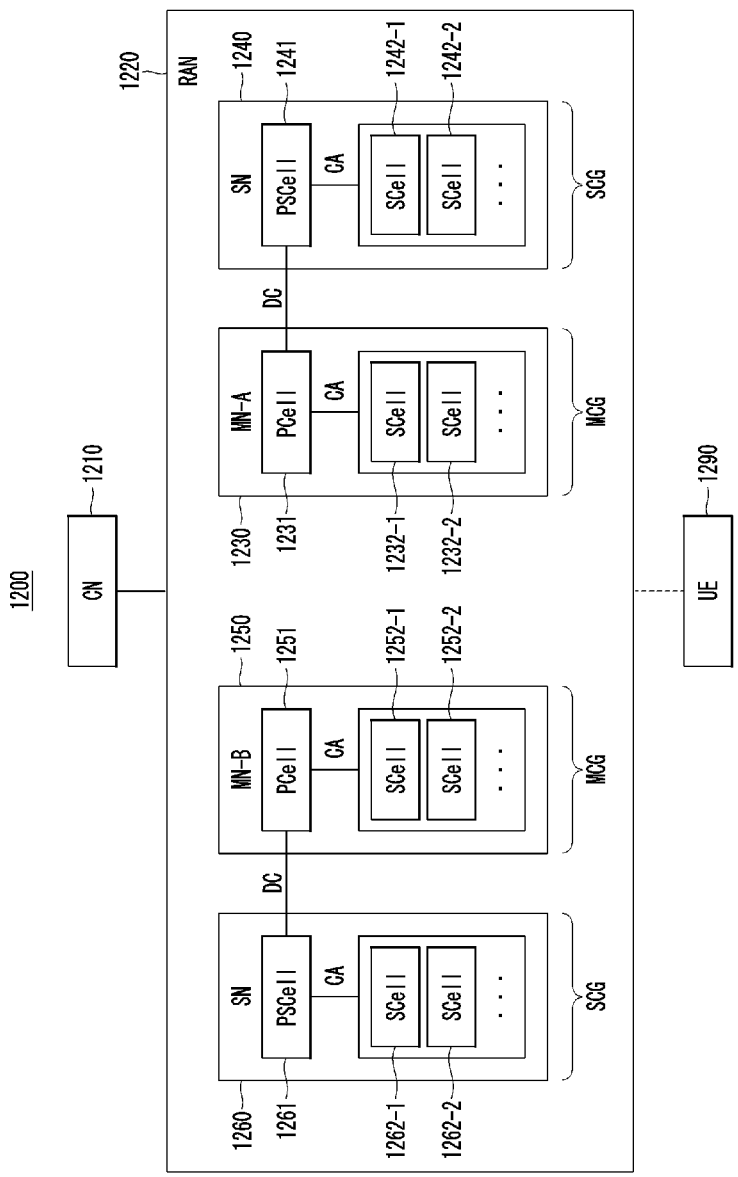
FIG. 12 is a conceptual diagram for describing an exemplary embodiment of the first and second joint operation schemes in the communication system.

FIG. 12 is a conceptual diagram for describing an exemplary embodiment of the first and second joint operation schemes in the communication system.

Referring to FIG. 12, a communication system 1200 may support the second exemplary embodiment of the cell operation method. Communication nodes constituting the communication system 1200 may support at least the first and second joint operation schemes in the second exemplary embodiment of the cell operation method. The communication system 1200 may include a CN 1210 and a RAN 1220. The CN 1210 may provide a service to a UE 1290 based on cells constituting the RAN 1220.

Two of cells constituting the RAN 1220 may be operated as PCells 1231 and 1251 for the UE 1290. The PCells 1231 and 1251 may be formed by different MNs. The MNs including the PCells 1231 and 1251 may be referred to as an MN-A 1230 and an MN-B 1250, respectively. Connections between the UE 1290 and the PCells 1231 and 1251 may be extended based on CA, and SCells 1232-1, 1232-2, 1252-1, 1252-2, . . . , and the like may be added within each of the MNs 1230 and 1250. Meanwhile, connections between the UE 1290 and the PCells 1231 and 1251 may be extended based on DC, and PSCells 1241 and 1261 may be added within SNs 1240 and 1260 other than the MNs 1230 and 1250. In addition, SCells 1242-1, 1242-2, 1262-1, . . . , and 1262-2 may be added within the SNs 1240 and 1260 based on CA. A set of cells configured for the UE 1290 within the MNs 1230 and 1250 may be referred to as an MCG, and a set of cells configured for the UE 1290 within the SNs 1240 and 1260 may be referred to as an SCG.

According to the first joint operation scheme (i.e., CN-based joint operation scheme), the CN 1210 may perform operations for joint operations for the PCell 1230 included in the MN-A 1230 and the PCell 1250 included in the MN-B 1250. For example, the CN 1210 may independently perform mobility management for the PCells 1231 and 1251. For example, mobility management in the idle state may include attach/detach, routing area update, and the like. Mobility management in the connected state may include handover (HO), RLF recovery, beam pairing, beam failure recovery, and the like.

Meanwhile, according to the second joint operation scheme (i.e., RAN-based joint operation scheme), one of the PCells 1231 and 1251 of the RAN 1220 may be configured as an authority cell, and may perform operations for joint operations.

Figure 13A:
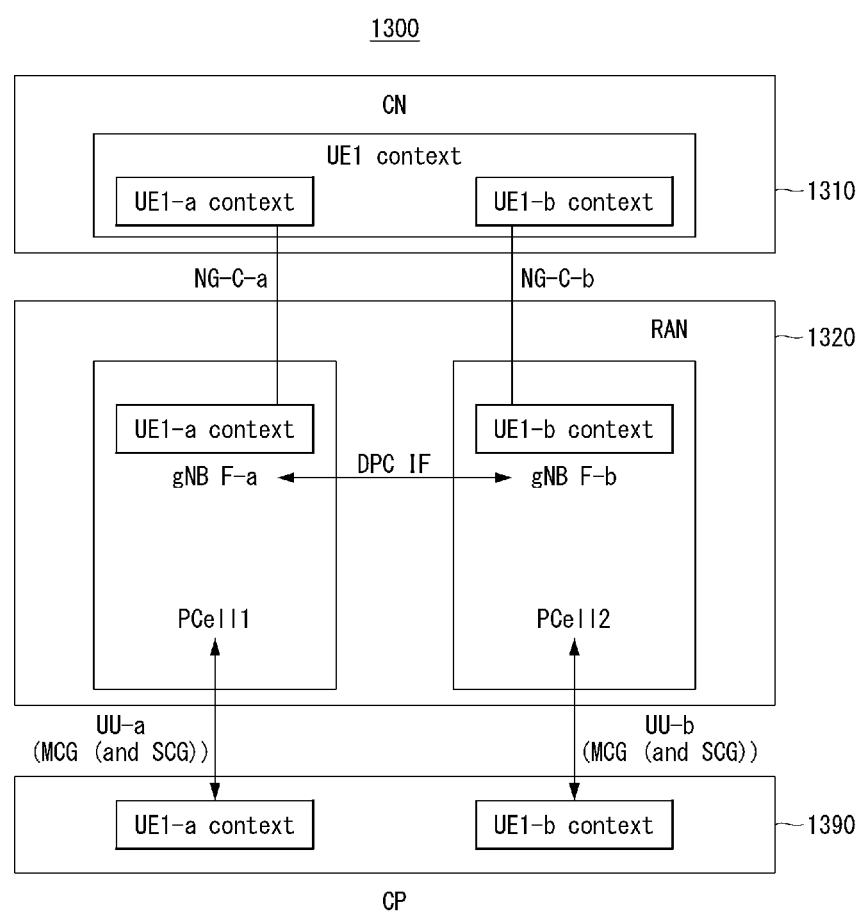
FIGS. 13A and 13B are conceptual diagrams for describing a first exemplary embodiment of a CP interface configuration according to the first and second joint operation schemes.
Figure 13B:
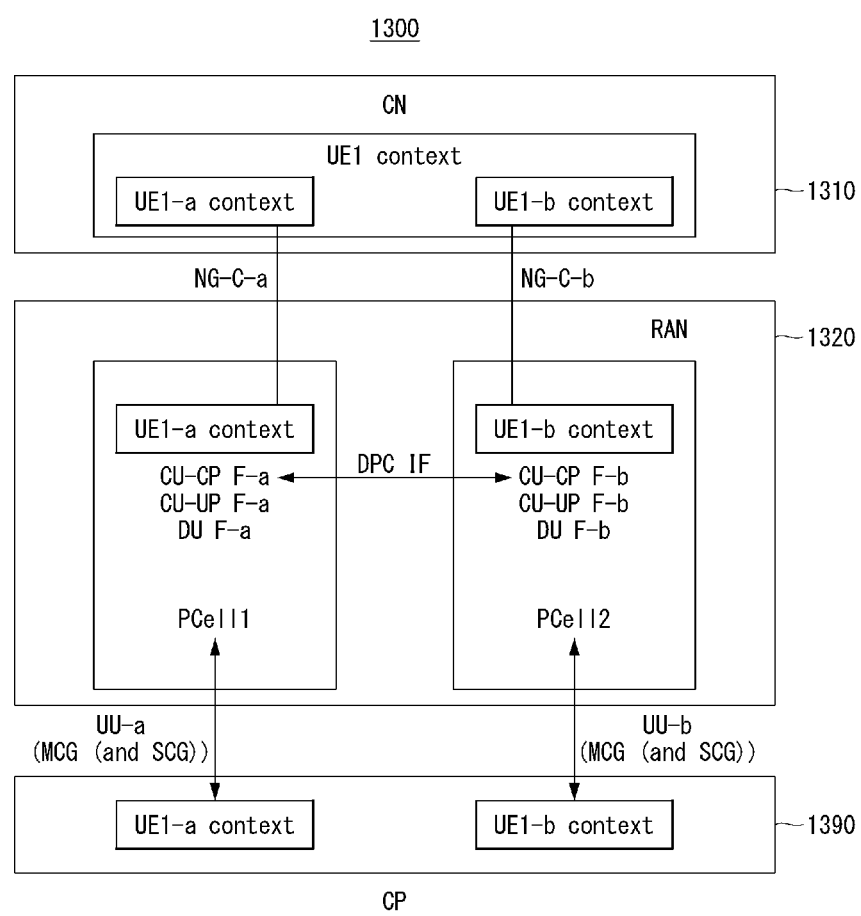

FIGS. 13A and 13B are conceptual diagrams for describing a first exemplary embodiment of a CP interface configuration according to the first and second joint operation schemes.

Referring to FIGS. 13A and 13B, a communication system 1300 may include a CN 1310 and a RAN 1320. The communication system 1300, CN 1310, and RAN 1320 may be the same as or similar to the communication system 1200, CN 1210, and RAN 1220 described with reference to FIG. 12. The communication system 1300 may support the second exemplary embodiment of the cell operation method. In the communication system 1300, two PCells (i.e., dual PCell) or a plurality of PCells (i.e., multi-PCell) may be configured for a service for one UE (hereinafter referred to as UE1 1390). In other words, for the service for the UE1 1390, two CP interfaces (i.e., dual CP) or multiple CP interfaces (i.e., multi-CP) may be configured between the CN 1310 and the RAN 1320. Hereinafter, in describing the first exemplary embodiment of the configuration of the CP interface with reference to FIGS. 13A and 13B, description overlapping with those described with reference to FIGS. 1 to 12 may be omitted.

In a dual PCell situation in which a PCell1 and a PCell2 are configured, there may be two UE contexts (hereinafter referred to as 'UE1 contexts') for communication between the CN 1310 and the UE1 1390 through the RAN 1320. That is, a UE1-a context corresponding to a path through the PCell1 and a UE1-b context corresponding to a path through the PCell2 may exist. The CN 1310 and the UE1 1390 may have the UE1-a context and the UE1-b context. A communication node forming the PCell1 in the RAN 1320 may have the UE1-a context, and a communication node forming the PCell2 in the RAN 1320 may have the UE1-b context.

A control interface UU-a may be configured between an MCG (and SCG) associated with the PCell1 and the UE1 1390, and a control interface UU-b may be configured between an MCG (and SCG) associated with the PCell2 and the UE1 1390. A control interface NG-C-a may be configured between the MCG (and SCG) associated with the PCell1 and the CN 1310, and a control interface NG-C-b may be configured between the MCG (and SCG) associated with the PCell2 and the CN 1310. The CN 1310 may determine or assume that the NG-C-a and the NG-C-b have the same or different UE contexts.

Referring to FIG. 13A, in an exemplary embodiment of the communication system 1300, the PCell1 and the PCell2 may be formed by different base stations. For example, a function of processing the UE1-a context in a base station forming the PCell1 may be referred to as a gNB F-a, and a function of processing the UE1-b context in a base station forming the PCell2 may be referred to as a gNB F-b. In this case, a control interface 'dual PCell coordination interface (DPC IF)' may be configured between the gNB F-a and the gNB F-b.

Referring to FIG. 13B, in an exemplary embodiment of the communication system 1300, the PCell1 and the PCell2 may be formed based on a functional split based on a central unit (CU) and distributed unit(s) (DU(s)). Here, functions performing processing for the PCell1 and UE1-a context may be referred to as CU-CP F-a, CU-DU F-a, and DU F-a, and functions for performing processing for the PCell2 and UE1-b context may be referred to as CU-CP F-b, CU-DU F-b, and DU F-b. In this case, a control interface 'DPC IF' may be configured between the CU-CP F-a, etc. associated with the PCell1 and the CU-CP F-b, etc. associated with the PCell2.

The DPC IF described with reference to FIGS. 13A and 13B may be configured in a direct connection scheme or a relay scheme. Meanwhile, the DPC IF may be replaced with a multi-Cell coordination interface (MPC IF) or the like in a multi-PCell situation.

Figure 14A:
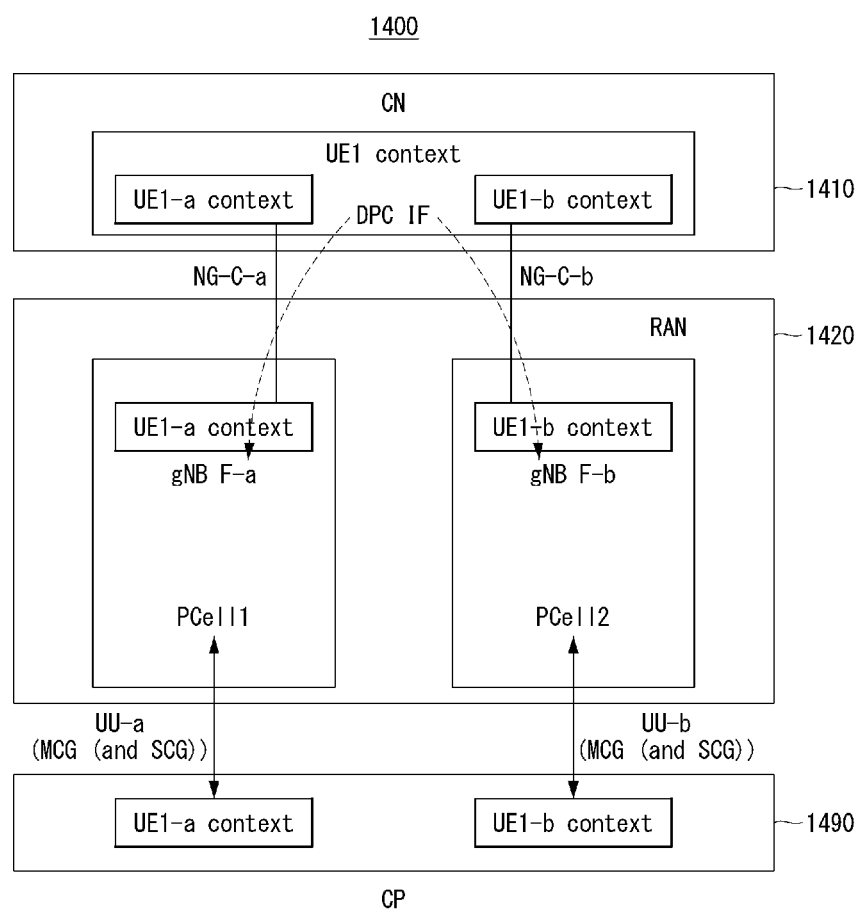
FIGS. 14A and 14B are conceptual diagrams for describing a second exemplary embodiment of a CP interface configuration according to the first and second joint operation schemes.
Figure 14B:
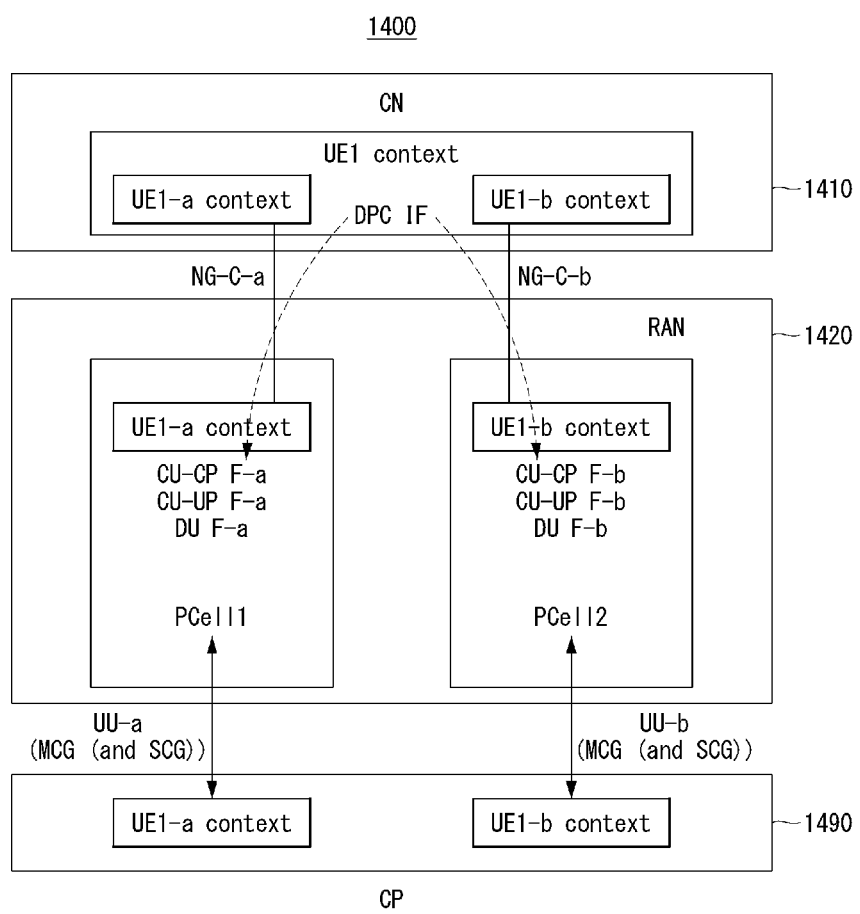

FIGS. 14A and 14B are conceptual diagrams for describing a second exemplary embodiment of a CP interface configuration according to the first and second joint operation schemes.

Referring to FIGS. 14A and 14B, a communication system 1400 may include a CN 1410 and a RAN 1420. The communication system 1400, CN 1410, and RAN 1420 may be the same as or similar to the communication system 1200, CN 1210, and RAN 1220 described with reference to FIG. 12. The communication system 1400 may support the second exemplary embodiment of the cell operation method. Hereinafter, in describing the second exemplary embodiment of the CP interface configuration with reference to FIGS. 14A and 14B, description overlapping with those described with reference to FIGS. 1 to 13B may be omitted.

In an exemplary embodiment of communication system 1400, a PCell1 and a PCell2 for a UE1 1490 may be formed by different physical entities. For example, the PCell1 may be formed by a physical entity X, and the PCell2 may be formed by a physical entity Y. A direct interface connection between the physical entities X and Y may not be easy or impossible. In this case, an interface connection between the physical entities X and Y may be relayed through a CP interface between the CN 1410 and the RAN 1420.

Referring to FIG. 14A, a DPC IF relayed through the CN 140 may be configured between a function (e.g., gNB F-a) for processing the UE1-a context in the physical entity X and a function (e.g., gNB F-b) for processing the UE1-b context in the physical entity Y. The DPC IF may be relayed through an NG-C-a between the gNB F-a and the CN 1410 and an NG-C-b between the gNB F-b and the CN 1410.

Referring to FIG. 14B, a DPC IF relayed through the CN 410 may be configured between a function (e.g., CU-CP F-a) of processing the UE1-a context in the physical entity X and a function (e.g., CU-CP F-b) of processing the UE1-b context in the physical entity Y. The DPC IF may be relayed through an NG-C-a between the CU-CP F-a and the CN 1410 and an NG-C-b between the CU-CP F-b and the CN 1410.

Figure 15A:
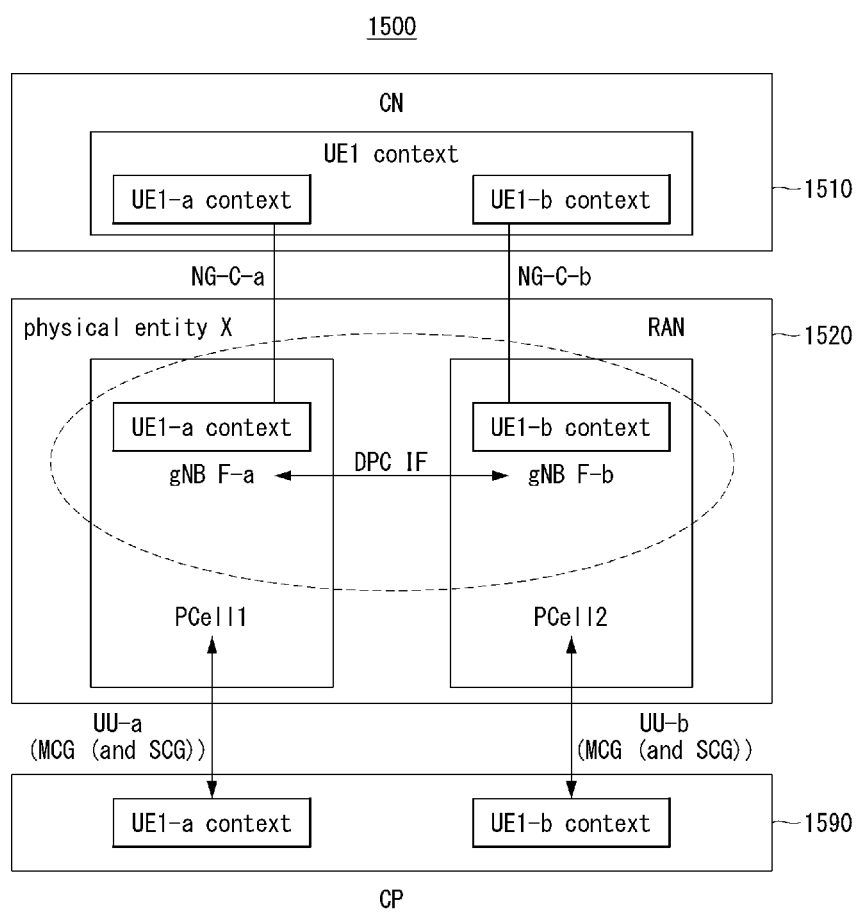
FIGS. 15A and 15B are conceptual diagrams for describing a third exemplary embodiment of a CP interface configuration according to the first and second joint operation schemes.
Figure 15B:
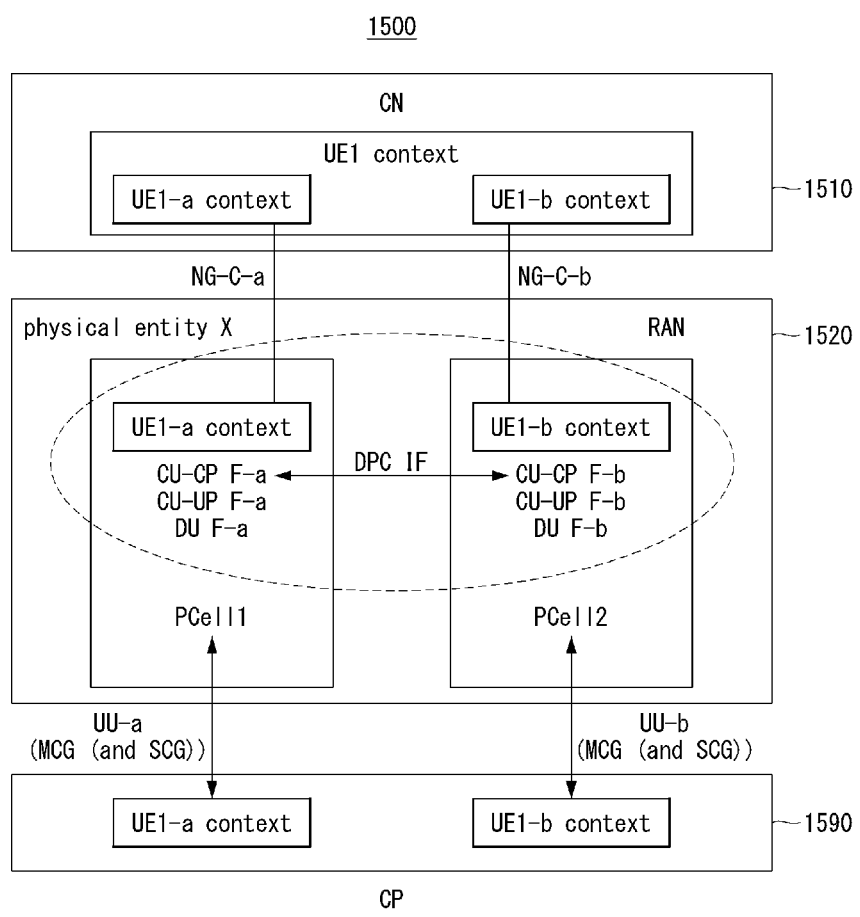

FIGS. 15A and 15B are conceptual diagrams for describing a third exemplary embodiment of a CP interface configuration according to the first and second joint operation schemes.

Referring to FIGS. 15A and 15B, a communication system 1500 may include a CN 1510 and a RAN 1520. The communication system 1500, CN 1510, and RAN 1520 may be the same as or similar to the communication system 1200, CN 1210, and RAN 1220 described with reference to FIG. 12. The communication system 1500 may support the second exemplary embodiment of the cell operation method. Hereinafter, in describing the third exemplary embodiment of the CP interface configuration with reference to FIGS. 15A and 15B, description overlapping with those described with reference to FIGS. 1 to 14B may be omitted.

In an exemplary embodiment of the communication system 1500, a PCell1 and a PCell2 for a UE1 1590 may be formed by the same physical entity. For example, the PCell1 and PCell2 may be formed by a physical entity X. In this case, an interface connection between the PCell1 and PCell2 may be configured as an interface within the physical entity X.

Referring to FIG. 15A, in the physical entity X, a DPC IF may be configured between a function (e.g., gNB F-a) for processing a UE1-a context and a function (e.g., gNB F-b) for processing a UE1-b context. The DPC IF may be configured in a direct connection scheme between the gNB F-a and the gNB F-b.

Referring to FIG. 15B, a DPC IF may be configured between a function (e.g., CU-CP F-a) for processing the UE1-a context and a function (e.g., CU-CP F-b) for processing the UE1-b context in the physical entity X. The DPC IF may be configured in a direct connection scheme between the CU-CP F-a and the CU-CP F-b.

FIGS. 16A to 16D are conceptual diagrams for describing a first exemplary embodiment of a UP interface configuration according to the first and second joint operation schemes.

Referring to FIGS. 16A-16D, a communication system 1600 may include a CN 1610 and a RAN 1620. The communication system 1600, CN 1610, and RAN 1620 may be the same as or similar to the communication system 1200, CN 1210, and RAN 1220 described with reference to FIG. 12. The communication system 1600 may support the second exemplary embodiment of the cell operation method. Hereinafter, in describing the first exemplary embodiment of the UP interface configuration with reference to FIGS. 16A to 16D, description overlapping with those described with reference to FIGS. 1 to 15B may be omitted.

In a dual PCell situation where a PCell-a and a PCell-b are configured, a communication node forming the PCell-a may be referred to as an MN-A 1630, and a communication node forming the PCell-a may be referred to as an MN-B 1650. There may be two UE contexts for communication between the CN 1610 and a UE 1690 through the RAN 1620. That is, a UE-a context corresponding to a path through the PCell-a and a UE-b context corresponding to a path through the PCell-b may exist. The UE 1690 may have a UE context. In the RAN 1620, the MN-A 1630 may have the UE-a context. The MN-B 1650 may have the UE-b context. An interface UU-a may be configured between an MCG (and SCG) associated with the PCell-a and the UE 1690, and an interface UU-b may be configured between an MCG (and SCG) associated with the PCell-b and the UE 1690. A UP interface NG-U(x) may be configured between the MCG (and SCG) associated with PCell-a and a UPF of the CN 1610, and a UP interface NG-U(x') may be configured between the MCG (and SCG) associated with the PCell-b and the UPF of the CN 1610.

Figure 16A:
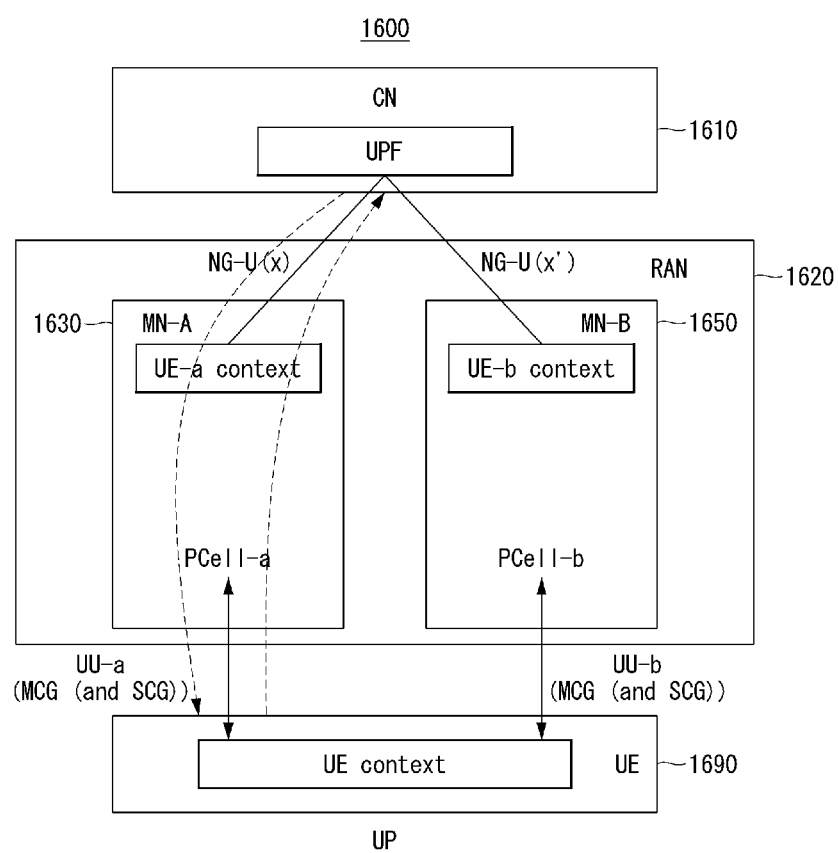
FIGS. 16A to 16D are conceptual diagrams for describing a first exemplary embodiment of a UP interface configuration according to the first and second joint operation schemes.
Figure 16B:
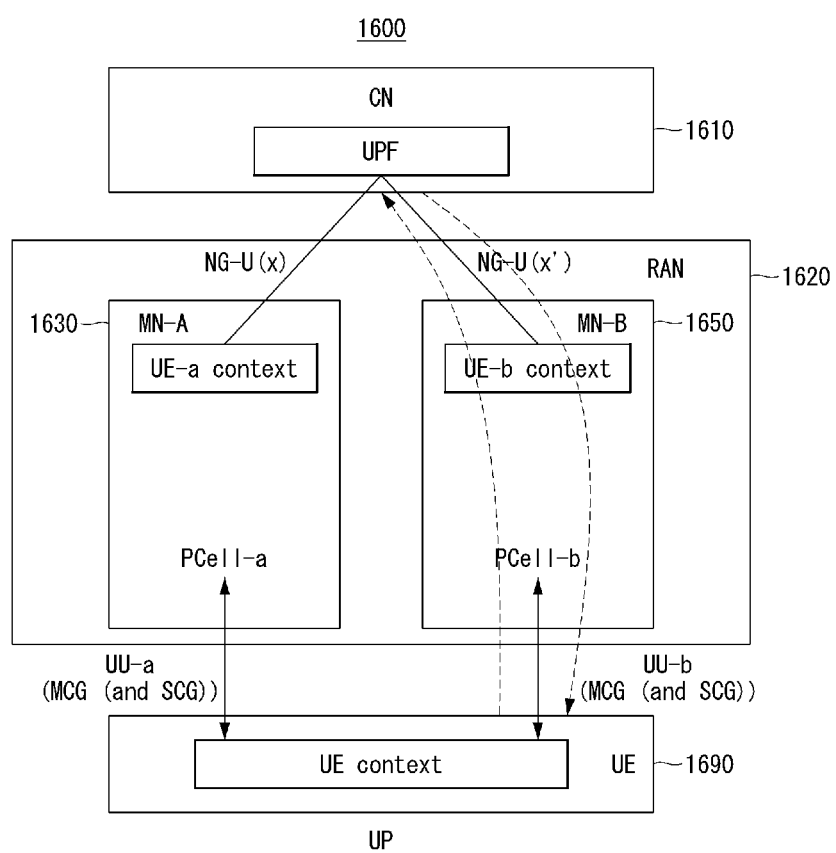

Referring to FIG. 16A, DL/UL data packets between the UPF of the CN 1610 and the UE 1690 may be transmitted and received through a path 'UPF-NG-U(x)-UU-a-UE'. Meanwhile, referring to FIG. 16B, DL/UL data packets between the UPF of the CN 1610 and the UE 1690 may be transmitted and received through a path 'UPF-NG-U(x)-UU-b-UE'. The packet switching described with reference to FIG. 9 may mean switching between the situation of FIG. 16A and the situation of FIG. 16B.

Figure 16C:
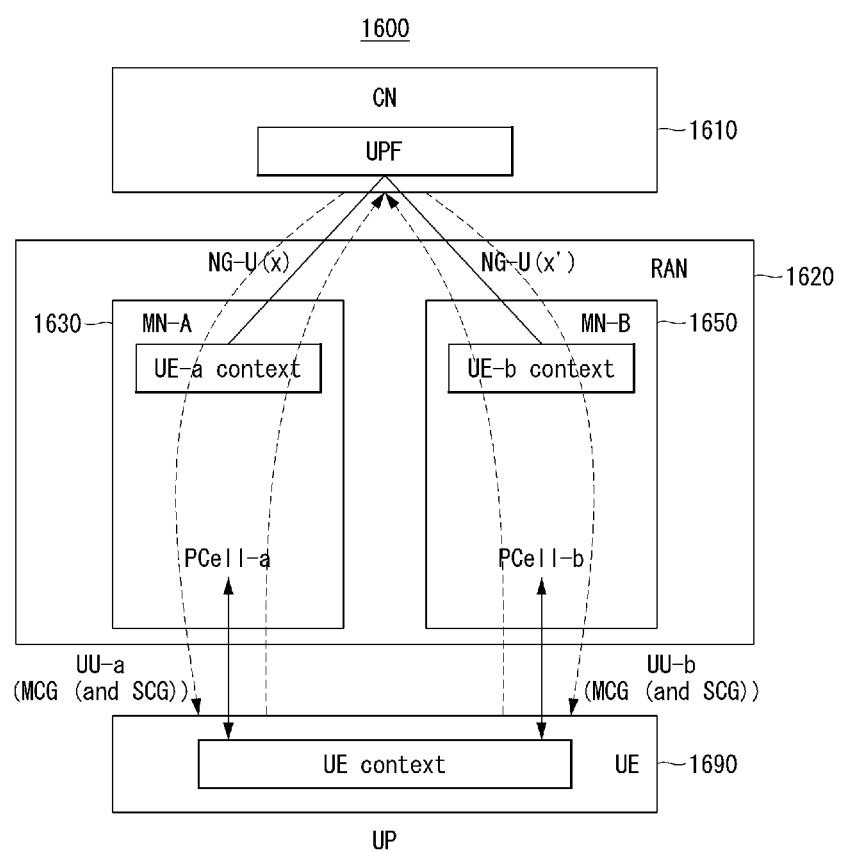

Referring to FIG. 16C, a part of DL/UL data packets between the UPF of the CN 1610 and the UE 1690 may be transmitted and received through a path 'UPF-NG-U(x)-UU-a-UE', and another part may be transmitted and received through a path 'UPF-NG-U(x')-UU-b-UE'. The packet distribution described with reference to FIG. 9 may mean the situation of FIG. 16C.

Figure 16D:
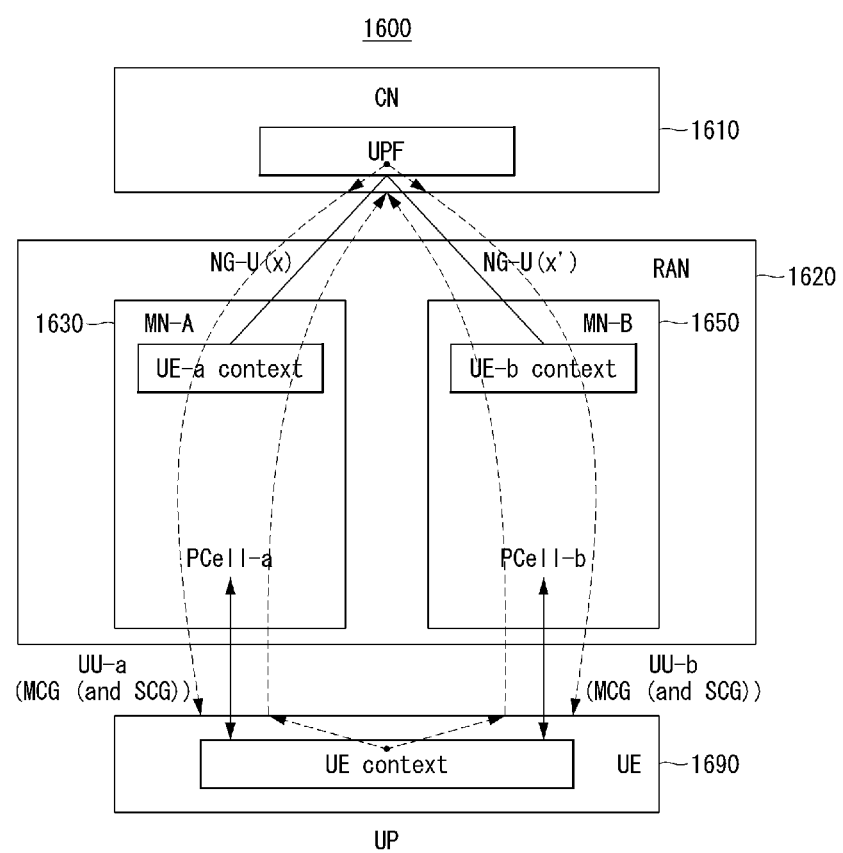

Referring to FIG. 16D, DL/UL data packets between the UPF of the CN 1610 and the UE 1690 may be duplicated and transmitted/received. That is, the DL/UL data packets between the UPF of the CN 1610 and the UE 1690 may be equally transmitted and received through both a path 'UPF-NG-U(x)-UU-a-UE' and a path 'UPF-NG-U(x)-UU-b-UE'. The packet duplication described with reference to FIG. 9 may mean the situation of FIG. 16D.

The transmission schemes such as the packet switching, packet distribution, and packet duplication described with reference to FIGS. 16A to 16D may be configured for each unit such as a single QoS flow, a set of QoS flows, or a radio bearer.

FIGS. 17A to 17D are conceptual diagrams for describing an exemplary embodiment of the third joint operation scheme in the communication system.

Referring to FIGS. 17A to 17D, a communication system 1700 may support the second exemplary embodiment of the cell operation method. Communication nodes constituting the communication system 1700 may support at least the third joint operation scheme in the second exemplary embodiment of the cell operation method. The communication system 1700 may include a CN 1710 and a RAN 1720. The CN 1710 may provide a service to a UE 1790 based on cells constituting the RAN 1720.

At least one of the cells constituting the RAN 1720 may operate as a PCell for the UE 1790. When one PCell is configured, another cell may be configured as a PSCell based on DC. Here, the cell configured as the PSCell may transition to a PCell based on the third joint operation scheme. Alternatively, the cell configured as the PCell may transition to a PSCell based on the third joint operation scheme. Such the transition may be performed in the same or similar manner as in the transition method between the exemplary embodiments of the CC operation scheme described with reference to FIG. 11.

Figure 17A:
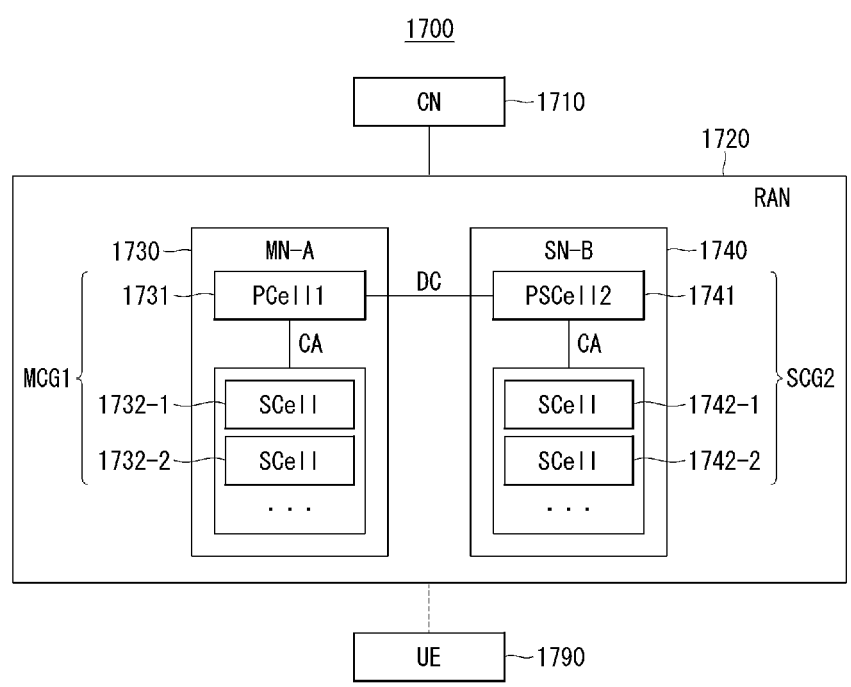
FIGS. 17A to 17D are conceptual diagrams for describing an exemplary embodiment of the third joint operation scheme in the communication system.

Referring to FIG. 17A, a first cell 1731 of a first communication node 1730 may be configured as a PCell for the UE 1790. The first cell 1731 configured as the PCell may be referred to as a 'PCell1'. The first communication node 1730 forming the PCell1 1731 may be referred to as an 'MN-A'. A connection between the UE 1790 and PCell1 1731 may be extended based on CA, and SCells 1732-1, 1732-2, . . . , and the like may be added within the MN-A 1730. A set of the cells 1731, 1732-1, 1732-2, . . . , and the like formed by the MN-A 1730 may be referred to as an 'MCG1'.

Meanwhile, a connection between the UE 1790 and the PCell1 1731 may be extended based on DC, and a second cell 1741 within a second communication node 1740 other than the MN-A 1730 may be configured as a PSCell. The second cell 1741 configured as the PSCell may be referred to as a 'PSCell2'. The second communication node 1740 forming the PSCell 1741 may be referred to as an 'SN-B'. Within the SN-B 1740, SCells 1742-1, 1742-2, . . . , and the like may be added based on CA. A set of the cells 1741, 1742-1, 1742-2, . . . , and the like formed by the SN-A 1730 may be referred to as an 'SCG2'.

Figure 17B:
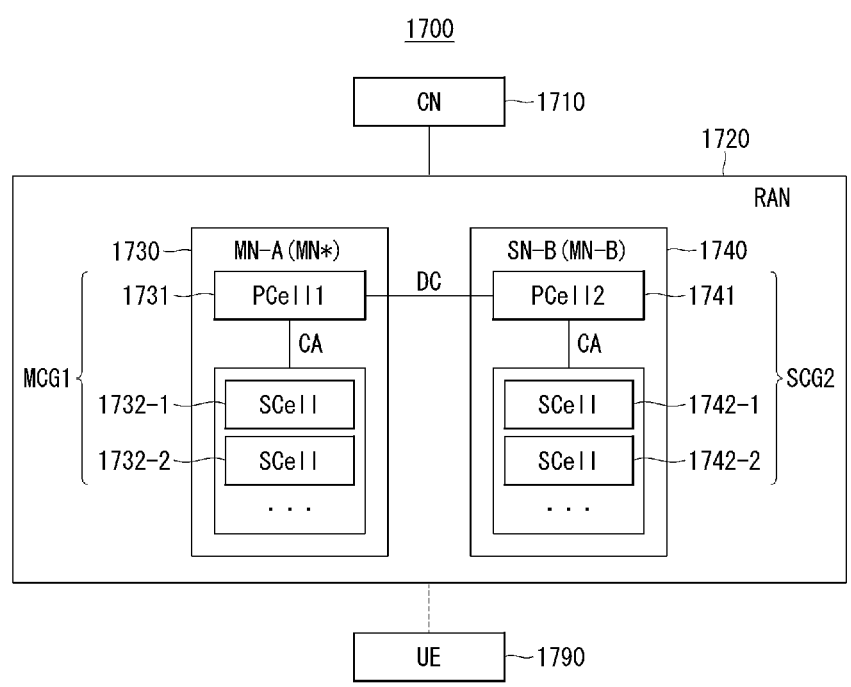

Referring to FIG. 17B, a PCell 1 1731 may be configured as an authority cell based on the third joint operation scheme. Alternatively, the MN-A 1730 forming the PCell1 1731 may be configured as an authority node MN*. Based on a decision or request of the PCell1 1731 configured as the authority cell or the MN-A 1730 configured as the authority node MN*, the second cell 1741 may transition from the PSCell (i.e., PSCell2) to a PCell (i.e., PCell2). In other words, in the communication system 1700, in addition to the PCell1 1731, one more PCell for the UE 1790 may be configured. Here, the second communication node 1740 forming the transitioned PCell2 1741 may be regarded as transitioning from the SN (i.e., SN-B) to an MN (i.e., MN-B).

Figure 17C:
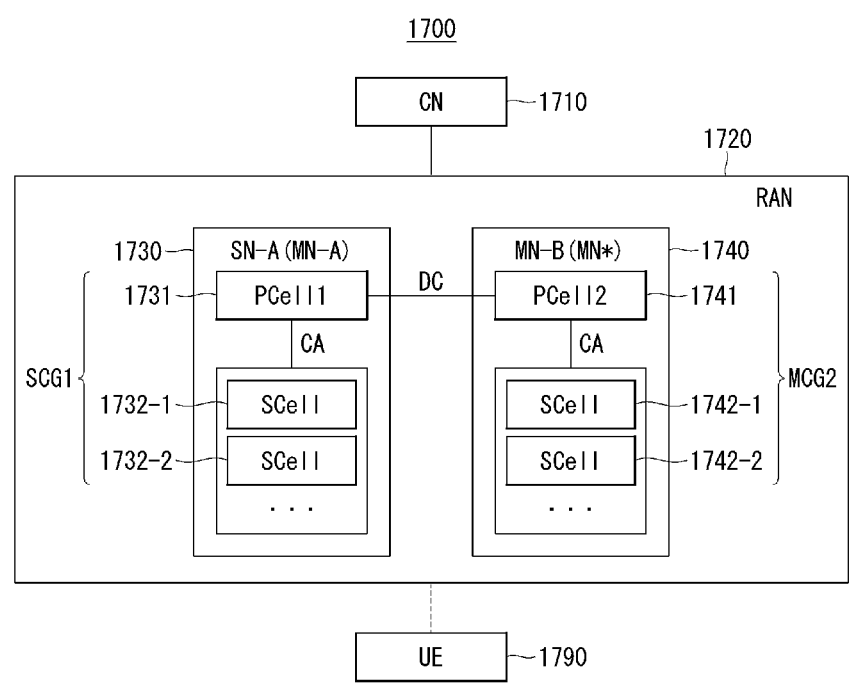

Referring to FIG. 17C, an authority cell for the UE 1790 may be changed from the PCell1 1731 to the PCell2 1741 based on the third joint operation scheme. In other words, the authority possessed by the PCell1 1731 may be transferred to the PCell2 1741. In this case, the MN-B 1740 forming the PCell2 1741, which has become the authority cell, may be regarded as being configured as the authority node MN*. Based on a decision or request of the PCell2 1741 configured as the authority cell or the MN-B 1740 configured as the authority node MN*, the first cell 1731 may transition from the PCell to a PSCell. In other words, in the communication system 1700 where there are two PCells for the UE 1790, the number of PCells for the UE 1790 may be changed to one. In this case, the first communication node 1740 forming the first cell 1731 that is changed to the PSCell (i.e., PSCell1) may be regarded as transitioning from the MN (i.e., MN-A) to the SN (i.e., SN-A). The situation shown in FIG. 17C may be regarded as having a symmetrical relationship with the situation shown in FIG. 17B.

Figure 17D:
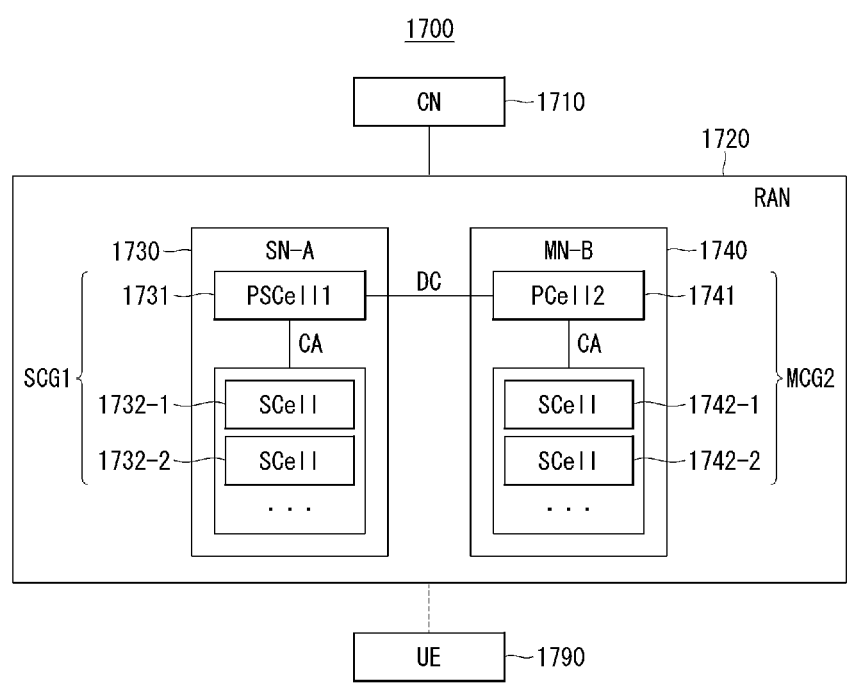

Referring to FIG. 17D, the first cell 1731 formed by the transitioned SN-A 1730 may be regarded as transitioning from the PCell (i.e., PCell1) to the PSCell (i.e., PSCell1). The situation shown in FIG. 17D may be regarded as having a symmetrical relationship with the situation shown in FIG. 17A.

In an exemplary embodiment of the third joint operation scheme, when the second communication node 1740 transitions from the SN-B to the MN-B, a set of cells 1741, 1742-1, 1742, . . . , and the like formed by the second communication node 1740 may be regarded as transitioning from the SCG2 to the MCG2. Meanwhile, when the first communication node 1730 transitions from the MN-A to the SN-A, a set of cells 1731, 1732-1, 1732-2, . . . , and the like formed by the first communication node 1730 may be regarded as transitioning from the MCG1 to the SCG1.

FIGS. 18A to 18D are conceptual diagrams for describing exemplary embodiments of a CP interface configuration according to the third joint operation scheme.

Referring to FIGS. 18A-18D, a communication system 1800 may include a CN 1810 and a RAN 1820. The communication system 1800, CN 1810, and RAN 1820 may be the same as or similar to the communication system 1700, CN 1710, and RAN 1720 described with reference to FIGS. 17A-17D. Hereinafter, in describing the exemplary embodiments of the CP interface configuration according to the third joint operation scheme with reference to FIGS. 18A and 18B, descriptions overlapping with those described with reference to FIGS. 1 to 17D may be omitted.

Figure 18A:
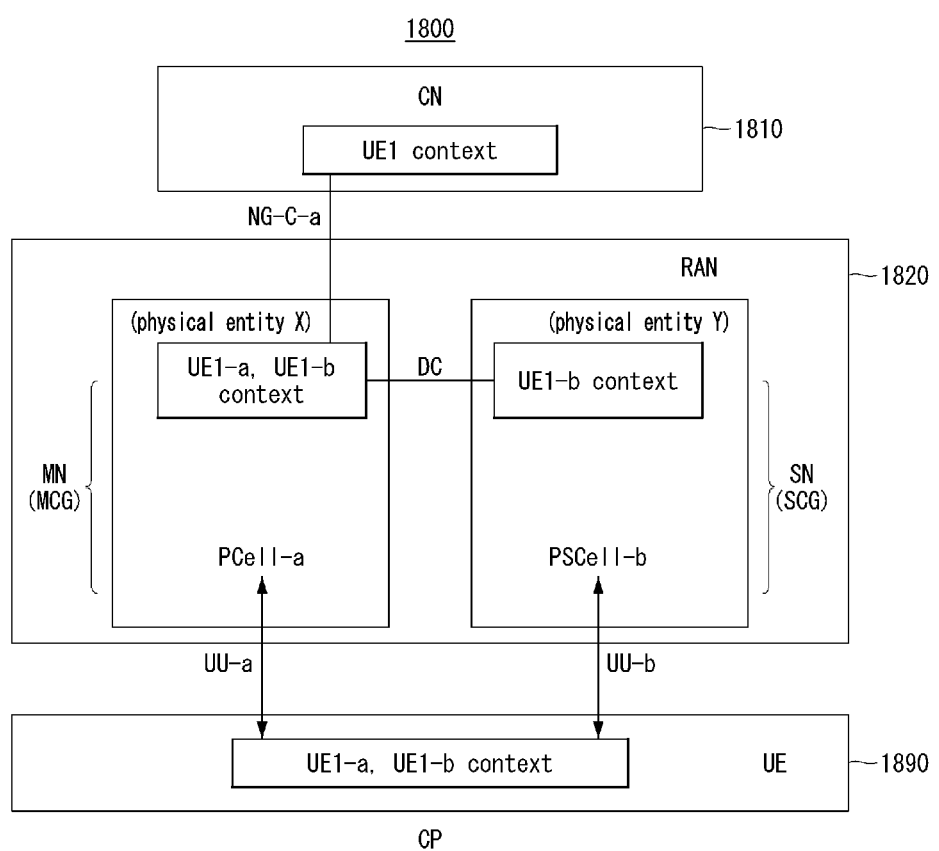
FIGS. 18A to 18D are conceptual diagrams for describing exemplary embodiments of a CP interface configuration according to the third joint operation scheme.

Referring to FIG. 18A, a first cell formed by a first communication node corresponding to a physical entity X of the RAN 1820 may be configured as a PCell-a for a UE1 1890. A radio connection to the UE1 1890 may be extended based on CA and/or DC. For example, a second cell 1890 formed by a second communication node corresponding to a physical entity Y, and may be added as a PSCell-b based on DC. One or more SCells may be added to the first communication node and/or the second communication node based on CA. In this case, the first communication node may be an MN, and the second communication node may be an SN. In addition, a set of cells for the UE1 1890 generated by the first communication node configured as the MN may be referred to as an MCG, and a set of cells for the UE1 1890 generated by the second communication node configured as the SN may be referred to as SCG.

There may be two UE contexts (hereinafter referred to as UE1 contexts) for communication between the CN 1810 and UE1 1890 through the RAN 1820. A UE1-a context corresponding to a path through the PSCell-a and a UE1-b context corresponding to a path through the PSCell-b may exist. The first communication node may have the UE1-a context, and the second communication node may have the UE1-b context. The second communication node may be connected to the CN through the first communication node, and thus the first communication node may further have the UE1-b context. An NG-C-a may be configured between the first communication node and the CN 1810. A UU-a may be configured between the first communication node and the UE1 1890. A UU-b may be configured between the second communication node and the UE1 1890.

Figure 18B:
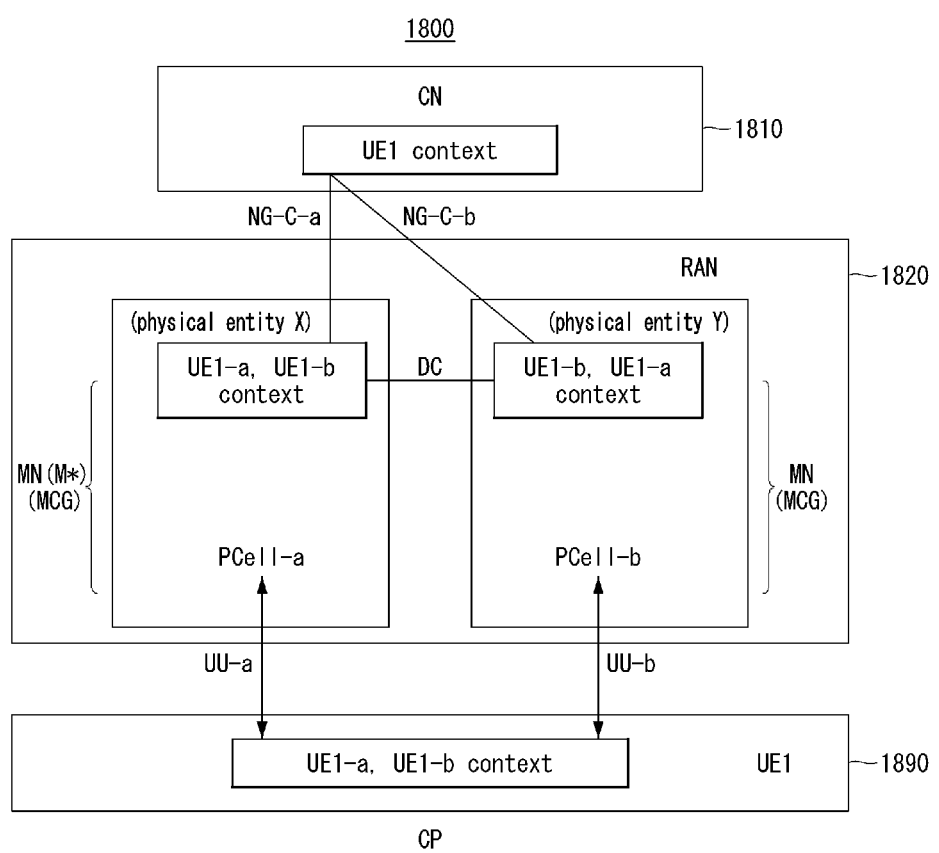

Referring to FIG. 18B, the PCell-a may be configured as an authority cell based on the third joint operation scheme. Alternatively, the first communication node forming the PCell-a may be configured as an authority node MN*. Based on a decision or request of the PCell-a configured as the authority cell or the first communication node configured as the authorized node MN*, the second cell may transition from the PSCell-b to a PCell-b.

The second communication node forming the transitioned PCell-b may be regarded as transitioning from the SN to an MN. A set of cells for the UE1 1890 generated by the second communication node transitioned to the MN may be referred to as an MCG. An NG-C-b may be additionally configured between the second communication node transitioned to the MN and the CN 1810. The second communication node may further have the UE1-a context. Among the NG-C-a and NG-C-b, only the NG-C-a connected to the first communication node, which is the authority node, may be operated for transmission and reception of CP packets. The NG-C-b connected to the second communication node, not the authority node, may be regarded as being preliminarily configured and on standby.

Figure 18C:
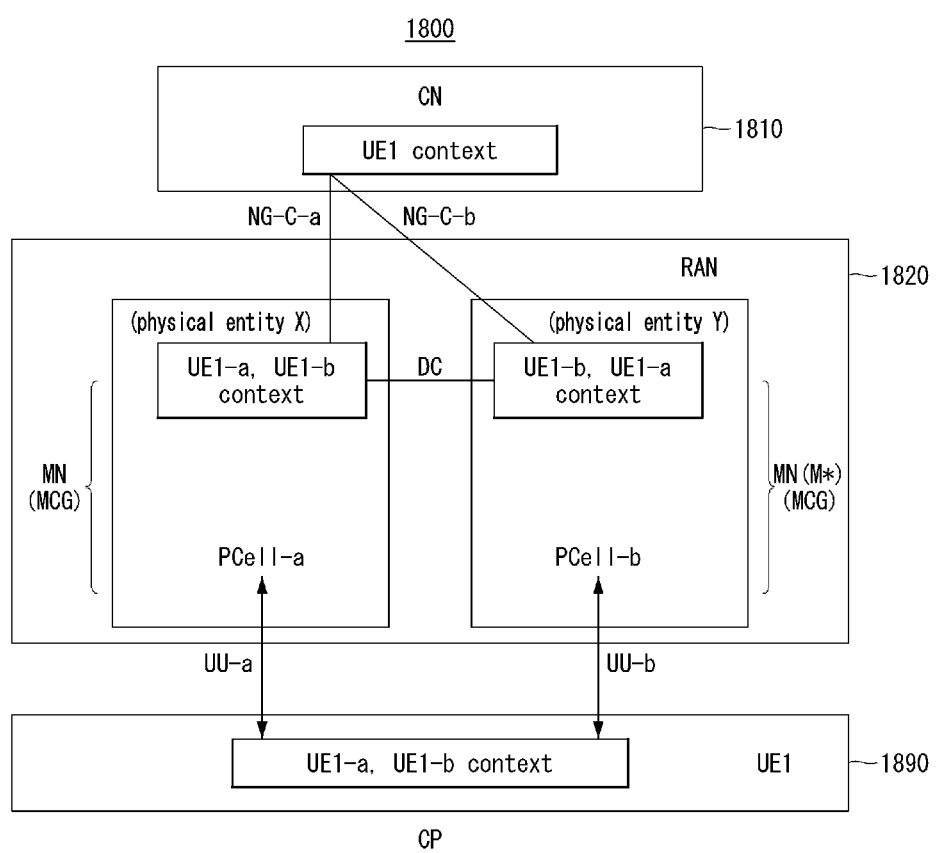

Referring to FIG. 18C, the authority cell for the UE 1890 may be changed from the PCell-a of the first communication node to the PCell-b of the second communication node based on the third joint operation scheme. In other words, the authority possessed by the PCell-a may be transferred to the PCell-b. In this case, the second communication node forming the PCell-b, which has become the authorized cell, may be regarded as being configured as an authority node MN*. The situation shown in FIG. 18C may be regarded as having a symmetrical relationship with the situation shown in FIG. 18B. Among the NG-C-a and NG-C-b, only the NG-C-b connected to the second communication node, which is the authority node, may be operated for transmission and reception of CP packets. The NG-C-a connected to the first communication node, which is not the authority node, may be regarded as being preliminarily configured and on standby.

Figure 18D:
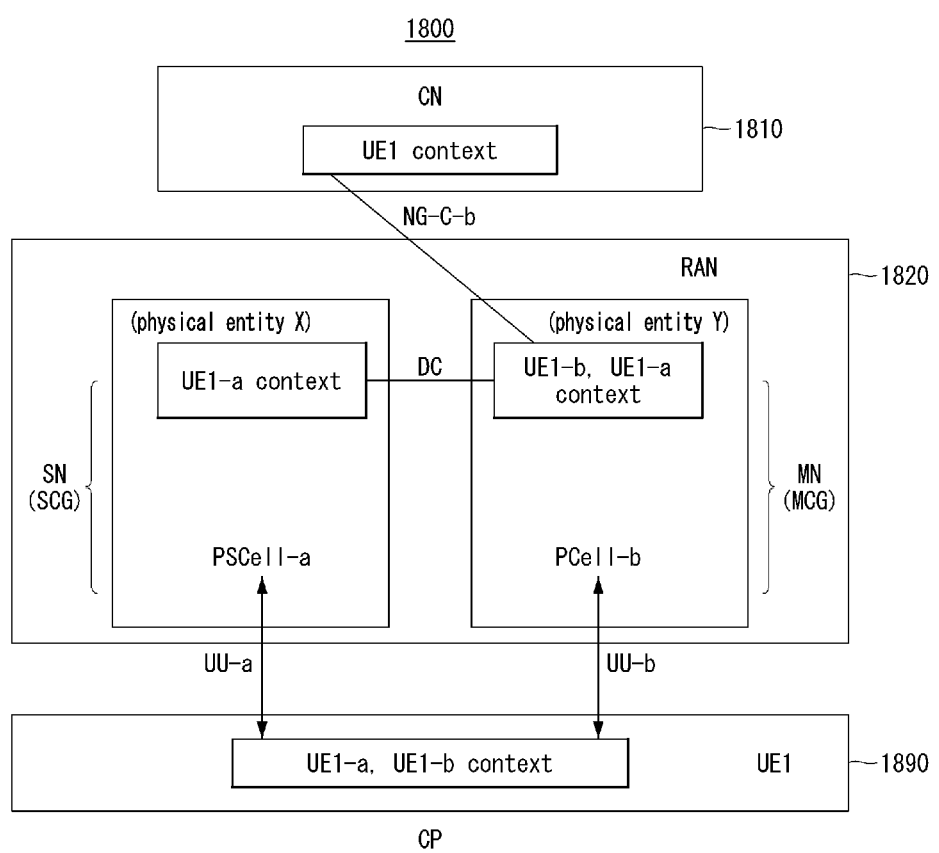

Referring to FIG. 18D, based on a decision or request of the PCell-b configured as the authority cell or the second communication node configured as the authority node MN*, the first cell may transition from the PCell-a to a PSCell-a. Accordingly, the first communication node may be regarded as transitioning from the MN to an SN. In addition, a set of cells for the UE 1890 formed by the first communication node transitioned to the SN may be referred to as an SCG. The NG-C-a between the CN 1810 and the first communication node and the UE1-a context included in the first communication node may be removed or released. The situation shown in FIG. 18D may be regarded as having a symmetrical relationship with the situation shown in FIG. 18A.

FIGS. 19A to 19H are conceptual diagrams for describing exemplary embodiments of a UP interface configuration according to the third joint operation scheme.

Referring to FIGS. 19A-19H, a communication system 1900 may include a CN 1910 and a RAN 1920. The communication system 1900, CN 1910, and RAN 1920 may be the same as or similar to the communication system 1700, CN 1710, and RAN 1720 described with reference to FIGS. 17A-17D. The communication system 1900 may support the second exemplary embodiment of the cell operation method. Hereinafter, in describing the exemplary embodiments of the UP interface configuration according to the third joint operation scheme with reference to FIGS. 19A to 19H, descriptions overlapping with those described with reference to FIGS. 1 to 18D may be omitted.

Figure 19A:
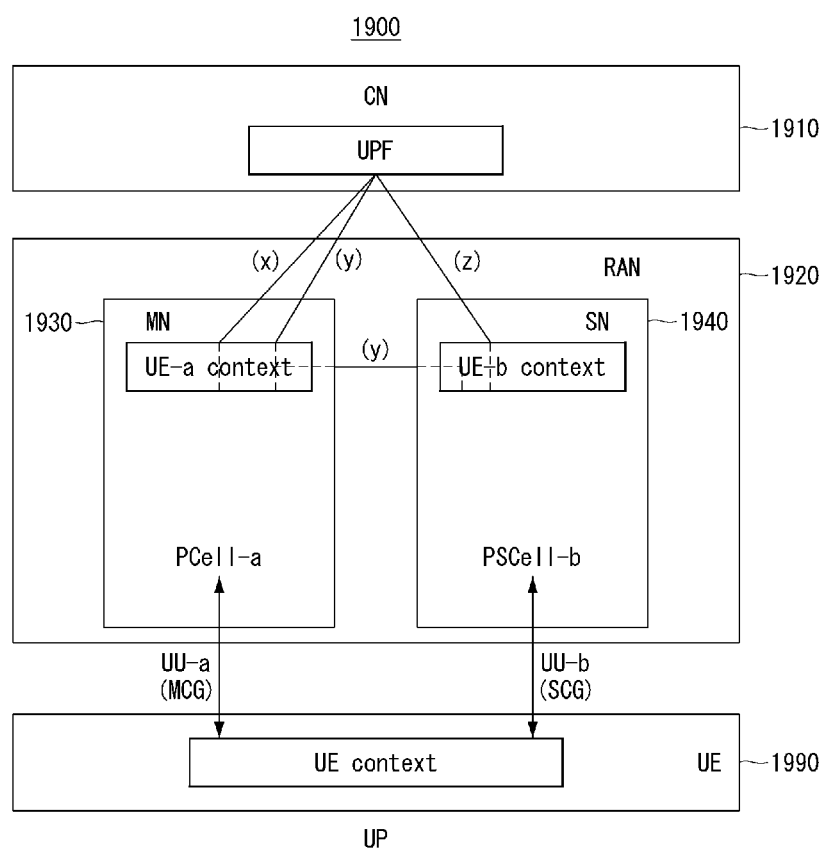
FIGS. 19A to 19H are conceptual diagrams for describing exemplary embodiments of a UP interface configuration according to the third joint operation scheme.

Referring to FIG. 19A, a first cell formed by a first communication node 1930 may be configured as a PCell-a for a UE 1990, and a second cell formed by a second communication node 1940 may be configured as a PSCell-a for the UE 1990. This may be the same as or similar to the situation described with reference to FIG. 17A or FIG. 18A. The following interfaces may be configured in the communication system 1900.

NG-U(x): Interface for user data packets transmitted on a first path. Here, the first path may refer to a path composed of a UPF of the CN 1910, a UU-a of the first communication node 1930, and the UE 1990 with respect to the PCell-a. This may be configured between the UPF of CN 1910 and the first communication node 1930. Hereinafter, this may be referred to as (x).

NG-U(y): Interface for user data packets split and transmitted through the first path or a second path in the RAN 1920. Here, the second path may refer to a path composed of the UPF of the CN 1910, the first communication node 1930, a UU-b of the second communication node 1940, and the UE 1990 with respect to the PCell-a. This may be configured between the UPF of CN 1910 and the first communication node 1930. Hereinafter, this may be referred to as (y-c) or (y).

Xn-U(y): Interface for user data packets split and transmitted through the first path or the second path in the RAN 1920. In some cases, an interface such as X2-U (y) may replace the Xn-U(y). This may be configured between the first communication node 1930 and the second communication node 1940. Hereinafter, this may be referred to as (y-r) or (y). That is, (y-c) and (y-r) may be collectively referred to as (y).

NG-U(z): Interface for user data packets transmitted on a third path. Here, the third path may refer to a path composed of the UPF of the CN 1910, the UU-b of the second communication node 1940, and the UE 1990 with respect to the PCell-a. This may be configured between the UPF of CN 1910 and the second communication node 1940. Hereinafter, this may be referred to as (z).

Figure 19B:
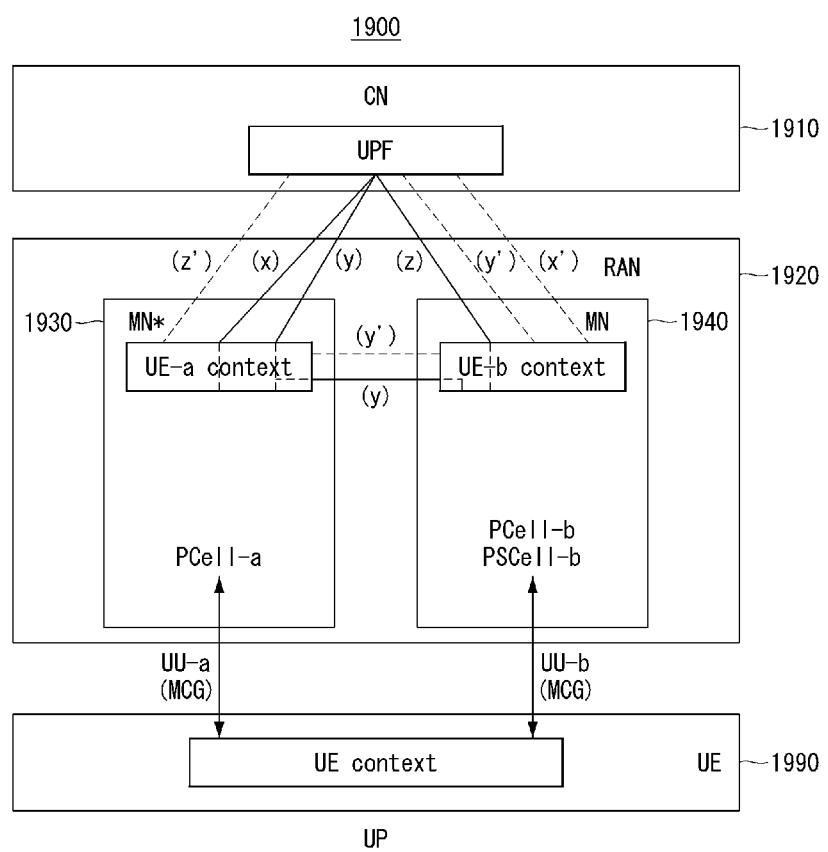

Referring to FIG. 19B, the second cell formed by the second communication node 1940 may transition from the PSCell-b to a PCell-b depending on a case, and the second communication node 1940 may transition from the SN to an MN depending on a case. This may be the same as or similar to the situation described with reference to FIG. 17B or FIG. 18B. In this case, the following interfaces may be additionally configured in the communication system 1900.

NG-U(x'): Interface for user data packets transmitted on a fourth path. Here, the fourth path may refer to a path composed of the UPF of the CN 1910, the UU-b of the second communication node 1940, and the UE 1990 based on the PCell-b. This may be configured between the UPF of CN 1910 and the second communication node 1940. Hereinafter, this may be referred to as (x').

NG-U(y'): Interface for user data packets split and transmitted through the fourth path or a fifth path in the RAN 1920. Here, the fifth path may refer to a path composed of the UPF of the CN 1910, the second communication node 1940, the UU-a of the first communication node 1930, and the UE 1990 with respect to the PCell-b. This may be configured between the UPF of the CN 1910 and the second communication node 1940. Hereinafter, this may be referred to as (y'-c) or (y').

Xn-U(y'): Interface for user data packets split and transmitted through the fourth path or the fifth path in the RAN 1920. In some cases, an interface such as X2-U (y') may replace the Xn-U(y'). This may be configured between the first communication node 1930 and the second communication node 1940. Hereinafter, this may be referred to as (y'-r) or (y'). That is, (y'-c) and (y'-r) may be collectively referred to as (y').

NG-U(z'): Interface for user data packets transmitted on a sixth path. Here, the sixth path may refer to a path composed of the UPF of the CN 1910, the UU-a of the first communication node 1940, and the UE 1990 with respect to the PCell-b. This may be configured between the UPF of CN 1910 and the second communication node 1940. Hereinafter, this may be referred to as (z').

Among the first to sixth paths, data packets may be transmitted and received through only the first to third paths with respect to the PCell-a, which is an authority cell. In other words, only (x), (y) and (z) among (x), (y), (z), (x'), (y') and (z') may be activated. In this case, (x'), (y'), and (z') may be regarded as being preliminarily configured and on standby.

Figure 19C:
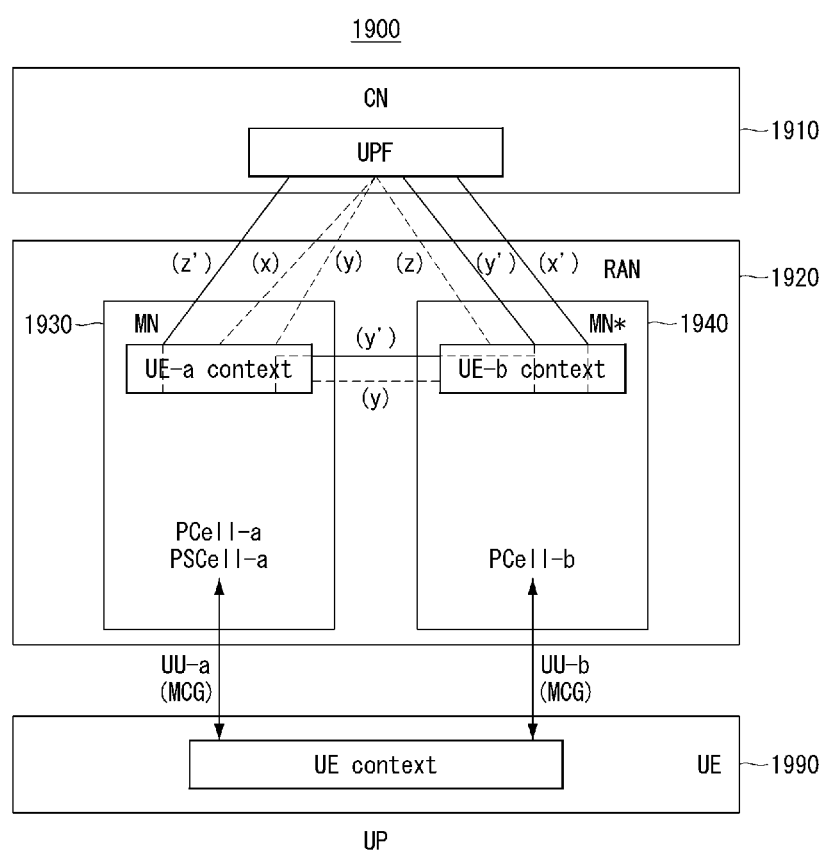

Referring to FIG. 19C, the authority cell for the UE 1990 may be changed from the PCell-a formed by the first communication node 1930 to the PCell-b formed by the second communication node 1940 depending on a case. In this case, the second communication node forming the PCell-b, which has become the authority cell, may be regarded as being configured an authority node MN*. Depending on circumstances, the first cell formed by the first communication node 1930 may transition from the PCell-a to a PSCell-a. This may be the same as or similar to the situation described with reference to FIG. 17C or FIG. 18C.

Among the first to sixth paths, data packets may be transmitted and received through only the fourth to sixth paths with respect to the PCell-b, which is the authority cell. In other words, only (x'), (y') and (z') among (x), (y), (z), (x'), (y') and (z') may be activated. In this case, (x), (y), and (z) may be regarded as being preliminarily configured and on standby.

Figure 19D:
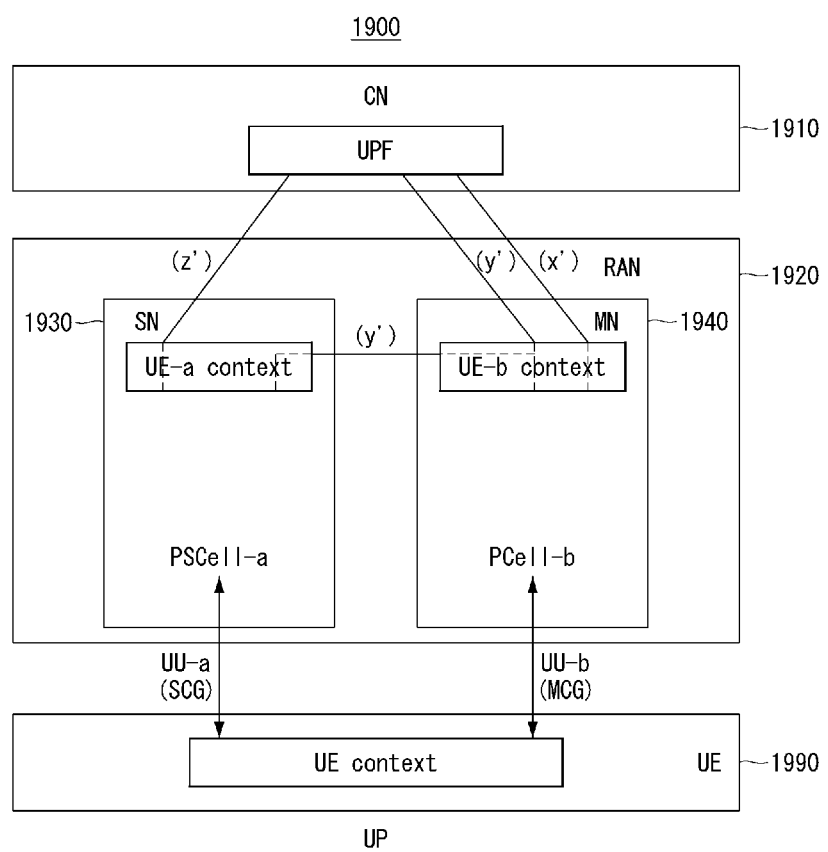

Referring to FIG. 19D, the first communication node 1930 may be regarded as transitioning to an SN, and the first cell may be regarded as transitioning to the PSCell-a. This may be the same as or similar to the situation described with reference to FIG. 17D or FIG. 18D. In this case, (x), (y), and (z) corresponding to the first to third paths based on the existing first cell may be removed or released.

Figure 19E:
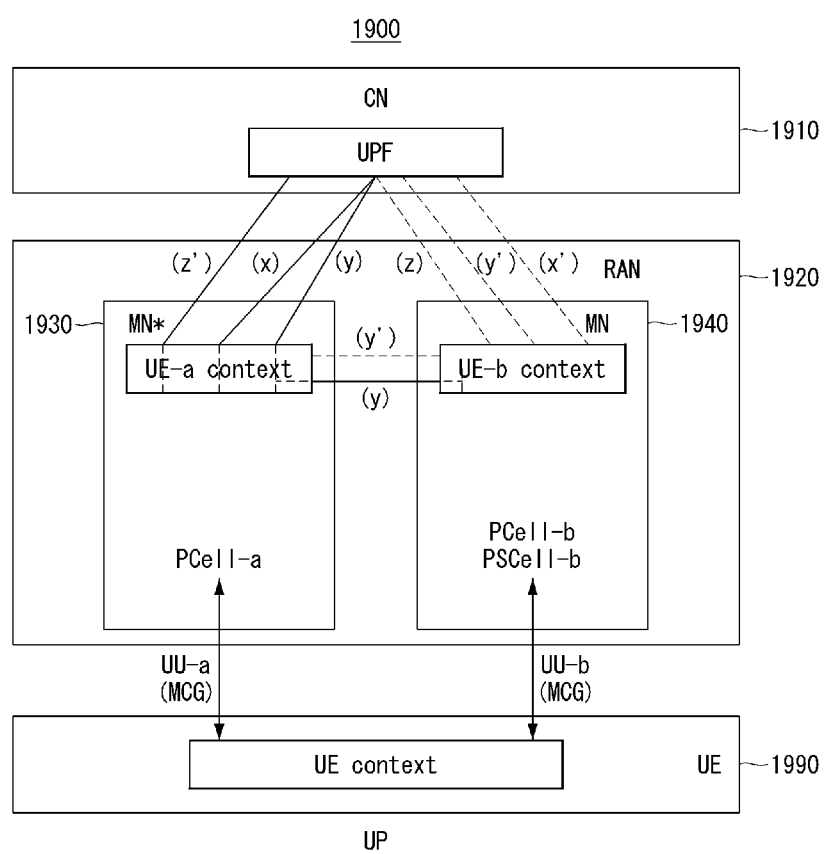

Referring to FIG. 19E, in a situation where the first cell formed by the first communication node 1930 is configured as an authority cell as shown in FIG. 1930, transmission and reception of data packets between the CN 1910 and the RAN 1920 may be performed only through the first communication node 1930. For example, when data transmission/reception between the CN 1910 and the second communication node 1940 is not smooth, the paths through the interfaces between the CN 1910 and the second communication node 1940 may not be used.

Specifically, data packets may be transmitted and received through the first, second, and sixth paths. In other words, data packets may not be transmitted and received through the third, fourth, and fifth paths. In this case, (x), (y) and (z') may be activated, and (z), (x') and (y') may be deactivated.

Figure 19F:
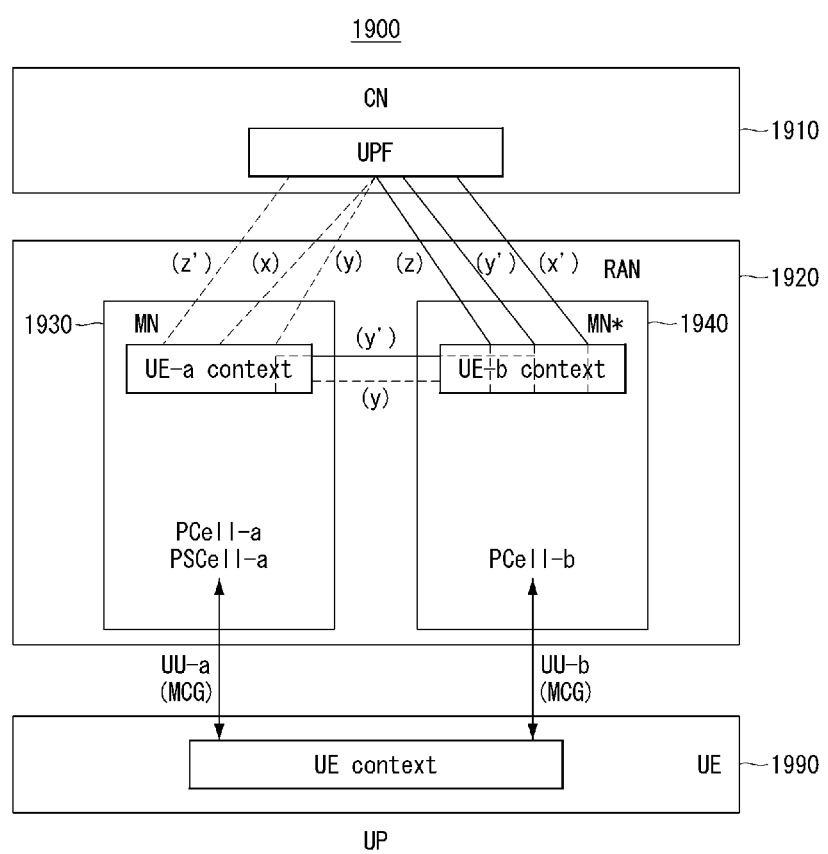

Referring to FIG. 19F, in a situation where the second cell formed by the second communication node 1940 is configured as an authority cell as shown in FIG. 1930, transmission and reception of data packets between the CN 1910 and the RAN 1920 may be performed only through the second communication node 1940. For example, when data transmission/reception between the CN 1910 and the first communication node 1930 is not smooth, the paths through the interfaces between the CN 1910 and the first communication node 1930 may not be used.

Specifically, data packets may be transmitted and received through the third, fourth, and fifth paths. In other words, data packets may not be transmitted and received through the first, second, and sixth paths. In this case, (z), (x') and (y') may be activated, and (x), (y) and (z') may be deactivated. The situation shown in FIG. 19F may be regarded as having a symmetrical relationship with the situation shown in FIG. 19E.

Figure 19G:
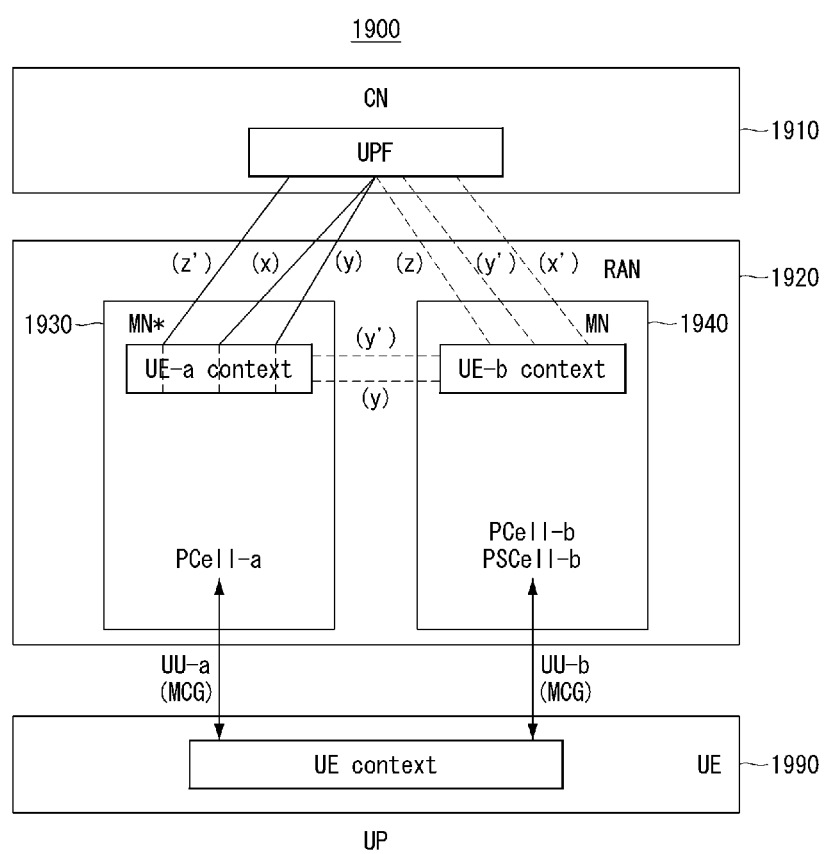

Referring to FIG. 19G, data packets may not be transmitted/received through the second path in the same or similar situation as that of FIG. 19E. As a result, data packets may be transmitted and received only through the first communication node 1930. For example, when the second cell or MCG formed by the second communication node 1940 is unstable, paths through the second communication node 1940 may not be used.

Specifically, data packets may be transmitted and received through the first and sixth paths passing only through the first communication node 1930. In other words, data packets may not be transmitted and received through the second, third, fourth, and fifth paths passing the second communication node 1940. In this case, (x) and (z') may be activated, and (z), (x') and (y') may be deactivated.

Here, (y-c) between the CN 1910 and the first communication node 1930 may be activated, and (y-r) between the first communication node 1930 and the second communication node 1940 may be deactivated. For example, DL data packets transmitted from the CN 1910 through (y-c) may be transmitted to the UE 1990 through the first path without being split toward the second communication node 1940.

Figure 19H:
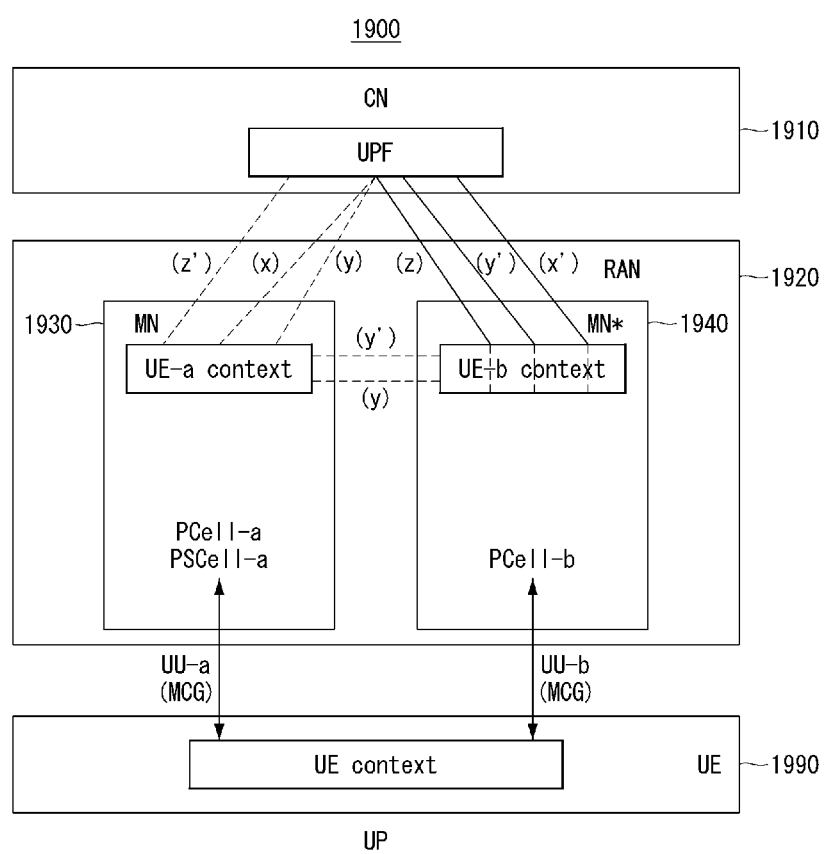

Referring to FIG. 19H, data packets may not be transmitted/received through the fourth path in the same or similar situation as that of FIG. 19F. Thus, data packets may be transmitted and received only through the second communication node 1940. For example, when the first cell or MCG formed by the first communication node 1930 is unstable, paths through the second communication node 1940 may not be used.

Specifically, data packets passing only through the second communication node 1940 may be transmitted and received through the third and fourth paths. In other words, data packets may not be transmitted and received through the first, second, fifth, and sixth paths passing through the first communication node 1930. In this case, (z) and (x') may be activated, and (x), (y) and (z') may be deactivated.

Here, (y'-c) between the CN 1910 and the second communication node 1940 may be activated, and (y'-r) between the first communication node 1930 and the second communication node 1940 may be deactivated. That is, DL data packets transmitted from the CN 1910 through (y'-c) may be transmitted to the UE 1990 through the fourth path without being split toward the first communication node 1940. The situation shown in FIG. 19H may be regarded as having a symmetrical relationship with the situation shown in FIG. 19G. FIGS. 20A to 20L are sequence charts illustrating exemplary embodiments of a cell operation method according to the first joint operation scheme.

Referring to FIGS. 20A to 20L, a communication system 2000 may support the second exemplary embodiment of the cell operation method. Communication nodes constituting the communication system 2000 may support at least the first joint operation scheme (i.e., CN-based joint operation scheme) in the second exemplary embodiment of the cell operation method. The communication system 2000 may include a UE 2001, a first cell 2003, a second cell 2005, and a CN 2007. The first cell 2003 may be formed by a first communication node and may be referred to as a PCell-a. The second cell 2005 may be formed by a second communication node and may be referred to as a PCell-b. The communication system 2000, the UE 2001, the first and second cells 2003 and 2005, and the CN 2007 may be the same as or similar to the communication system 1200, the UE 1290, and the PCells (1231, 1251) and CN 1210 described with reference to FIG. 12.

Hereinafter, in describing the exemplary embodiments of the cell operation method according to the first joint operation scheme with reference to FIGS. 20A to 20L, descriptions overlapping those described with reference to FIGS. 1 to 19H may be omitted.

Figure 20A:
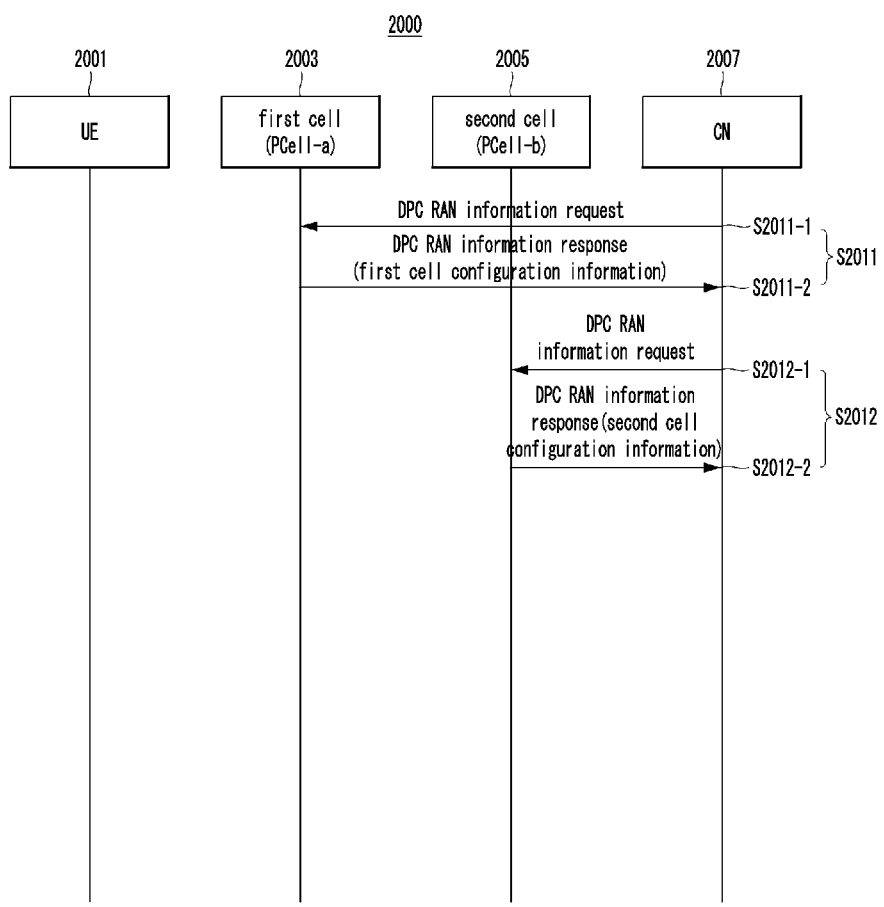

Referring to FIG. 20A, the CN 2007 and the first cell 2003 may perform a signaling procedure for first cell configuration information (S2011). The CN 2007 may transmit a signal requesting transmission of first cell configuration information to the first cell 2003 (S2011-1). The first cell 2003 may transmit first cell configuration information to the CN 2007 as a response to the signal received in the step S2011-1 (S2011-2).

Meanwhile, the CN 2007 and the second cell 2005 may perform a signaling procedure for second cell configuration information (S2012). The CN 2007 may transmit a signal requesting transmission of second cell configuration information to the second cell 2005 (S2012-1). The second cell 2005 may transmit second cell configuration information to the CN 2007 as a response to the signal received in the step S2012-1 (S2012-2).

Here, the first cell configuration information and the second cell configuration information may include at least some of the information groups described with reference to FIGS. 7A and 7B. For example, the first cell configuration information and the second cell configuration information may include at least some of the identification information corresponding to each of the first cell 2003 and the second cell 2005, MCG radio information, MCG RAN-CN information, SCG radio information, SCG RAN-CN information, or RAN-RAN information. The first cell configuration information may be referred to as 'Configuration PCell-a'. The second cell configuration information may be referred to as 'Configuration PCell-b'. The first cell configuration information and the second configuration information may include information on interfaces configured between the first cell 2003, the second cell 2005, the UE 2001, and the CN 2007. Alternatively, the first cell configuration information and the second configuration information may include information for configuring the interfaces between the first cell 2003, the second cell 2005, the UE 2001, and the CN 2007.

Based on the signaling procedures according to the steps S2011 and S2012, the CN 2007 may obtain information for joint operations of the first cell 2003 or first communication node and the second cell 2005 or second communication node. The information obtained through the steps S2011 and S2012 may be utilized for the CN 2007 to perform the joint operations according to at least some of FIGS. 20B to 20L.

The signal requesting transmission of the first cell configuration information in the step S2011-1 and the signal requesting transmission of the second cell configuration information in the step S2012-1 may be included in a 'dual PCell coordination (DCF) RAN information request' transmitted through an NG-C. The first cell configuration information in the step S2011-2 and the second cell configuration information in the step S2012-2 may be included in a 'DPC RAN information response' transmitted through the NG-C.

Figure 20B:
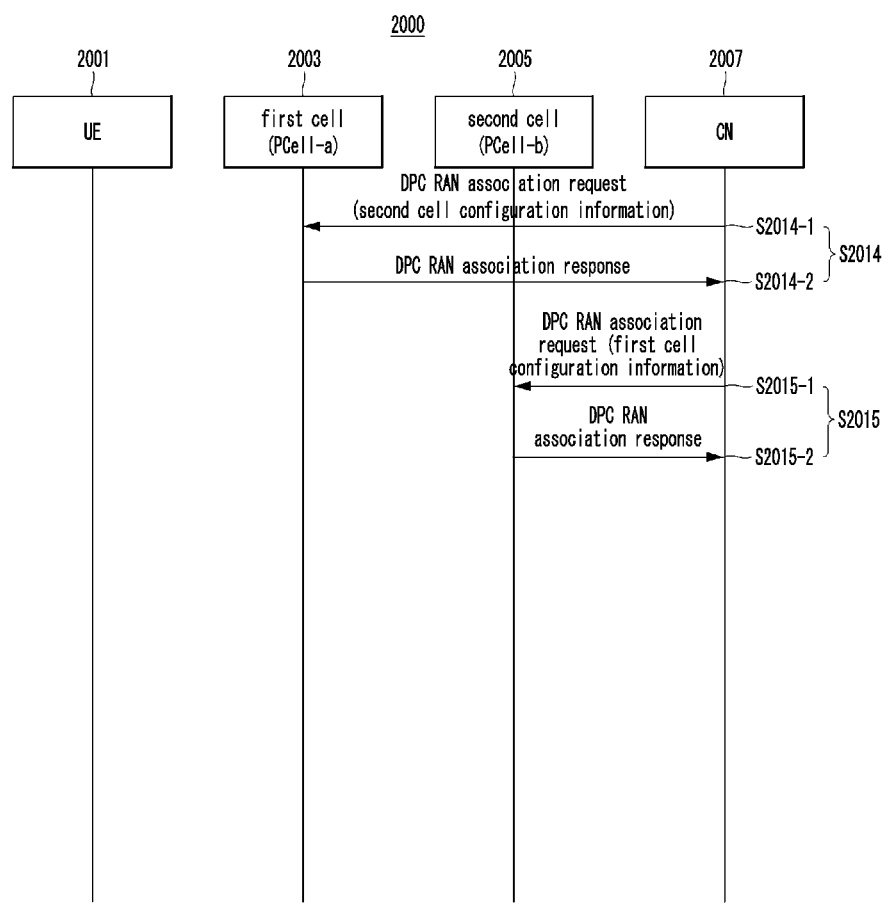

Referring to FIG. 20B, the CN 2007 and the first cell 2003 may perform a signaling procedure for the second cell configuration information (S2014). Through this, the first cell 2003 may identify that the first cell 2003 and the second cell 2005 are to be jointly operated by the CN 2007, and obtain information on the second cell 2005.

Specifically, the CN 2007 may transmit a signal including all or part of the second cell configuration information obtained through the step S2012 to the first cell 2003 (S2014-1). The first cell 2003 may transmit a response to the signal received in the step S2014-1 to the CN 2007 (S2014-2).

Meanwhile, the CN 2007 and the second cell 2005 may perform a signaling procedure for the first cell configuration information (S2015). Through this, the second cell 2005 may identify that the first cell 2003 and the second cell 2005 are to be jointly operated by the CN 2007, and obtain information on the first cell 2003.

Specifically, the CN 2007 may transmit a signal including all or part of the first cell configuration information obtained through the step S2011 to the second cell 2005 (S2015-1). The second cell 2005 may transmit a response to the signal received in the step S2015-1 to the CN 2007 (S2015-2).

Based on the step S2014-1 or the step S2015-1, the CN 2007 may configure one of the first cell 2003 and the second cell 2005 as an authority cell. For example, the signals transmitted in the steps S2014-1 and S2015-1 may include at least some of information indicating that the first cell 2003 and the second cell 2005 are to be jointly operated by the CN 2007, or information indicating the authority cell for joint operations of the first cell 2003 and the second cell 2005.

The signals transmitted in the steps S2014-1 and S2015-1 each may be included in a 'DPC RAN association request' transmitted through the NG-C. The responses transmitted in the steps S2014-2 and S2015-2 each may be included in a 'DPC RAN association response' transmitted through the NG-C.

Figure 20C:
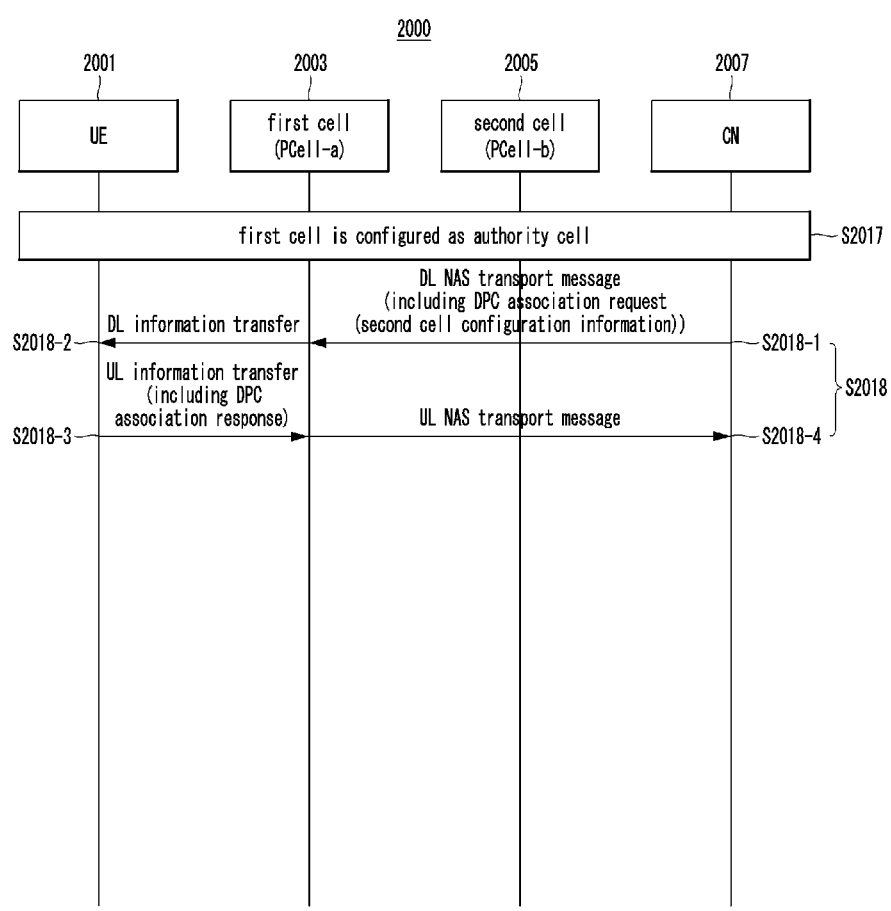

Referring to FIG. 20C, in an exemplary embodiment of the communication system 2000, the first cell 2003 may be configured as an authority cell (S2017). In other words, the first communication node forming the first cell 2003 may be configured as an authority node MN*. Here, the CN 2007 and the UE 2001 may perform a signaling procedure for the second cell configuration information through the first cell 2003. Through this, the UE 2001 may identify that the first cell 2003 and the second cell 2005 are to be jointly operated by the CN 2007, and may obtain information on the second cell 2005.

Specifically, the CN 2007 may transmit all or part of the second cell configuration information obtained through the step S2012 to the first cell 2003 (S2018-1). The first cell 2003 may transmit the information received in the step S2018-1 to the UE 2001 (S2018-2). The UE 2001 may transmit a response to the information received in the step S2018-2 to the first cell 2003 (S2018-3). The first cell 2003 may transmit the response received in the step S2018-3 to the CN 2007 (S2018-4).

The information transmitted in the steps S2018-1 and S2018-2 each may be included in a 'DPC association request' or 'NAS DPC association request', which is a non-access stratum (NAS) message. The responses transmitted in the steps S2018-3 and S2018-4 each may be included in a 'DPC association response' or 'NAS DPC association response', which is a NAS message. In the step S2018-1, the DPC association request may be included in a 'DL NAS transport message' transmitted through the NG-C. In the step S2018-2, the DPC association request may be included in an RRC message 'DL information transfer' (e.g., DLInformationTransfer). In the step S2018-3, the DPC association response may be included in an RRC message 'UL information transfer' (e.g., ULInformationTransfer). In the step S2018-4, the DPC association response may be included in a 'UL NAS transport message' transmitted through the NG-C.

Referring to FIG. 20D, in an exemplary embodiment of the communication system 2000, the second cell 2005 may be configured as an authority cell (S2019). In other words, the second communication node forming the second cell 2005 may be configured as an authority node MN*. Here, the CN 2007 and the UE 2001 may perform a signaling procedure for the first cell configuration information through the second cell 2005. Through this, the UE 2001 may identify that the first cell 2003 and the second cell 2005 are to be jointly operated by the CN 2007, and may obtain information on the first cell 2003.

Specifically, the CN 2007 may transmit all or part of the first cell configuration information obtained through the step S2011 to the second cell 2005 (S2020-1). The second cell 2005 may transmit the information received in the step S2020-1 to the UE 2001 (S2020-2). The UE 2001 may transmit a response to the information received in the step S2020-2 to the second cell 2005 (S2020-3). The second cell 2005 may transmit the response received in the step S2020-3 to the CN 2007 (S2020-4).

The information transmitted in the steps S2020-1 and S2020-2 each may be included in a DPC association request. The responses transmitted in the steps S2020-3 and S2020-4 each may be included in a DPC association response. In the step S2020-1, the DPC association request may be included in a DL NAS transport message. In the step S2020-2, the DPC association request may be included in a DL information transfer message (e.g., DLInformationTransfer). In the step S2020-3, the DPC association response may be included in a UL information transfer message (e.g., ULInformationTransfer). In the step S2020-4, the DPC association response may be included in a UL NAS transport message.

The configurations described with reference to FIG. 20D may be symmetrical to the configurations described with reference to FIG. 20C. Hereinafter, configurations described for a situation in which the first cell 2003 is configured as an authority cell in FIGS. 20G to 20L may be symmetrically applied to a situation in which the second cell 2005 is configured as an authority cell.

Referring to FIG. 20E, the CN 2007 and the first cell 2003 may perform a signaling procedure for information on radio signals transmitted and received by the first cell 2003 and states of respective protocols (hereinafter referred to as 'first cell measurement information') (S2022). Specifically, the CN 2007 may transmit a signal requesting a configuration for reporting the first cell measurement information to the first cell 2003 (S2022-1). The first cell 2003 may transmit a response to the signal received in the step S2022-1 to the CN 2007 (S2022-2). Thereafter, the first cell 2003 may report the first cell measurement information to the CN 2007 (S2022-3).

Meanwhile, the CN 2007 and the second cell 2005 may perform a signaling procedure for information on radio signals transmitted and received by the second cell 2005 and states of respective protocols (hereinafter referred to as 'second cell measurement information') (S2023). Specifically, the CN 2007 may transmit a signal requesting a configuration for reporting the second cell measurement information to the second cell 2005 (S2023-1). The second cell 2005 may transmit a response to the signal received in the step S2023-1 to the CN 2007 (S2023-2). Thereafter, the second cell 2005 may report the second cell measurement information to the CN 2007 (S2023-3).

The signals transmitted in the steps S2022-1 and S2023-1 may indicate what the CN 2007 requests the first cell 2003 and the second cell 2005 to report in relation to reporting of the first cell measurement information and the second cell measurement information. For example, the signals transmitted in the steps S2022-1 and S2023-1 may indicate the type of specific information to be included in the first cell measurement information and the second cell measurement information. Meanwhile, the signals transmitted in the steps S2022-1 and S2023-1 may indicate whether each of the first cell 2003 and the second cell 2005 reports the first cell measurement information and the second cell measurement information in an event-based manner or in a periodical manner. The first cell 2003 and the second cell 2005 may perform the reporting in the steps S2022-3 and S2023-3 based on the matters indicated by the signals received in the steps S2022-1 and S2023-1. For example, the reporting in the steps S2022-3 and S2023-3 may be performed on an event basis or periodically based on the matters indicated by the signals received in the steps S2022-1 and S2023-1.

Figure 20F:
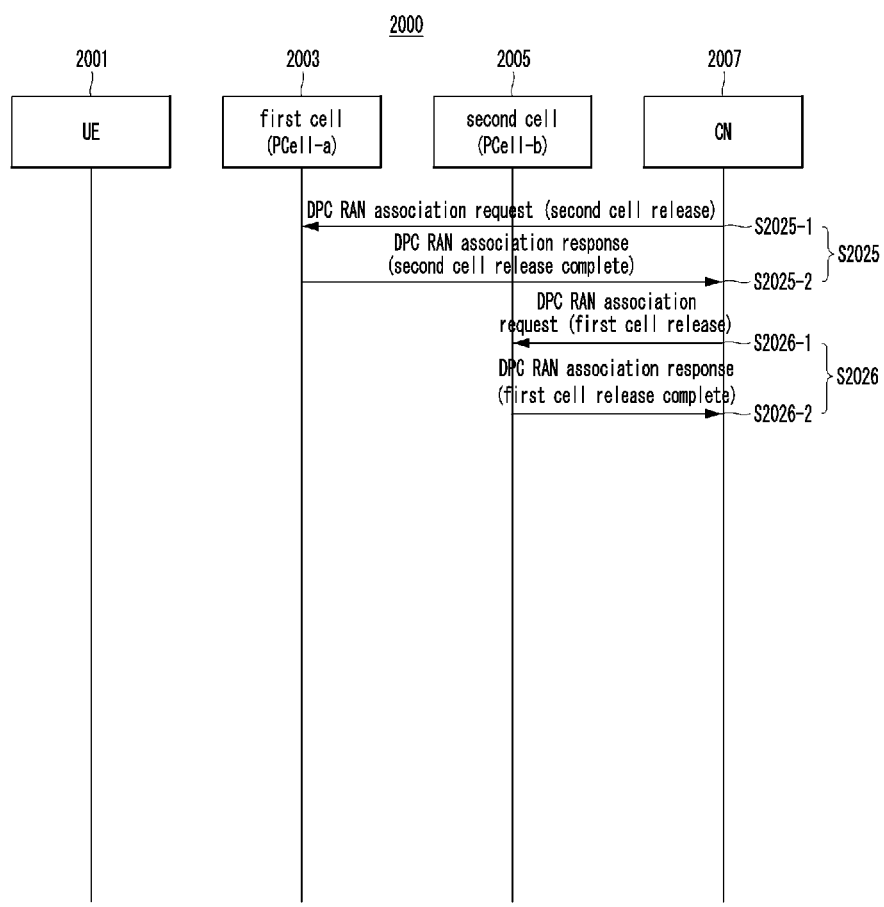

Referring to FIG. 20F, the CN 2007 and the first cell 2003 may perform a signaling procedure for termination of joint operations of the first cell 2003 and the second cell 2005 (S2025). Specifically, the CN 2007 may transmit a signal indicating release of association with the second cell 2005 to the first cell 2003 (S2025-1). The first cell 2003 may transmit a response to the signal received in the step S2025-1 to the CN 2007 (S2025-2). Through this, the first cell 2003 may identify that the association with the second cell 2005 is released. The first cell 2003 may delete information stored or configured for the second cell 2005.

Meanwhile, the CN 2007 and the second cell 2005 may perform a signaling procedure for termination of joint operations of the first cell 2003 and the second cell 2005 (S2026). Specifically, the CN 2007 may transmit a signal indicating release of association with the first cell 2003 to the second cell 2005 (S2026-1). The second cell 2005 may transmit a response to the signal received in the step S2026-1 to the CN 2007 (S2026-2). The second cell 2005 may delete information stored or configured for the first cell 2003.

The signals transmitted in the steps S2025-1 and S2026-1 may be included in a DPC RAN association request. The responses transmitted in the steps S2025-2 and S2026-2 may be included in a DPC RAN association response.

Figure 20G:
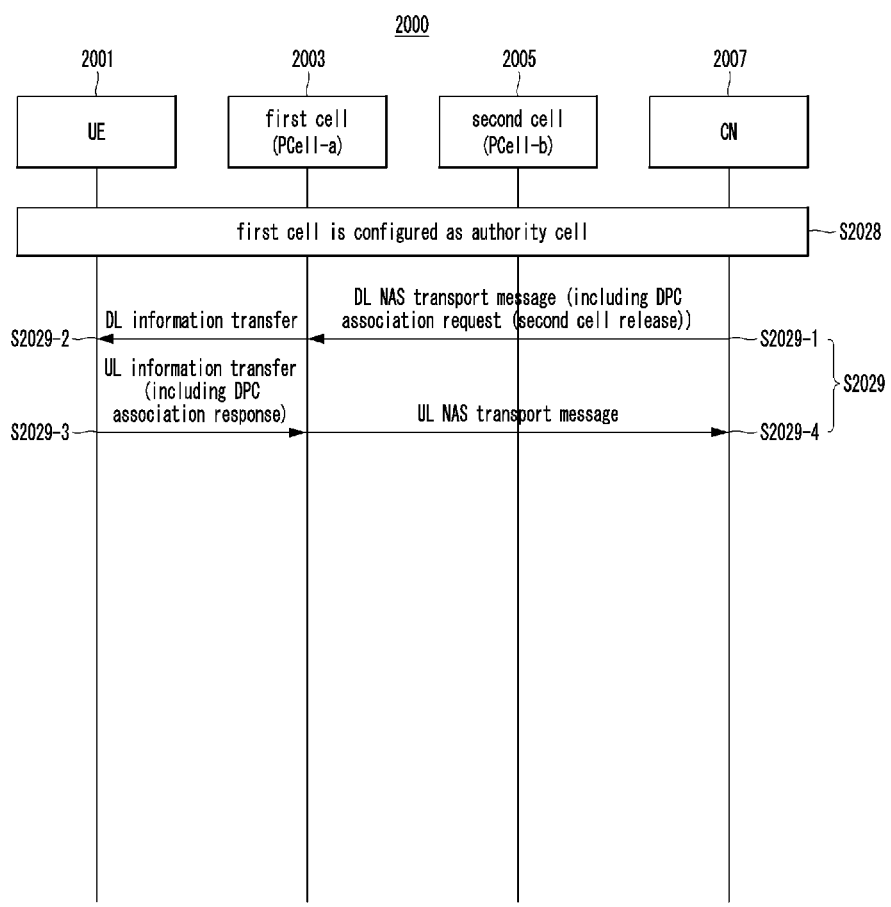

Referring to FIG. 20G, in an exemplary embodiment of the communication system 2000, the first cell 2003 may be configured as an authority cell (S2028). Here, the CN 2007 and the UE 2001 may perform a signaling procedure for information that the association between the two PCells 2003 and 2005 for the UE 2001 is released through the first cell 2003 (S2029).

Specifically, the CN 2007 may transmit information indicating that the association of the first cell 2003 with the second cell 2005 is released to the first cell 2003 (S2029-1). The first cell 2003 may transmit the information received in the step S2029-1 to the UE 2001 (S2029-2). The UE 2001 may transmit a response to the information received in the step S2029-2 to the first cell 2003 (S2029-3). The first cell 2003 may transmit the response received in the step S2029-3 to the CN 2007 (S2029-4).

The information transmitted in the steps S2029-1 and S2029-2 each may be included in a DPC association request or a NAS DPC association request. The response transmitted in the steps S2029-3 and S2029-4 each may be included in a DPC association response or a NAS DPC association response. In the step S2029-1, the DPC association request may be included in a DL NAS transport message. In the step S2029-2, the DPC association request may be included in a DL information transfer message (e.g., DLInformationTransfer). In the step S2029-3, the DPC association response may be included in a UL information transfer message (e.g., ULInformationTransfer). In the step S2029-4, the DPC association response may be included in a UL NAS transport message.

Hereinafter, in describing specific procedures according to the joint operations of the first cell 2003 and the second cell 2005 in the first joint operation scheme with reference to FIGS. 20H to 20L, description overlapping with those described with reference to FIGS. 1 to 20G may be omitted.

Figure 20H:
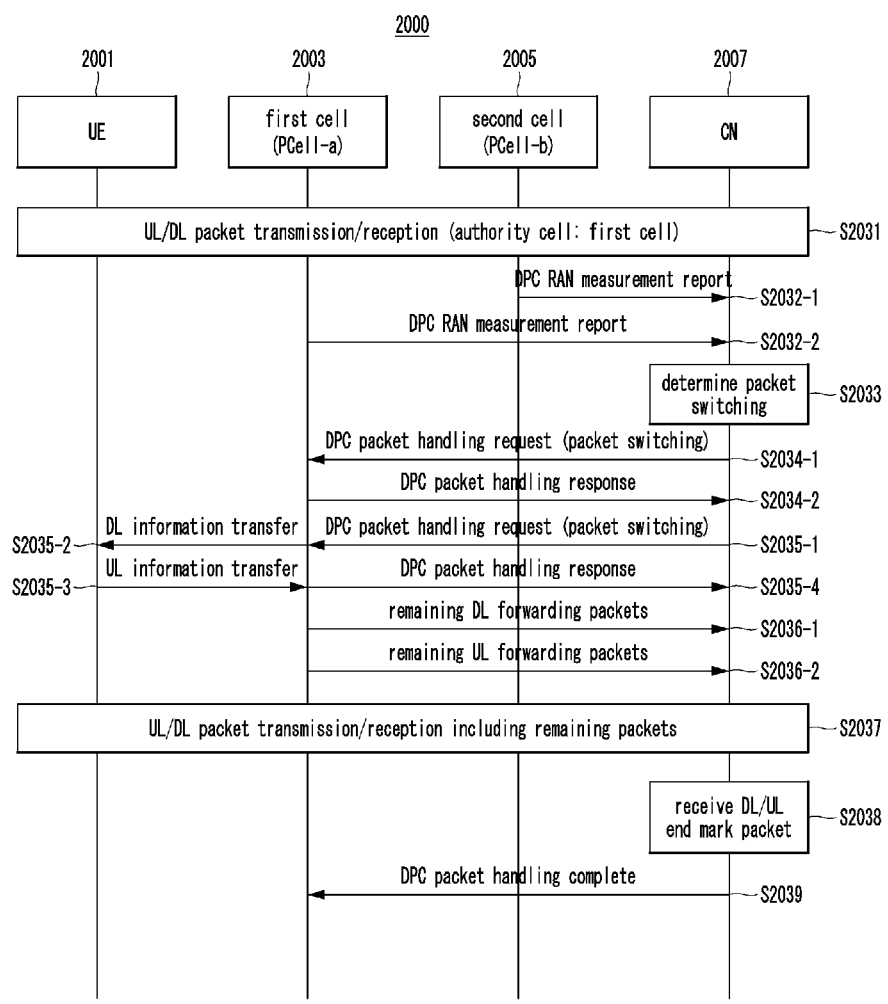

Referring to FIG. 20H, in an exemplary embodiment of the communication system 2000, UL/DL packet transmission/reception may be performed in a state where the first cell 2003 is configured as an authority cell (S2031). Here, the CN 2007 may perform a packet switching procedure through joint operations of the first cell 2003 and the second cell 2005. To this end, the second cell 2005 may report second cell measurement information to the CN 2007 (S2032-1). Also, the first cell 2003 may report first cell measurement information to the CN 2007 (S2032-2).

The CN 2007 may determine packet switching based on the information reported in the steps S2032-1 and S2032-2 (S2033). Here, the packet switching may include transmission of DL/UL packets to be transmitted through the first cell 2003 (i.e., DL/UL packets for the first cell 2003) through the second cell 2005. The packet switching may include transmission of DL/UL packets to be transmitted through the second cell 2005 (i.e., DL/UL packets for the second cell 2005) through the first cell 2003.

This may refer to controlling DL/UL packets to be transmitted through the first cell 2003 to be transmitted through the second cell 2005. For example, when the first cell 2003, which is the authority cell, is unstable or when it is determined that data communication through the second cell 2005 is more advantageous than data communication through the first cell 2003, the CN 2007 may determine to perform the packet switching.

The CN 2007 may transmit, to the first cell 2003, a signal requesting the first cell 2003 to perform packet handling according to the packet switching (S2034-1). Here, the signal transmitted in the step S2034-1 may request or instruct the CN 2007 to forward the remaining DL/UL packets that the first cell 2003 has not yet transmitted. The signal transmitted in the step S2034-1 may include information on a DL forwarding tunnel ID configured for the remaining DL packets forwarded from the first cell 2003 to the CN 2007 (hereinafter, remaining DL forwarding packets), and information on a UL forwarding tunnel ID configured for the remaining UL packets forwarded from the first cell 2003 to the CN 2007 (hereinafter, remaining UL forwarding packets). The first cell 2003 may transmit a response to the signal received in the step S2034-1 to the CN 2007 (S2034-2). Here, the response transmitted in the step S2034-2 may indicate whether the first cell 2003 accepts the packet handling request of the CN 2007.

In the step S2034-2, when the first cell 2003 accepts the packet handling request of the CN 2007, the CN 2007 may transmit a signal requesting the UE 2001 to perform packet handling according to the packet switching to the first cell 2003 (S2035-1). The first cell 2003 may transmit the signal received in the step S2035-1 to the UE 2001 (S2035-2). The signals transmitted in the steps S2035-1 and S2035-2 may request or instruct the UE 2001 to transmit UL packets to be transmitted through the first cell 2003 through the second cell 2005. The UE 2001 may transmit a response to the signal received in the step S2035-2 to the first cell 2003 (S2035-3). The first cell 2003 may transmit the response received in the step S2035-3 to the CN 2007 (S2035-4).

The first cell 2003 may perform packet handling according to the packet switching. Specifically, the first cell 2003 may transmit the remaining DL forwarding packets to the CN 2007 (S2036-1). Also, the first cell 2003 may transmit the remaining UL forwarding packets to the CN 2007 (S2036-2). Here, the first cell 2003 may transmit the remaining DL forwarding packets and the remaining UL forwarding packets to the CN 2007 based on the DL forwarding tunnel ID and the UL forwarding tunnel ID obtained in the step S2034-1. The UE 2001, the second cell 2005, and the CN 2007 may perform transmission and reception of UL/DL packets (S2037). Specifically, the CN 2007 or a UPF of the CN 2007 may perform DL transmission of the remaining DL forwarding packets received from the first cell 2003 to the UE 2001 through the second cell 2005. Meanwhile, the CN 2007 or the UPF of the CN 2007 may transmit the remaining UL forwarding packets received from the first cell 2003 to an upper communication node or entity. Meanwhile, the UE 2001 may perform UL transmission of the UL packets to the CN 2007 through the second cell 2005.

The first cell 2003 may transmit a DL end mark packet to the CN 2007 when the transmission of the remaining DL forwarding packets in the step S2036-1 is completed. Meanwhile, the first cell 2003 may transmit a UL end mark packet to the CN 2007 when the transmission of the remaining UL forwarding packets in the step S2036-2 is completed. The CN 2007 may receive the DL end mark packet and the UL end mark packet from the first cell 2003 (S2038). In this case, the CN 2007 may transmit a signal indicating that the packet handling according to the packet switching has been completed to the first cell 2003 (S2039).

The signal requesting the packet handling transmitted in the step S2034-1 may be included in a 'DPC packet handling request' transmitted through the NG-C. The response transmitted in the step S2034-2 may be included in a 'DPC packet handling response' transmitted through the NG-C.

The signals transmitted in the steps S2035-1 and S2035-2 each may be included in a NAS message 'NAS packet handling request'. The responses transmitted in the steps S2035-3 and S2035-4 each may be included in a NAS message 'NAS packet handling response'. In the step S2035-1, the NAS packet handling request may be included in a DL NAS transport message. In the step S2035-2, the NAS packet handling request may be included in a DL information transfer message. In the step S2035-3, the NAS packet handling response may be included in a UL information transfer message. In the step S2035-4, the NAS packet handling response may be included in a UL NAS transport message.

Referring to FIG. 20I, in an exemplary embodiment of the communication system 2000, UL/DL packet transmission/reception may be performed in a state where the first cell 2003 is configured as an authority cell (S2041). Here, the CN 2007 may perform a first packet distribution procedure through joint operations of the first cell 2003 and the second cell 2005. To this end, the second cell 2005 may report second cell measurement information to the CN 2007 (S2042-1). Also, the first cell 2003 may report first cell measurement information to the CN 2007 (S2042-2).

The CN 2007 may determine packet distribution based on the information reported in the steps S2042-1 and S2042-2 (S2043). Here, the packet distribution may mean that some of packets of the first cell 2003 are distributed to the second cell 2005. In other words, the packet distribution may mean controlling some of the DL/UL packets to be transmitted through the first cell 2003 to be transmitted through the second cell 2005. For example, when it is determined that it is desirable for the second cell 2005 to handle a part of traffic handled by the first cell 2003, which is the authority cell, the CN 2007 may determine to perform the packet distribution.

The CN 2007 may transmit, to the first cell 2003, a signal requesting to perform packet handling according to the packet distribution to the first cell 2003 (S2044-1). Here, the signal transmitted in the step S2044-1 may include information on a criterion and/or method for the CN 2007 to distribute DL packets for the first cell 2003 to the second cell 2005. The signal transmitted in the step S2044-1 may include information on a criteria and/or method for the UE 2001 to distribute UL packets for the first cell 2003 to the second cell 2005. The first cell 2003 may transmit a response to the signal received in the step S2044-1 to the CN 2007 (S2044-2). Here, the response transmitted in the step S2044-2 may indicate whether the first cell 2003 accepts the packet handling request of the CN 2007.

When the first cell 2003 accepts the packet handling request of the CN 2007 in the step S2044-2, the CN 2007 may transmit a signal requesting packet handling according to the packet distribution to the UE 2001 to the first cell 2003 (S2045-1). The first cell 2003 may transmit the signal received in the step S2045-1 to the UE 2001 (S2045-2). The signals transmitted in the steps S2045-1 and S2045-2 may include information on a criteria and/or method for the UE 2001 to distribute UL packets for the first cell 2003 to the second cell 2005. The signals transmitted in the steps S2045-1 and S2045-2 may include information on a criterion and/or method for the CN 2007 to distribute DL packets for the first cell 2003 to the second cell 2005. The UE 2001 may transmit a response to the signal received in the step S2045-2 to the first cell 2003 (S2045-3). The first cell 2003 may transmit the response received in the step S2045-3 to the CN 2007 (S2045-4)

The CN 2007 may distribute the DL packets to the first cell 2003 and the second cell 2005 (S2046). For example, the CN 2007 may divide all DL packets into a first DL packet group and a second DL packet group. The CN 2007 may transmit the first DL packet group to the first cell 2003 (S2047-1). On the other hand, the CN 2007 may transmit the second DL packet group to the second cell 2005 (S2047-2). The first cell 2003 may transmit the first DL packet group received in the step S2047-1 to the UE 2001 (S2047-3). The second cell 2005 may transmit the second DL packet group received in the step S2047-2 to the UE 2001 (S2047-4).

Meanwhile, the UE 2001 may distribute the UL packets to the first cell 2003 and the second cell 2005 (S2048). For example, the UE 2001 may divide all UL packets into a first UL packet group and a second UL packet group. The UE 2001 may transmit the first UL packet group to the first cell 2003 (S2049-1). On the other hand, the CN 2007 may transmit the second UL packet group to the second cell 2005 (S2049-2). The first cell 2003 may transmit the first UL packet group received in the step S2049-1 to the CN 2007 (S2049-3). The second cell 2005 may transmit the second UL packet group received in the step S2049-2 to the CN 2007 (S2049-4).

The signal requesting packet handling transmitted in the step S2044-1 may be included in a DPC packet handling request. The response transmitted in the step S2044-2 may be included in a DPC packet handling response. The signals transmitted in the steps S2045-1 and S2045-2 each may be included in a NAS packet handling request. The responses transmitted in the steps S2045-3 and S2045-4 each may be included in a NAS packet handling response. In the step S2045-1, the NAS packet handling request may be included in a DL NAS transport message. In the step S2045-2, the NAS packet handling request may be included in a DL information transfer message. In the step S2045-3, the NAS packet handling response may be included in a UL information transfer message. In the step S2045-4, the NAS packet handling response may be included in a UL NAS transport message.

Figure 20J:
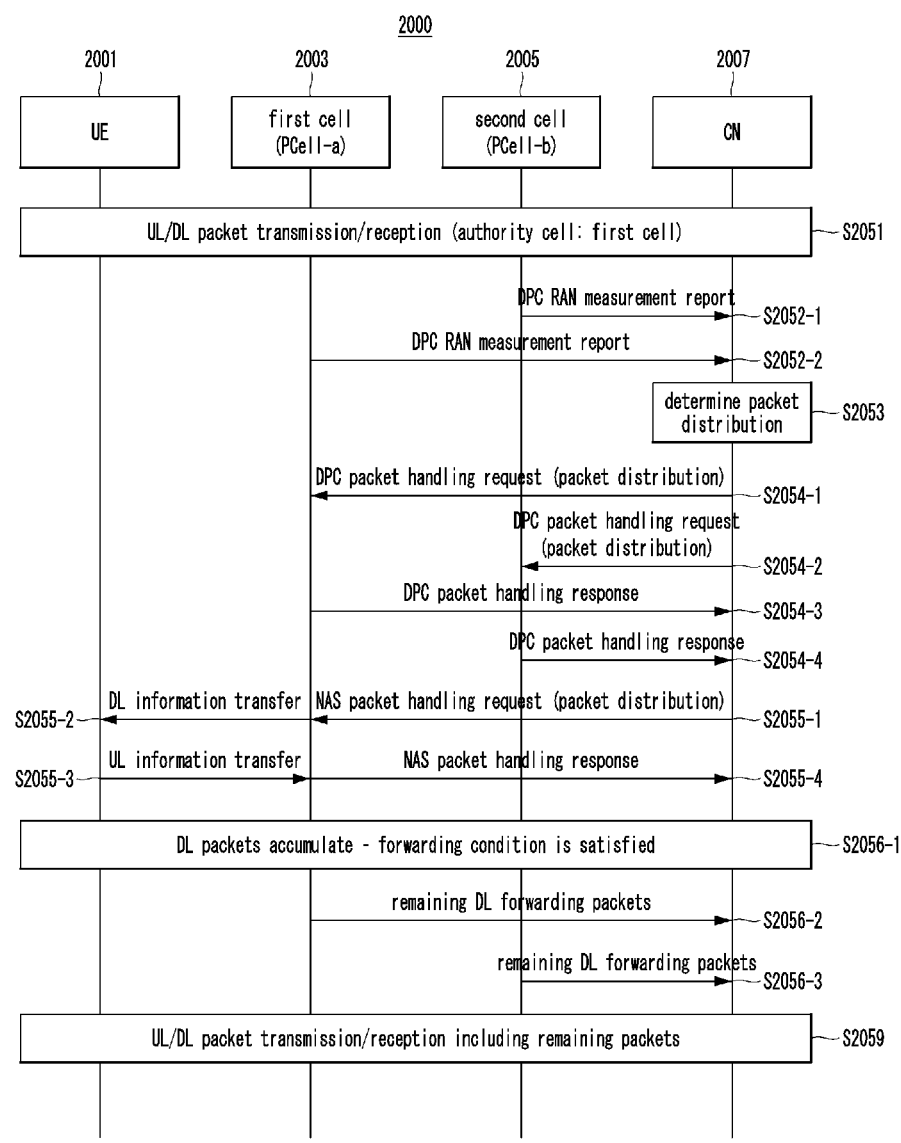

Referring to FIG. 20J, in an exemplary embodiment of the communication system 2000, UL/DL packet transmission/reception may be performed in a state where the first cell 2003 is configured as an authority cell (S2051). Here, the CN 2007 may perform a second packet distribution procedure through joint operations of the first cell 2003 and the second cell 2005. To this end, the second cell 2005 may report second cell measurement information to the CN 2007 (S2052-1). Also, the first cell 2003 may report first cell measurement information to the CN 2007 (S2052-2).

The CN 2007 may determine packet distribution based on the information reported in the steps S2052-1 and S2052-2 (S2053). Here, when one of the PCells 2003 and 2005 is unstable, the CN 2007 may determine to distribute at least some of packets of the unstable PCell to the stable PCell. For example, when one of the PCells 2003 and 2005 is unstable and DL packets are not normally transmitted and are accumulated in a buffer of the CN 2007 or the PCells 2003 and 2005, the CN 2007 may determine to trigger the packet distribution. Alternatively, when one of the PCells 2003 and 2005 is unstable and UL packets are not normally transmitted and are accumulated in a buffer of the UE 2001 or the PCells 2003 and 2005, the CN 2007 may determine to trigger the packet distribution.

Such the packet distribution may be performed when predetermined forwarding conditions are satisfied. For example, the forwarding conditions may include a first reference value for DL packet distribution and/or a second reference value for UL packet distribution. The CN 2007 may determine that the packet distribution is triggered when DL packets are accumulated to a value greater than or equal to the first reference value in the buffer of the CN 2007 or the PCells 2003 and 2005. Alternatively, the CN 2007 may determine that the packet distribution is triggered when UL packets are accumulated to a value greater than or equal to the second reference value in the buffer of the UE 2001 or the PCells 2003 and 2005.

The CN 2007 may transmit to the first cell 2003 a signal requesting packet handling according to the packet distribution to the first cell 2003 (S2054-1). In addition, the CN 2007 may transmit to the second cell 2005 a signal requesting packet handling according to the packet distribution to the second cell 2005 (S2054-2). Here, the signals transmitted in the steps S2054-1 and S2054-2 may include at least some of information on a forwarding condition for triggering packet distribution, and information on a criterion and/or method to distribute DL packets between the first cell 2003 and the second cell 2005 when the packet distribution is triggered. The first cell 2003 may transmit a response to the signal received in the step S2054-1 to the CN 2007 (S2054-3). The second cell 2005 may transmit a response to the signal received in the step S2054-2 to the CN 2007 (S2054-4). Here, the responses transmitted in the steps S2054-3 and S2054-4 may indicate whether each of the first cell 2003 and the second cell 2005 has accepted the packet handling request of the CN 2007.

When the first cell 2003 and the second cell 2005 accept the packet handling request of the CN 2007 in the steps S2054-3 and S2054-4, the CN 2007 may transmit a signal requesting the UE to perform packet handling according to the packet distribution to the first cell (2003) (S2055-1). The first cell 2003 may transmit the signal received in the step S2055-1 to the UE 2001 (S2055-2). Here, the signals transmitted in the steps S2055-1 and S2055-2 may include at least some of information on a forwarding condition for triggering packet distribution, and information on a criterion and/or method to distribute UL packets between the first cell 2003 and the second cell 2005 when the packet distribution is triggered. The UE 2001 may transmit a response to the signal received in the step S2055-2 to the first cell 2003 (S2055-3). The first cell 2003 may transmit the response received in the step S2055-3 to the CN 2007 (S2055-4).

When the forwarding condition determined in the step S2053 is satisfied, the packet distribution may be triggered. For example, when DL packets are accumulated to a value equal to or greater than the first reference value in the buffer of the CN 2007 or the PCells 2003 and 2005, the forwarding condition may be satisfied (S2056-1), and accordingly, the packet distribution may be performed. When the forwarding condition is satisfied due to the instability of the first cell 2003, the first cell 2003 may transmit remaining DL forwarding packets to the CN 2007 (S2056-2). On the other hand, when the forwarding condition is satisfied due to the instability of the second cell 2005, the second cell 2005 may transmit remaining DL forwarding packets to the CN 2007 (S2056-3). The technical features related to the transmission operation of the remaining DL forwarding packets in the steps S2056-2 and S2056-3 may be the same as or similar to the technical features related to the transmission operation of the remaining DL forwarding packets in the step S2036-1 described with reference to FIG. 20H.

Meanwhile, when UL packets are accumulated to a value equal to or greater than the second reference value in the buffer of the UE 2001 or the PCells 2003 and 2005, the forwarding condition may be satisfied, and accordingly, the packet distribution may be performed. When the forwarding condition is satisfied due to the instability of the first cell 2003, the first cell 2003 may transmit remaining UL forwarding packets to the CN 2007. On the other hand, when the forwarding condition is satisfied due to the instability of the second cell 2005, the second cell 2005 may transmit remaining UL forwarding packets to the CN 2007. The technical features related to the transmission operation of the remaining UL forwarding packets may be the same as or similar to those related to the transmission operation of the remaining UL forwarding packets in the step S2036-2 described with reference to FIG. 20H.

When the transmission of the remaining DL forwarding packets and/or remaining UL forwarding packets is performed, the UE 2001, the first cell 2003, the second cell 2005, and the CN 2007 may transmit and receive DL/UL packets according to the criterion and/or method for packet distribution indicated in the steps S2055-1 and S2055-2 (S2059). Here, the transmitted/received DL/UL packets may include the remaining DL forwarding packets and the remaining UL forwarding packets transmitted in the first cell 2003 and/or the second cell 2005. The DL packets transmitted from the CN 2007 may be distributed and downlink-transmitted between the first cell 2003 and the second cell 2005. The UL packets transmitted from the UE 2001 may be distributed and uplink-transmitted between the first cell 2003 and the second cell 2005.

The signal requesting packet handling transmitted in the steps S2054-1 and S2054-2 each may be included in a DPC packet handling request. The responses transmitted in the steps S2054-3 and S2054-4 each may be included in a DPC packet handling response. The signals transmitted in the steps S2055-1 and S2055-2 each may be included in a NAS packet handling request. The responses transmitted in the steps S2055-3 and S2055-4 each may be included in a NAS packet handling response. In the step S2055-1, the NAS packet handling request may be included in a DL NAS transport message. In the step S2055-2, the NAS packet handling request may be included in a DL information transfer message. In the step S2055-3, the NAS packet handling response may be included in a UL information transfer message. In the step S2055-4, the NAS packet handling response may be included in a UL NAS transport message.

Figure 20K:
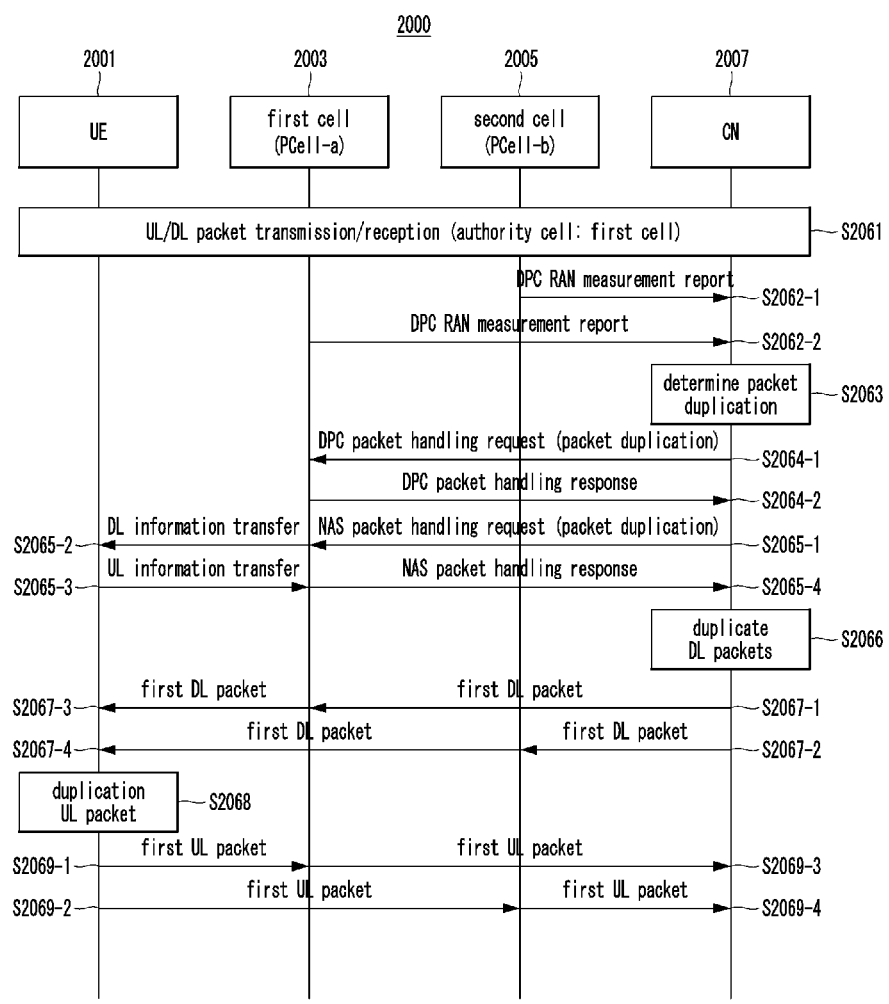

Referring to FIG. 20K, in an exemplary embodiment of the communication system 2000, UL/DL packet transmission/reception may be performed in a state where the first cell 2003 is configured as an authority cell (S2061). Here, the CN 2007 may perform a packet duplication procedure through joint operations of the first cell 2003 and the second cell 2005. To this end, the second cell 2005 may report second cell measurement information to the CN 2007 (S2062-1). Also, the first cell 2003 may report first cell measurement information to the CN 2007 (S2062-2).

The CN 2007 may determine packet duplication based on the information reported in the steps S2062-1 and S2062-2 (S2063). Here, the packet duplication may refer to control so that DL packets and/or UL packets are duplicated and transmitted to both the first cell 2003 and the second cell 2005. For example, the CN 2007 may determine to transmit the same DL/UL packet through the first cell 2003 and the second cell 2005 in order to improve packet reliability.

The CN 2007 may transmit a signal requesting the first cell 2003 to performing packet handling according to the packet duplication to the first cell 2003 (S2064-1). Here, the signal transmitted in the step S2064-1 may include information on a criterion and/or method for the CN 2007 to duplicate DL packets for the first cell 2003 and transmit them also through the second cell 2005. The first cell 2003 may transmit a response to the signal received in the step S2064-1 to the CN 2007 (S2064-2). Here, the response transmitted in the step S2064-2 may indicate whether the first cell 2003 accepts the packet handling request of the CN 2007.

The CN 2007 may transmit a signal requesting the UE 2001 to perform packet handling according to the packet duplication to the first cell 2003 (S2065-1). The first cell 2003 may transmit the signal received in the step S2065-1 to the UE 2001 (S2065-2). The signals transmitted in the steps S2065-1 and S2065-2 may include a criterion and/or method for the UE 2001 to duplicate UL packets for the first cell 2003 and transmit them also through the second cell 2005. The UE 2001 may transmit a response to the signal received in the step S2065-2 to the first cell 2003 (S2065-3). The first cell 2003 may transmit the response received in the step S2065-3 to the CN 2007 (S2065-4).

The CN 2007 may duplicate a DL packet for the first cell 2003 (hereinafter, a first DL packet) (S2066). For example, the CN 2007 may transmit the first DL packet to the first cell 2003 (S2067-1). The CN 2007 may also transmit the same first DL packet to the second cell 2005 (S2067-2). The first cell 2003 may transmit the first DL packet received in the step S2067-1 to the UE 2001 (S2067-3). The second cell 2005 may transmit the first DL packet received in the step S2067-2 to the UE 2001 (S2067-4).

Meanwhile, the UE 2001 may duplicate a UL packet for the first cell 2003 (hereinafter, a first UL packet) (S2068). For example, the UE 2001 may transmit the first UL packet to the first cell 2003 (S2069-1). The UE 2001 may also transmit the same first UL packet to the second cell 2005 (S2069-2). The first cell 2003 may transmit the first UL packet received in the step S2069-1 to the CN 2007 (S2069-3). The second cell 2005 may transmit the first UL packet received in the step S2069-2 to the CN 2007 (S2069-4).

The signal requesting packet handling transmitted in the step S2064-1 may be included in a DPC packet handling request. The response transmitted in the step S2064-2 may be included in a DPC packet handling response. The signals transmitted in the steps S2065-1 and S2065-2 each may be included in a NAS packet handling request. The responses transmitted in the steps S2065-3 and S2065-4 each may be included in a NAS packet handling response. In the step S2065-1, the NAS packet handling request may be included in a DL NAS transport message. In the step S2065-2, the NAS packet handling request may be included in a DL information transfer message. In the step S2065-3, the NAS packet handling response may be included in a UL information transfer message. In the step S2065-4, the NAS packet handling response may be included in a UL NAS transport message.

A PDCP may have a function of filtering out duplicate packets. Based on the packet duplication procedure, packets may be transmitted and received redundantly. The redundant packets transmitted and received may be filtered based on the PDCP. For example, an access stratum (AS) layer and/or a non-access stratum (NAS) layer may include the PDCP. The PDCP of the AS layer may filter out redundant packets in a single PCell radio path. The PDCP of the NAS layer may filter out redundant packets transmitted and received through multiple PCells.

Figure 20L:
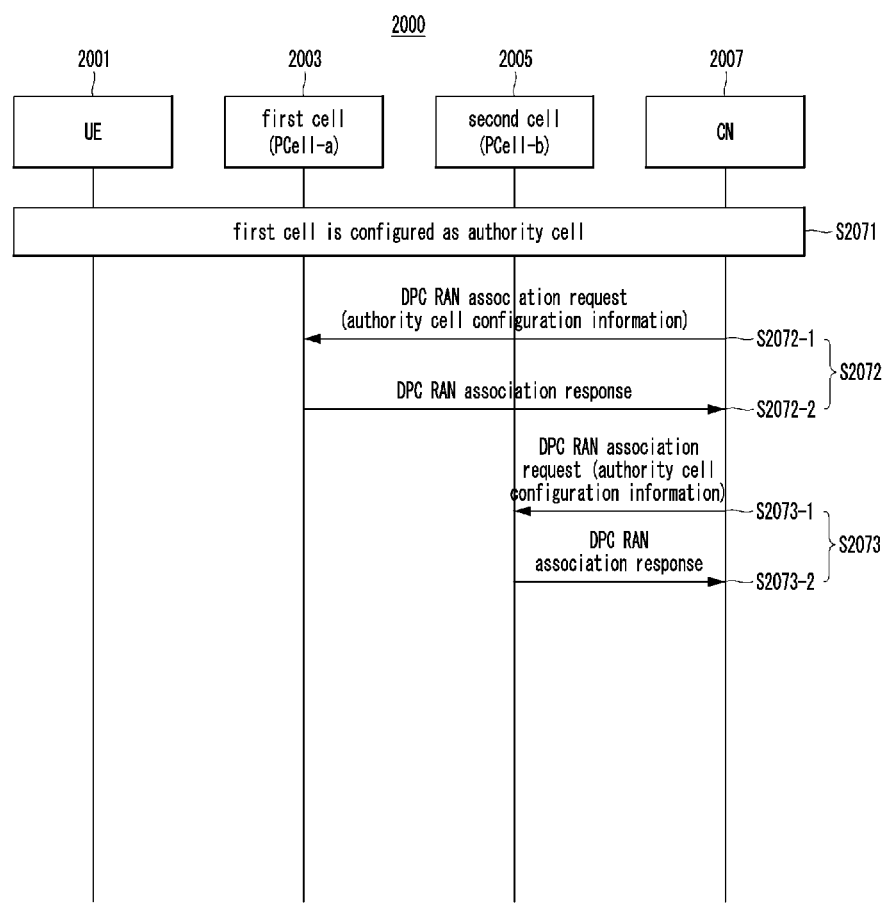

Referring to FIG. 20L, in an exemplary embodiment of the communication system 2000, the first cell 2003 may be configured as an authority cell (S2071). Here, the CN 2007 and the first cell 2003 may perform a signaling procedure for information on the authority cell (S2072). Specifically, the CN 2007 may transmit a signal including configuration information of the authority cell to the first cell 2003 (S2072-1). The first cell 2003 may transmit a response to the signal received in the step S2072-1 to the CN 2007 (S2072-2). Meanwhile, the CN 2007 and the second cell 2005 may perform a signaling procedure for information on the authority cell (S2073). Specifically, the CN 2007 may transmit a signal including configuration information of the authority cell to the second cell 2005 (S2073-1). The second cell 2005 may transmit a response to the signal received in the step S2073-1 to the CN 2007 (S2073-2). The signals transmitted in the steps S2072-1 and S2073-1 each may be included in a DPC RAN association request. The responses transmitted in the steps S2072-2 and S2073-2 each may be included in a DPC RAN association response.

The CN 2007 may inform the PCells 2003 and 2005 which cell among the PCells 2003 and 2005 configured for the UE 2001 corresponds to an authority cell through the steps S2072 and S2073. For example, when the CN 2007 wants to maintain the first cell 2003 as the authority cell, the configuration information of the authority cell transmitted in the steps S2072-1 and S2073-1 may include configuration information of the first cell 2003. On the other hand, when the CN 2007 wants to change the authority cell to the second cell 2005, the configuration information of the authority cell transmitted in the steps S2072-1 and S2073-1 may include configuration information of the second cell 2005.

In an exemplary embodiment of the cell operation method according to the first joint operation scheme, the first cell 2003, which is a PCell connected to the UE 2001 and the CN 2007, may receive, from the CN 2007, a first signal including configuration information of the second cell 2005, which is a PCell connected to the UE 2001 and the CN 2007. Based on the first signal, the first cell 2003 may identify that the first cell 2003 and the second cell 2005 are jointly operated by the CN 2007 as coordinative PCells. This may be the same as or similar to those described with reference to FIG. 20B.

The first cell 2003 may transmit, to the UE 2001, a second signal including information on joint operations of the coordinate PCells by the CN 2007. Through this, the UE 2001 may identify that the first cell 2003 and the second cell 2005 are jointly operated by the CN 2007 as the coordinative PCells. This may be the same as or similar to those described with reference to FIG. 20C.

When joint operations of the first cell 2003 and the second cell 2005, which are coordinative PCells, are performed, a first CP interface may be configured between the CN 2007 and the first cell 2003, and a second CP interface may be configured between the CN 2007 and the second cell 2005. The first cell 2003 may perform communication with the CN 2007 and the UE 2001 based on joint operations of the coordinative PCells by the CN 2007. This may be the same as or similar to those described with reference to FIGS. 20E to 20L.

FIG. 21A to 21I are sequence charts for describing exemplary embodiments of a cell operation method to the second joint operation scheme.

Referring to FIGS. 21A to 21I, a communication system 2100 may support the second exemplary embodiment of the cell operation method. Communication nodes constituting the communication system 2100 may support at least the second joint operation scheme (i.e., RAN-based joint operation scheme) in the second exemplary embodiment of the cell operation method. The communication system 2100 may include a UE 2101, a first cell 2103, a second cell 2105, and a CN 2107. The first cell 2103 may be formed by a first communication node and may be referred to as a PCell-a. The second cell 2105 may be formed by a second communication node and may be referred to as a PCell-b. The communication system 2100, the UE 2101, the first and second cells 2103 and 2105, and the CN 2107 may be the same as or similar to the communication system 1200, the UE 1290, the PCells 1231 and 1251, and the CN 210 described with reference to FIG. 12, respectively. An interface DPC IF may be configured between the first cell 2103 and the second cell 2105. In an exemplary embodiment of the communication system 2100, a CP interface (e.g., Xn-C, X2-C, etc.) directly connecting the first cell 2103 and the second cell 2105 may correspond to the DPC IF. This may be the same as or similar to those described with reference to FIGS. 15A and 15B. On the other hand, in another exemplary embodiment of the communication system 2100, the CP interface directly connecting the first cell 2103 and the second cell 2105 may not be configured. In this case, the DPC IF may be relayed through a CP interface (e.g., S1-C, NG-C, etc.) connecting a UPF of the CN 2107 and the PCells 2103 and 2105. This may be the same as or similar to those described with reference to FIGS. 14A and 14B. Hereinafter, based on a situation in which the DPC IF is not configured to directly connect the first cell 2103 and the second cell 2105 but is configured to be relayed through the CN 2107, in describing the exemplary embodiments of the cell operation method according to the second joint operation scheme, description overlapping with those described with reference to FIGS. 1 to 20L may be omitted.

Figure 21A:
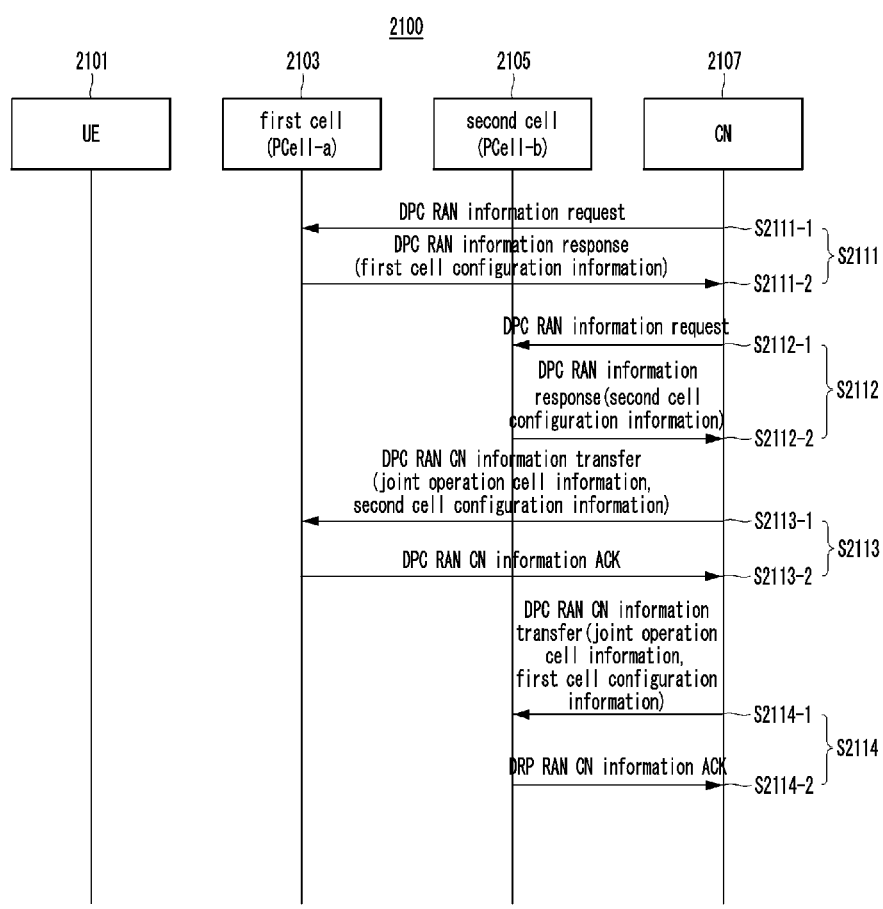
FIG. 21A to 21I are sequence charts for describing exemplary embodiments of a cell operation method to the second joint operation scheme.

Referring to FIG. 21A, the CN 2107 and the first cell 2103 may perform a signaling procedure for first cell configuration information (S2111). The CN 2107 may transmit a signal requesting transmission of first cell configuration information to the first cell 2103 (S2111-1). The first cell 2103 may transmit first cell configuration information to the CN 2107 as a response to the signal received in the step S2111-1 (S2111-2).

Meanwhile, the CN 2107 and the second cell 2105 may perform a signaling procedure for second cell configuration information (S2112). The CN 2107 may transmit a signal requesting transmission of second cell configuration information to the second cell 2105 (S2112-1). The second cell 2105 may transmit second cell configuration information to the CN 2107 as a response to the signal received in the step S2112-1 (S2112-2).

The CN 2107 and the first cell 2103 may perform a signaling procedure for information for joint operations (S2113). Specifically, the CN 2107 may transmit at least some of information indicating the cells to be jointly operated (e.g., the first cell 2103 and the second cell 2105) and the second cell configuration information obtained through the step S2112 to the first cell 2103 (S2113-1). The first cell 2103 may transmit a response to the signal received in the step S2113-1 to the CN 2107 (S2113-2).

Meanwhile, the CN 2107 and the second cell 2105 may perform a signaling procedure for information for joint operations (S2114). Specifically, the CN 2107 may transmit at least some of information indicating the cells to be jointly operated (e.g., the first cell 2103 and the second cell 2105) and the first cell configuration information obtained through the step S2111 to the second cell 2105 (S2114-1). The second cell 2105 may transmit a response to the signal received in the step S2114-1 to the CN 2107 (S2114-2).

The signals transmitted in the steps S2111-1 and S2112-1 each may be included in a DPC RAN information request. The signals transmitted in the steps S2111-2 and S2112-2 each may be included in a DPC RAN information response. The signals transmitted in the steps S2113-1 and S2114-1 each may be included in a DPC RAN CN information transfer transmitted through an NG-C. The responses transmitted in the steps S2113-2 and S2114-2 each may be included in a DPC RAN CN information acknowledgement (ACK) transmitted through the NG-C.

Figure 21B:
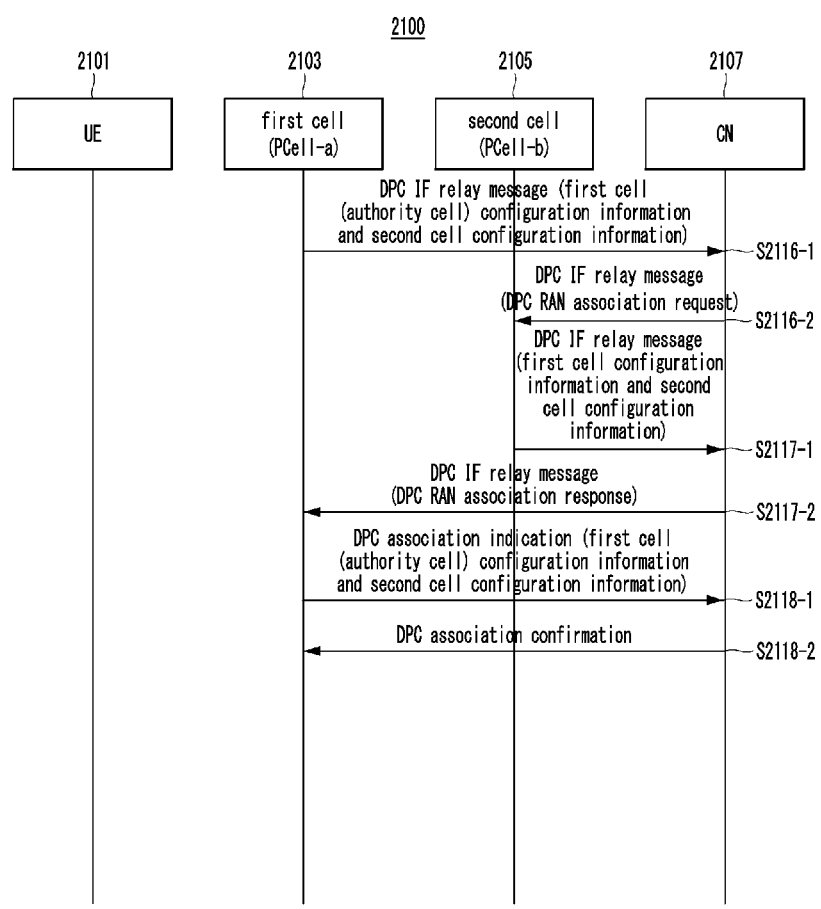

Referring to FIG. 21B, according to the second joint operation scheme, the first cell 2103 may perform a signaling procedure informing that it is to be an authority cell. Specifically, the first cell 2103 may transmit, to the CN 2107, a relay signal informing the second cell 2105 that it intends to become an authority cell for joint operations of the PCells including the first cell 2103 and the second cell 2105. In other words, the first cell 2103 may transmit, to the CN 2107, a relay signal requesting the second cell 2105 to approve itself as an authority cell for joint operations of the PCells including the first cell 2103 and the second cell 2105. The CN 2107 may transmit the relay signal received in the step S2116-1 to the second cell 2105 (S2116-2). The relay signal transmitted in the steps S2116-1 and S2116-2 may include at least some of configuration information of the PCells 2103 and 2105 to be jointly operated, and information specifying the PCell (i.e., the first cell 2103) desiring to become an authority cell.

Based on the relay signal received in the step S2116-2, the second cell 2105 may identify that the first cell 2103 desires to be an authority cell for joint operations of the PCells including the first cell 2103 and the second cell 2105. In other words, the second cell 2105 may identify that the first cell 2103 has requested to approve the first cell 2103 as an authority cell for joint operations of the PCells including the first cell 2103 and the second cell 2105. The second cell 2105 may transmit a response to the relay signal received in the step S2116-2 to the CN 2107 (S2117-1). The CN 2107 may transmit the response received in the step S2117-1 to the first cell 2103 (S2117-2). The responses transmitted in the steps S2117-1 and S2117-2 may indicate whether the second cell 2105 approves the request of the first cell 2103. The responses transmitted in the steps S2117-1 and S2117-2 may include at least some of configuration information of the PCells 2103 and 2105 to be jointly operated, which are designated by the first cell 2103, and information specifying the PCell (i.e., first cell 2103) desiring to become an authority cell.

When the second cell 2105 approves the request of the first cell 2103, the first cell 2103 may transmit to the CN 2017 a signal indicating that the first cell 2103 becomes an authority cell for joint operations for the PCells including the first cell 2103 and the second cell 2105 (S2118-1). The signal transmitted in the step S2118-1 may include at least some of configuration information of the PCells 2103 and 2105 to be jointly operated and information specifying the PCell (i.e., the first cell 2103) desiring to become an authority cell. The CN 2107 may transmit to the first cell 2103 a signal indicating that it has confirmed what the signal received in the step S2118-1 indicates (S2118-2).

Through the steps S2116-1 to S2118-2, the first cell 2103 may be determined as an authority cell for joint operations of the PCells 2103 and 2105 including the first cell 2103 and the second cell 2105. In addition, through the steps S2116-1 to S2118-2, the second cell 2105 and the CN 2107 may identify that the first cell 2103 is determined as an authority cell.

The relay signals transmitted in the steps S2116-1 and S2116-2 each may be included in a DPC RAN association request. The responses transmitted in the steps S2117-1 and S2117-2 each may be included in a DPC RAN association response. The relay signals and responses transmitted in the steps S2116-1 to S2117-2 each may be included in a DPC IF relay message transmitted through the NG-C. The DPC IF relay message may be used when the CN 2107 relays signaling between the PCells 2103 and 2105 constituting the RAN. The signal transmitted in the step S2118-1 may be included in a DPC association indication transmitted through the NG-C. The signal transmitted in the step S2118-2 may be included in a DPC association confirmation transmitted through the NG-C.

Figure 21C:
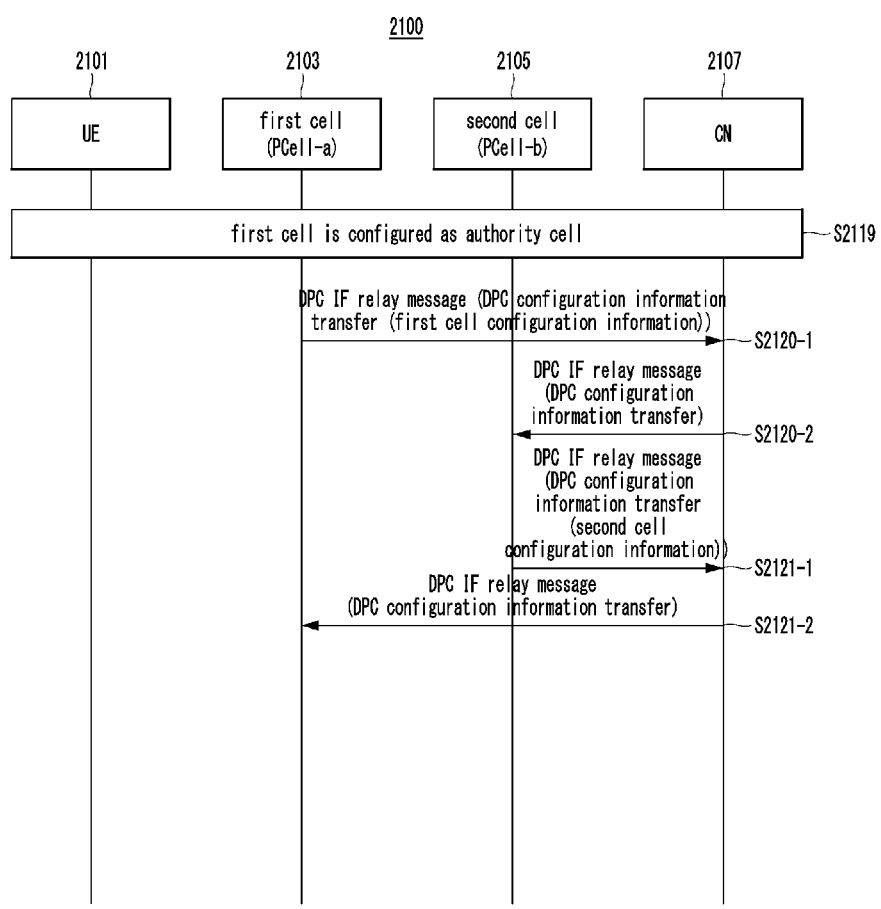

Referring to FIG. 21C, in an exemplary embodiment of the communication system 2100, the first cell 2103 may be configured as an authority cell (S2119). Here, when the configuration information of the first cell 2103 or the second cell 2105 is changed, a signaling procedure for the changed configuration information may be performed.

Specifically, when the configuration information of the first cell 2103 (i.e., first cell configuration information) is changed, the first cell 2103 may transmit to the CN 2017 a relay signal including the changed first cell configuration information or information on changes in the first cell configuration information (S2120-1). The CN 2107 may transmit the relay signal received in the step S2120-1 to the second cell 2105 (S2120-2). Through this, the second cell 2105 may identify the changed first cell configuration information. In some cases, the CN 2107 may also identify the changed first cell configuration information based on the relay signal received in the step S2120-1.

Meanwhile, when the configuration information of the second cell 2105 (i.e., second cell configuration information) is changed, the second cell 2105 may transmit to the CN 2107 a relay signal including the changed second cell configuration information or information on changes in the second cell configuration information (S2121-1). The CN 2107 may transmit the relay signal received in the step S2121-1 to the first cell 2103 (S2121-2). Through this, the first cell 2103 may identify the changed second cell configuration information. In some cases, the CN 2107 may also identify the changed second cell configuration information based on the relay signal received in the step S2120-1.

The relay signals transmitted in the steps S2120-1 to S2121-2 each may be included in a DPC configuration information transfer message transmitted through the NG-C. The DPC configuration information transfer messages transmitted in the steps S2120-1 to S2121-2 each may be included in a DPC IF relay message.

Figure 21D:
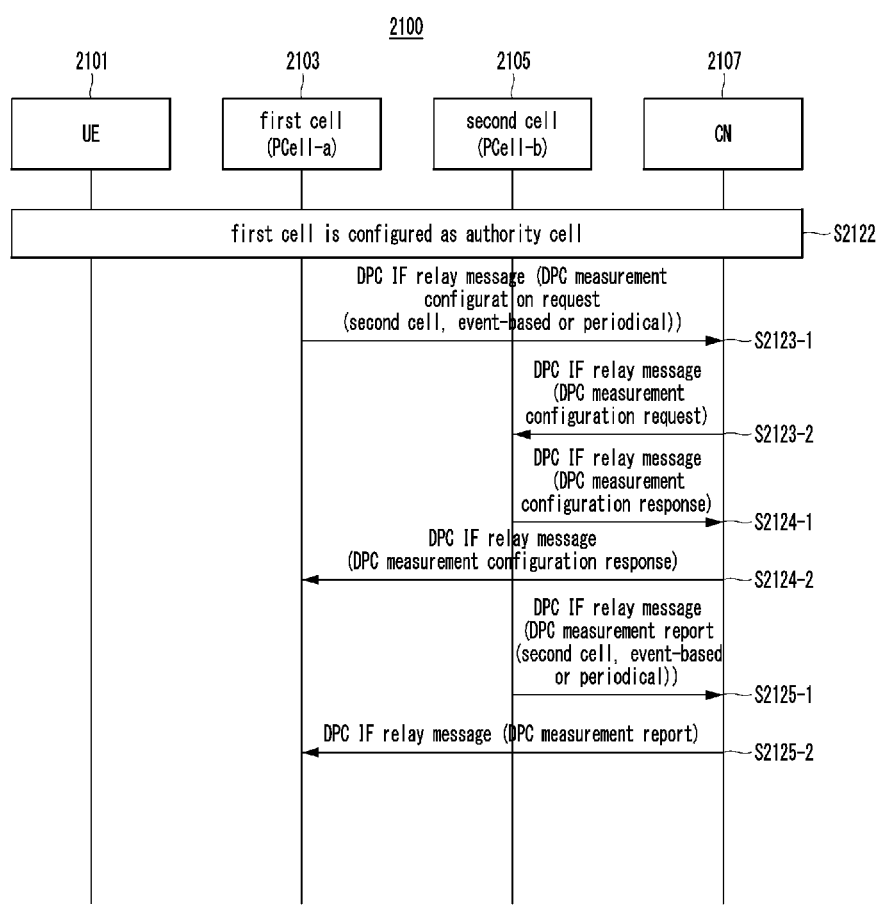

Referring to FIG. 21D, in an exemplary embodiment of the communication system 2100, the first cell 2103 may be configured as an authority cell (S2122). Here, a signaling procedure may be performed to allow the second cell 2105 to report the second cell measurement information to the first cell 2103 that is the authority cell.

Specifically, the first cell 2103 may transmit a relay signal requesting a configuration for reporting the second cell measurement information to the CN 2107 (S2123-1). The CN 2107 may transmit the relay signal received in the step S2123-1 to the second cell 2105 (S2123-2). The second cell 2105 may transmit a response to the signal received in the step S2123-2 to the CN 2107 (S2124-1). The CN 2107 may transmit the response received in the step S2124-1 to the first cell 2103 (S2124-2).

Thereafter, the second cell 2105 may report the second cell measurement information to the first cell 2103 through the CN 2107. Specifically, the second cell 2105 may transmit the second cell measurement information to the CN 2107 (S2125-1). The CN 2107 may transmit the second cell measurement information received in the step S2125-1 to the first cell 2103 (S2125-2).

The relay signal transmitted in the steps S2123-1 and S2123-2 may indicate items requested by the first cell 2103 to the second cell 2105 in relation to reporting of the second cell measurement information. For example, the signals transmitted in the steps S2123-1 and S2123-2 may indicate the type of specific information that the second cell measurement information should include. Meanwhile, the relay signals transmitted in the steps S2123-1 and S2123-2 may indicate whether the second cell 2105 reports the second cell measurement information based on an event or periodically. The second cell 2105 may report as in the step S2125-1 based on the items indicated by the relay signal received in the step S2123-2. For example, the second cell measurement information for reporting in the step S2125-1 may be transmitted on an event basis or periodically based on the items indicated by the relay signal received in the step S2123-2.

The relay signals transmitted in the steps S2123-1 and S2123-2 each may be included in a DPC measurement configuration request. The responses transmitted in the steps S2124-1 and S2124-2 each may be included in a DPC measurement configuration response. The second cell measurement information transmitted in the steps S2125-1 and S2125-2 each may be included in a DPC measurement report. The signals transmitted in the steps S2123-1 to S2125-2 each may be included in a DPC IF relay message.

Figure 21E:
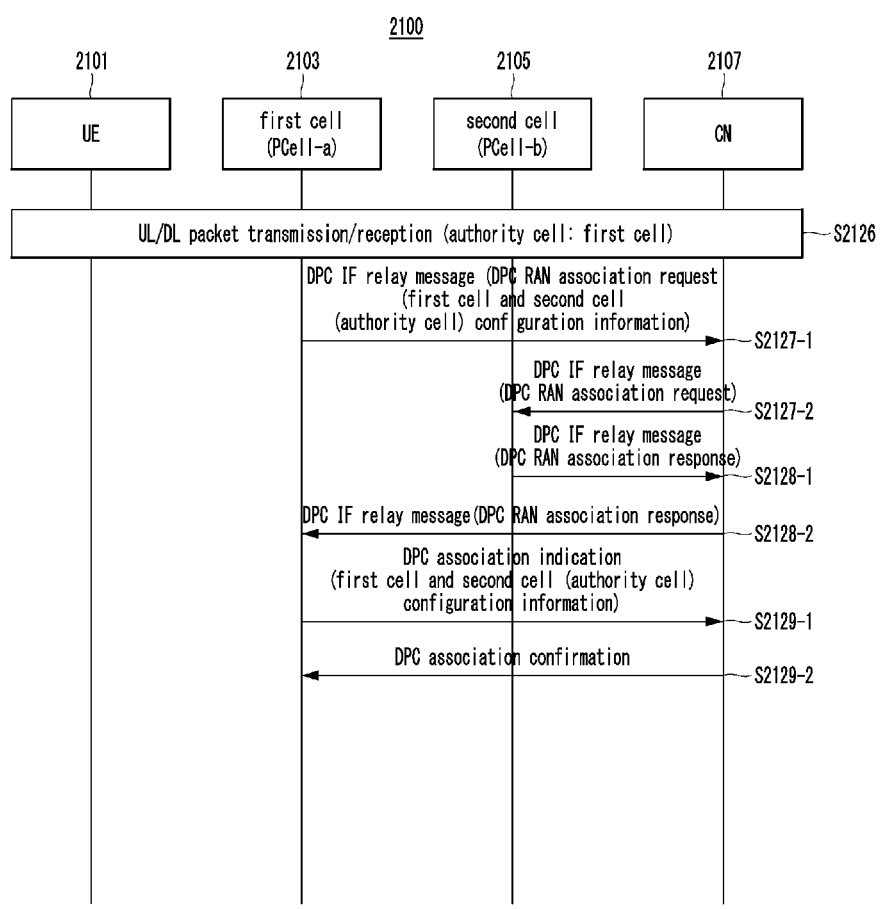

Referring to FIG. 21E, in an exemplary embodiment of the communication system 2100, UL/DL packet transmission/reception may be performed in a state where the first cell 2103 is configured as an authority cell (S2126). Here, a signaling procedure for changing the authority cell may be performed according to the second joint operation scheme.

Specifically, the first cell 2103 may transmit a relay signal requesting to change the authority cell to the second cell 2105 to the CN 2107 (S2127-1). In other words, the first cell 2103 may transmit to the CN 2107 a relay signal informing that it intends to transfer the authority for joint operations, which it has as the authority cell, to the second cell 2105. The CN 2107 may transmit the relay signal received in the step S2127-1 to the second cell 2105 (S2127-2). The relay signal transmitted in the steps S2127-1 and S2127-2 may include at least some of configuration information of the PCells 2103 and 2105 to be jointly operated, and information specifying the PCell (i.e., the second cell 2105) to be newly designated as an authority cell.

The second cell 2105 may identify that the first cell 2103 has requested to change the authority cell to the second cell 2105 based on the relay signal received in the step S2127-2. In other words, the second cell 2105 may identify that the first cell 2103 intends to transfer the authority for joint operations that the first cell 2103 has as the authority cell to the second cell 2105. The second cell 2105 may transmit a response to the relay signal received in the step S2127-2 to the CN 2107 (S2128-1). The CN 2107 may transmit the response received in the step S2128-1 to the first cell 2103 (S2128-2). The responses transmitted in the steps S2128-1 and S2128-2 may indicate whether the second cell 2105 approves the request of the first cell 2103. The responses transmitted in the steps S2128-1 and S2128-2 may include at least some of the configuration information of the PCells 2103 and 2105 that are jointly operated and information specifying the PCell (i.e., the second cell 2105) to be newly designated as an authority cell.

When the second cell 2105 approves the request of the first cell 2103, the first cell 2103 may transmit to the CN 2017 a signal indicating that the authority cell for joint operations has changed from the first cell 2103 to the second cell 2105 (S2129-1). The signal transmitted in the step S2129-1 may include at least some of identification information and configuration information of the PCells 2103 and 2105 to be jointly operated, and information specifying the PCell (i.e., the first cell 2103) desiring to become an authority cell. The CN 2107 may transmit a signal to the first cell 2103 indicating that it has confirmed what the signal received in the step S2129-1 indicates (S2129-2).

Through the steps S2127-1 to S2129-2, the authority cell for joint operations of the PCells 2103 and 2105 including the first cell 2103 and the second cell 2105 may be changed from the first cell 2103 to the second cell 2105. Also, through the steps S2127-1 to S2129-2, the second cell 2105 and the CN 2107 may identify that the authority cell is changed from the first cell 2103 to the second cell 2105.

The relay signals transmitted in the steps S2127-1 and S2127-2 each may be included in a DPC RAN association request. The responses transmitted in the steps S2128-1 and S2128-2 each may be included in a DPC RAN association response. The relay signals and responses transmitted in the steps S2127-1 to S2128-2 each may be included in a DPC IF relay message.

Meanwhile, based on the operations shown in FIG. 21E, a signaling procedure for termination of joint operations may be performed. In this case, based on the signals and operations identical or similar to those described with reference to FIGS. 21E and/or 20F, joint operations of a plurality of PCells may be terminated.

Hereinafter, in describing specific procedures according to the joint operations of the first cell 2103 and the second cell 2105 in the second joint operation scheme with reference to FIGS. 21F to 21I, description overlapping with those described with reference to FIGS. 1 to 21E may be omitted.

Figure 21F:
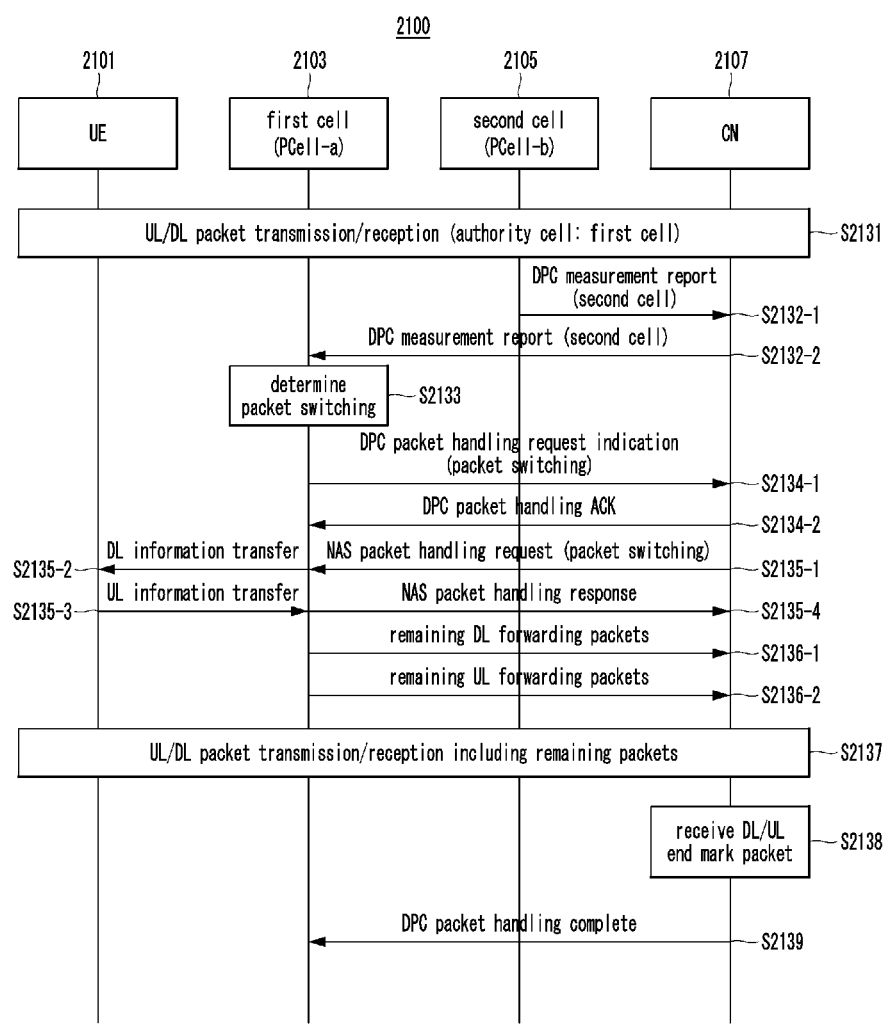

Referring to FIG. 21F, in an exemplary embodiment of the communication system 2100, UL/DL packet transmission/reception may be performed in a state where the first cell 2103 is configured as an authority cell (S2131). Here, a packet switching procedure through joint operations of the first cell 2103 and the second cell 2105 may be performed. To this end, the second cell 2105 may report the second cell measurement information. For example, the second cell 2105 may transmit the second cell measurement information to the CN 2107 (S2132-1). The CN 2107 may transmit the second cell measurement information received in the step S2132-1 to the first cell 2103 (S2132-2).

The CN 2107 may determine packet switching based on the second cell measurement information received in the step S2132-2 (S2133). Here, the packet switching may refer to transmission of DL/UL packets to be transmitted through the first cell 2103 through the second cell 2105 and/or transmission of DL/UL packets to be transmitted through the second cell 2105 through the first cell 2103.

The first cell 2103 may transmit to the CN 2107 a signal indicating that the CN 2107 requests the CN 2107 to perform packet handling according to the packet switching (S2134-1). Here, the signal transmitted in the step S2134-1 may indicate that the first cell 2103 is to forward remaining DL/UL packets not yet transmitted to the CN 2107. Alternatively, the signal transmitted in the step S2134-1 may correspond to a signal informing the CN 2107 that the first cell 2103 is to request the second cell 2105 to perform packet handling according to the packet switching. The CN 2107 may transmit a response to the signal received in the step S2134-1 to the first cell 2103 (S2134-2). Here, the response transmitted in the step S2134-2 may indicate whether the CN 2107 has approved the packet handling request of the first cell 2103. The response transmitted in the step S2134-2 may include information a DL forwarding tunnel ID configured for the remaining DL forwarding packets forwarded from the first cell 2103 to the CN 2107, and information on a UL forwarding tunnel ID configured for the remaining UL forwarding packets forwarded from the first cell 2103 to the CN 2107.

The CN 2107 may transmit a signal requesting the UE 2101 to perform packet handling according to the packet switching to the first cell 2103 (S2135-1). The first cell 2103 may transmit the signal received in the step S2135-1 to the UE 2101 (S2135-2). The signals transmitted in the steps S2135-1 and S2135-2 may request or instruct the UE 2101 to transmit UL packets to be transmitted through the first cell 2103 through the second cell 2105. The UE 2101 may transmit a response to the signal received in the step S2135-2 to the first cell 2103 (S2135-3). The first cell 2103 may transmit the response received in the step S2135-3 to the CN 2107 (S2135-4).

The first cell 2103 may perform packet forwarding according to the packet switching. Specifically, the first cell 2103 may transmit the remaining DL forwarding packets to the CN 2107 (S2136-1). Also, the first cell 2103 may transmit the remaining UL forwarding packets to the CN 2107 (S2136-2). Here, the first cell 2103 may transmit the remaining DL forwarding packets and the remaining UL forwarding packets to the CN 2107 based on the DL forwarding tunnel ID and the UL forwarding tunnel ID obtained in the step S2134-2.

The UE 2101, the second cell 2105, and the CN 2107 may perform transmission and reception of the UL/DL packets (S2137). The CN 2107 may receive a DL end mark packet and a UL end mark packet from the first cell 2103 (S2138). In this case, the CN 2107 may transmit to the first cell 2103 a signal indicating that the packet handling according to the packet switching is completed (S2139).

The signal transmitted in the step S2134-1 may be included in a 'DPC packet handling request indication' transmitted through the NG-C. The response transmitted in the step S2134-2 may be included in a 'DPC packet handling request ACK' transmitted through the NG-C. The signals transmitted in the steps S2135-1 and S2135-2 each may be included in a NAS packet handling request. The responses transmitted in the steps S2135-3 and S2135-4 each may be included in a NAS packet handling response. In the step S2135-1, the NAS packet handling request may be included in a DL NAS transport message. In the step S2135-2, the NAS packet handling request may be included in a DL information transfer message. In the step S2135-3, the NAS packet handling response may be included in a UL information transfer message. In the step S2135-4, the NAS packet handling response may be included in a UL NAS transport message.

Figure 21G:
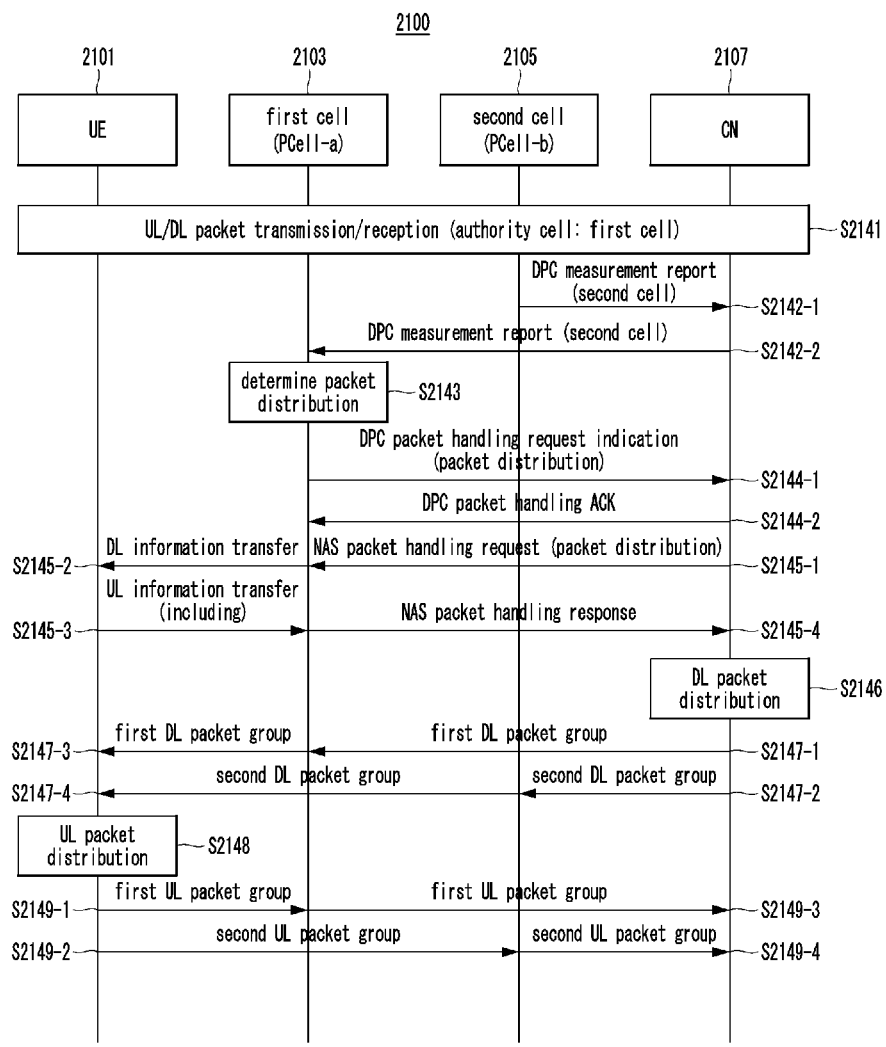

Referring to FIG. 21G, in an exemplary embodiment of the communication system 2100, UL/DL packet transmission/reception may be performed in a state where the first cell 2103 is configured as an authority cell (S2141). Here, a first packet distribution procedure through joint operations of the first cell 2103 and the second cell 2105 may be performed. To this end, the second cell 2105 may report second cell measurement information. For example, the second cell 2105 may transmit second cell measurement information to the CN 2107 (S2142-1). The CN 2107 may transmit the second cell measurement information received in the step S2142-1 to the first cell 2103 (S2142-2).

The first cell 2103 may determine packet distribution based on the second cell measurement information received in the step S2142-2 (S2143). Here, the packet distribution may mean that some of packets of the first cell 2103 are distributed to the second cell 2105. In other words, the packet distribution may mean controlling some of DL/UL packets to be transmitted through the first cell 2103 to be transmitted through the second cell 2105.

The first cell 2103 may transmit to the CN 2107 a signal indicating that packet handling according to the packet switching is requested to the CN 2107 (S2144-1). Here, the signal transmitted in the step S2144-1 may include information on a criterion and/or method for the CN 2107 to distribute the DL packets for the first cell 2103 to the second cell 2105. The signal transmitted in the step S2144-1 may include information on a criteria and/or method for the UE 2101 to distribute the UL packets for the first cell 2103 to the second cell 2105. The CN 2107 may transmit a response to the signal received the in step S2144-1 to the first cell 2103 (S2144-2). Here, the response transmitted in the step S2144-2 may indicate whether the CN 2107 has approved the packet handling request of the first cell 2103.

The CN 2107 may transmit to the first cell 2103 a signal requesting the UE 2101 to perform packet handling according to the packet distribution (S2145-1). The first cell 2103 may transmit the signal received in the step S2145-1 to the UE 2101 (S2145-2). The signals transmitted in the steps S2145-1 and S2145-2 may include information on a criteria and/or method for the UE 2101 to distribute the UL packets for the first cell 2103 to the second cell 2105. The UE 2101 may transmit a response to the signal received in the step S2145-2 to the first cell 2103 (S2145-3). The first cell 2103 may transmit the response received in the step S2145-3 to the CN 2107 (S2145-4).

The CN 2107 may distribute the DL packets to the first cell 2103 and the second cell 2105 (S2146). For example, the CN 2107 may divide all the DL packets into a first DL packet group and a second DL packet group. The CN 2107 may transmit the first DL packet group to the first cell 2103 (S2147-1). On the other hand, the CN 2107 may transmit the second DL packet group among all the DL packets to the second cell 2105 (S2147-2). The first cell 2103 may transmit the first DL packet group received in the step S2147-1 to the UE 2101 (S2147-3). The second cell 2105 may transmit the second DL packet group received in the step S2147-2 to the UE 2101 (S2147-4).

Meanwhile, the UE 2101 may distribute UL packets to the first cell 2103 and the second cell 2105 (S2148). For example, the UE 2101 may divide all the UL packets into a first UL packet group and a second UL packet group. The UE 2101 may transmit the first UL packet group to the first cell 2103 (S2149-1). On the other hand, the CN 2107 may transmit the second UL packet group to the second cell 2105 (S2149-2). The UE 2101 may transmit the first UL packet group among all the UL packets to the first cell 2103 (S2149-1). Meanwhile, the CN 2107 may transmit the other part of all the UL packets (hereinafter referred to as a 'second UL packet group') to the second cell 2105 (S2149-2). The first cell 2103 may transmit the first UL packet group received in the step S2149-1 to the CN 2107 (S2149-3). The second cell 2105 may transmit the second UL packet group received in the step S2149-2 to the CN 2107 (S2149-4).

The signal transmitted in the step S2144-1 each may be included in a DPC packet handling request indication. The response transmitted in the step S2144-2 may be included in a DPC packet handling request ACK. The signals transmitted in the steps S2145-1 and S2145-2 each may be included in a NAS packet handling request. The responses transmitted in the steps S2145-3 and S2145-4 each may be included in a NAS packet handling response. In the step S2145-1, the NAS packet handling request may be included in a DL NAS transport message. In the step S2145-2, the NAS packet handling request may be included in a DL information transfer message. In the step S2145-3, the NAS packet handling response may be included in a UL information transfer message. In the step S2145-4, the NAS packet handling response may be included in a UL NAS transport message.

Figure 21H:
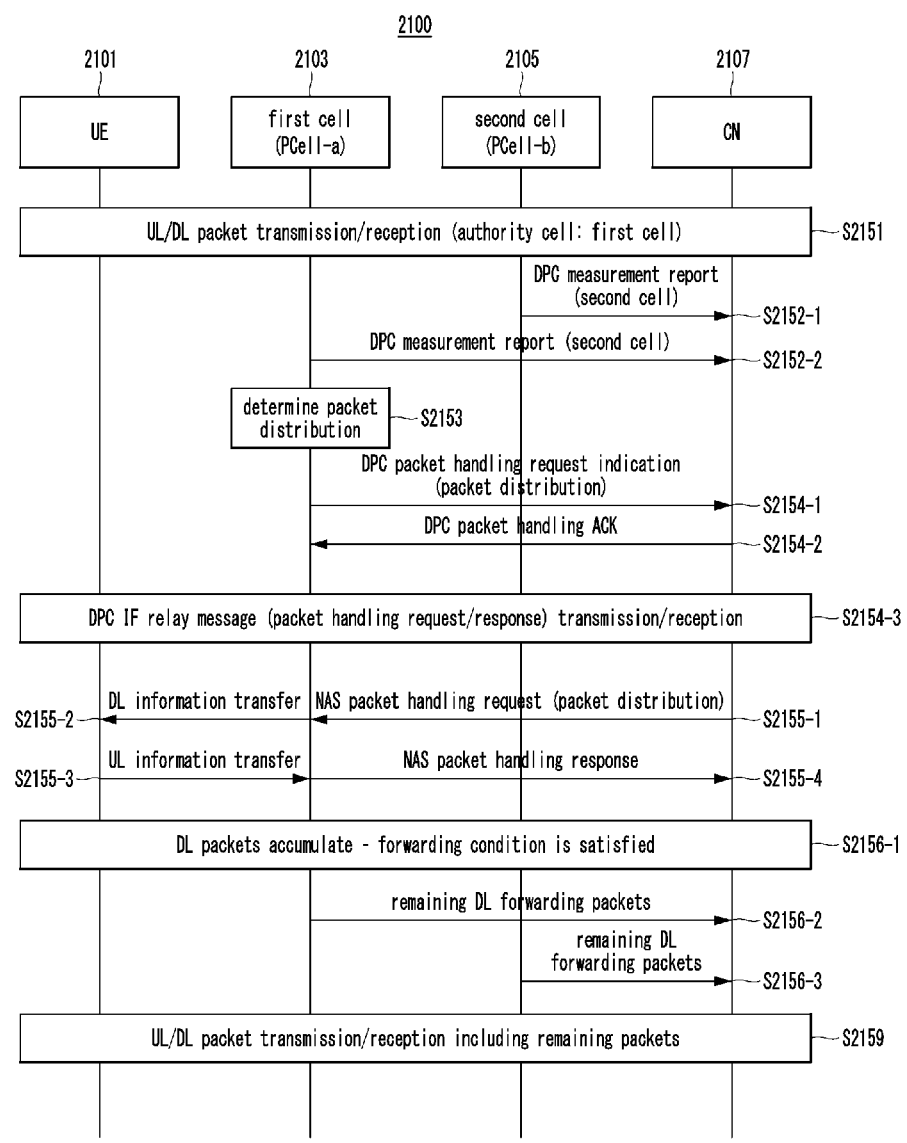

Referring to FIG. 21H, in an exemplary embodiment of the communication system 2100, UL/DL packet transmission/reception may be performed in a state where the first cell 2103 is configured as an authority cell (S2151). Here, a second packet distribution procedure through joint operations of the first cell 2103 and the second cell 2105 may be performed. To this end, the second cell 2105 may report second cell measurement information. For example, the second cell 2105 may transmit second cell measurement information to the CN 2107 (S2152-1). The CN 2107 may transmit the second cell measurement information received in the step S2152-1 to the first cell 2103 (S2152-2).

The first cell 2103 may determine packet distribution based on the second cell measurement information received in the step S2152-2 (S2153). The first cell 2103 may determine a forwarding condition for triggering the packet distribution. For example, the forwarding condition may include a first reference value for DL packet distribution and/or a second reference value for UL packet distribution.

The first cell 2103 may transmit, to the CN 2107, a signal indicating that packet handling according to the packet switching is requested to the CN 2107 (S2154-1). Here, the signal transmitted in the step S2154-1 may include at least some of information on a forwarding condition for triggering packet distribution, and information on a criterion and/or method for distributing DL packets or UL packets between the first cell 2103 and the second cell 2105 when the packet distribution is triggered. The CN 2107 may transmit a response to the signal received in the step S2154-1 to the first cell 2103 (S2154-2). Here, the response transmitted in the step S2154-2 may indicate whether the CN 2107 accepts the packet handling request of the first cell 2103.

Subsequently, a signaling procedure for a packet handling request according to packet distribution may be performed between the first cell 2103 and the second cell 2105 (S2154-3). Specifically, the first cell 2103 may transmit, to the CN 2107, a relay signal requesting or instructing the second cell 2105 to perform packet handling according to the packet distribution. The relay signal transmitted in the step S2154-3 may include at least some of information on a forwarding condition for triggering packet distribution, and information on a criterion and/or method for distributing DL packets between the first cell 2103 and the second cell 2105 when the packet distribution is triggered. The CN 2107 may transmit the received relay signal to the second cell 2105. The second cell 2105 may transmit a response to the relay signal received through the CN 2107 to the CN 2107. The CN 2107 may transmit the received response to the first cell 2103. The response transmitted in the step S2154-3 may indicate whether the second cell 2105 accepts the packet handling request of the first cell 2103.

The CN 2107 may transmit to the first cell 2103 a signal requesting the UE 2101 to perform packet handling according to the packet distribution (S2155-1). The first cell 2103 may transmit the signal received in the step S2155-1 to the UE 2101 (S2155-2). Here, the signals transmitted in the steps S2155-1 and S2155-2 may include at least some of information on a forwarding condition for triggering packet distribution, and information on a criterion and/or method for distributing UL packets between the first cell 2103 and the second cell 2105 when the packet distribution is triggered. The UE 2101 may transmit a response to the signal received in the step S2155-2 to the first cell 2103 (S2155-3). The first cell 2103 may transmit the response received in the step S2155-3 to the CN 2107 (S2155-4).

When the forwarding condition determined in the step S2153 is satisfied, the packet distribution may be triggered. For example, when DL packets are accumulated to a value greater than or equal to the first reference value in a buffer of the CN 2107 or the PCells 2103 and 2105, the forwarding condition may be satisfied (S2156-1), and accordingly, packet distribution may be performed. When the forwarding condition is satisfied due to the instability of the first cell 2103, the first cell 2103 may transmit remaining DL forwarding packets to the CN 2107 (S2156-2). On the other hand, when the forwarding condition is satisfied due to the instability of the second cell 2105, the second cell 2105 may transmit the remaining DL forwarding packets to the CN 2107 (S2156-3).

Meanwhile, when UL packets are accumulated to a value greater than or equal to the second reference value in the buffer of the UE 2101 or the PCells 2103 and 2105, the forwarding condition may be satisfied, and accordingly, packet distribution may be performed. When the forwarding condition is satisfied due to the instability of the first cell 2103, the first cell 2103 may transmit the remaining UL forwarding packets to the CN 2107. On the other hand, when the forwarding condition is satisfied due to the instability of the second cell 2105, the second cell 2105 may transmit the remaining UL forwarding packets to the CN 2107.

When transmission of the remaining DL forwarding packets and/or the remaining UL forwarding packets is performed, the UE 2101, the first cell 2103, the second cell 2105, and the CN 2107 may transmit and receive DL/UL packets according to the criterion and/or method for the packet distribution indicated in the steps S2154-1, S2154-2, S2154-3, S2155-1, S2155-2, or the like (S2159). The DL/UL packets transmitted and received here may include the remaining DL forwarding packets and the remaining UL forwarding packets transmitted in the first cell 2103 and/or the second cell 2105. A DL packet transmitted from the CN 2107 may be distributed and downlink-transmitted between the first cell 2103 and the second cell 2105. A UL packet transmitted from the UE 2101 may be distributed and uplink-transmitted between the first cell 2103 and the second cell 2105.

The signal transmitted in the step S2154-1 may be included in a DPC packet handling request indication. The response transmitted in the step S2154-2 may be included in a DPC packet handling request ACK. The relay signal and response transmitted in the step S2154-3 may be included in a DPC packet handling request and a DPC packet handling response, respectively. The DPC packet handling request and DPC handling response transmitted in the step S2154-3 may be included in a DPC IF relay message. The signals transmitted in the steps S2155-1 and S2155-2 each may be included in a NAS packet handling request. The responses transmitted in the steps S2155-3 and S2155-4 each may be included in a NAS packet handling response. In the step S2155-1, the NAS packet handling request may be included in a DL NAS transport message. In the step S2155-2, the NAS packet handling request may be included in a DL information transfer message. In the step S2155-3, the NAS packet handling response may be included in a UL information transfer message. In the step S2155-4, the NAS packet handling response may be included in a UL NAS transport message.

Figure 21I:
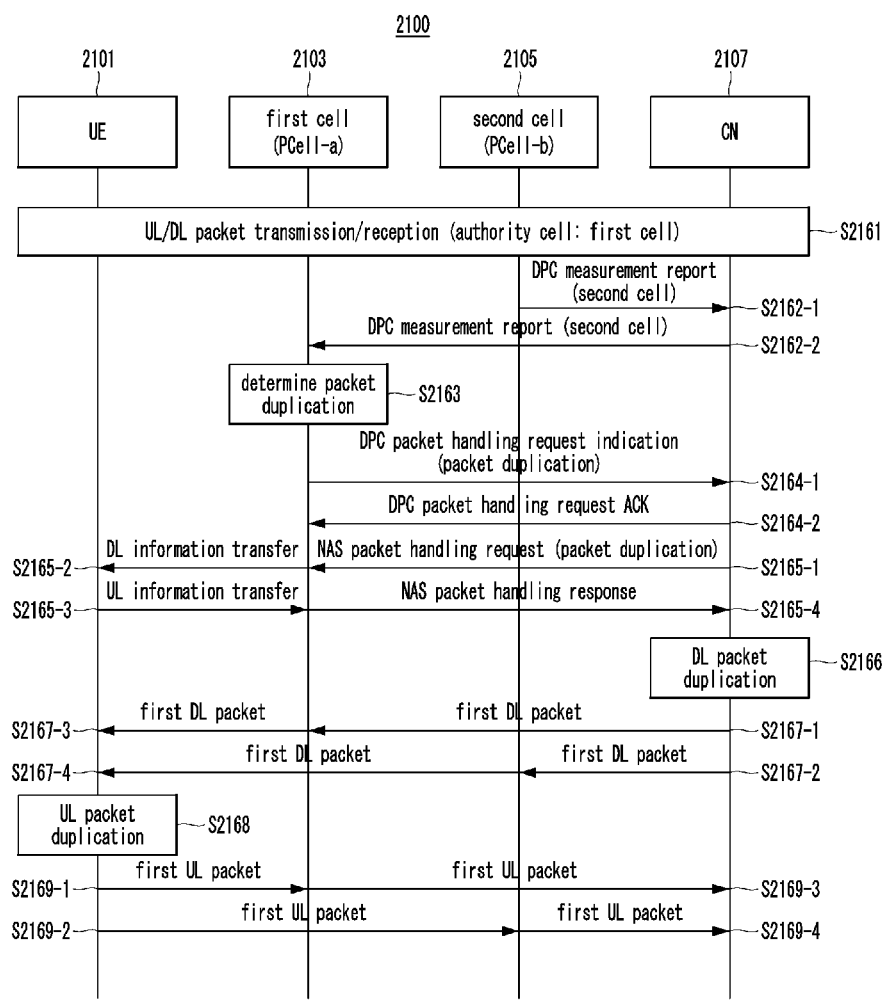

Referring to FIG. 21I, in an exemplary embodiment of the communication system 2100, UL/DL packet transmission/ reception may be performed in a state where the first cell 2103 is configured as an authority cell (S2161). Here, the CN 2107 may perform a packet duplication procedure through joint operations of the first cell 2103 and the second cell 2105. To this end, the second cell 2105 may report second cell measurement information. For example, the second cell 2105 may transmit second cell measurement information to the CN 2107 (S2162-1). The CN 2107 may transmit the second cell measurement information received in the step S2162-1 to the first cell 2103 (S2162-2)

The first cell 2103 may determine packet duplication based on the second cell measurement information received in the step S2162-2 (S2163). Here, the packet duplication may mean that DL packets and/or UL packets are controlled to be duplicated and transmitted to both the first cell 2103 and the second cell 2105.

The first cell 2103 may transmit, to the CN 2107, a signal indicating that packet handling according to the packet switching is requested to the CN 2107 (S2164-1). Here, the signal transmitted in the step S2164-1 may include information on a criterion and/or method for the CN 2107 to duplicate DL packets for the first cell 2103 and transmit them also through the second cell 2105. The signal transmitted in the step S2164-1 may include information on a criterion and/or method for the UE 2101 to duplicate UL packets for the first cell 2103 and transmit them also through the second cell 2105. The CN 2107 may transmit a response to the signal received in the step S2164-1 to the first cell 2103 (S2164-2). Here, the response transmitted in the step S2164-2 may indicate whether the CN 2107 accepts the packet handling request of the first cell 2103.

The CN 2107 may transmit to the first cell 2130 a signal requesting the UE 2101 to perform packet handling according to packet duplication (S2165-1). The first cell 2103 may transmit the signal received in the step S2165-1 to the UE 2101 (S2165-2). The signals transmitted in the steps S2165-1 and S2165-2 may include information on a criterion and/or method for the UE 2101 to duplicate UL packets for the first cell 2103 and transmit them also through the second cell 2105. The UE 2101 may transmit a response to the signal received in the step S2165-2 to the first cell 2103 (S2165-3). The first cell 2103 may transmit the response received in the step S2165-3 to the CN 2107 (S2165-4).

The CN 2107 may duplicate a DL packet for the first cell 2103 (hereinafter, a first DL packet) (S2166). For example, the CN 2107 may transmit the first DL packet to the first cell 2103 (S2167-1). The CN 2107 may transmit the same first DL packet also to the second cell 2105 (S2167-2). The first cell 2103 may transmit the first DL packet received in the step S2167-1 to the UE 2101 (S2167-3). The second cell 2105 may transmit the first DL packet received in the step S2167-2 to the UE 2101 (S2167-4).

Meanwhile, the UE 2101 may duplicate a UL packet for the first cell 2103 (hereinafter, a first UL packet) (S2168). For example, the UE 2101 may transmit the first UL packet to the first cell 2103 (S2169-1). The UE 2101 may transmit the same first UL packet also to the second cell 2105 (S2169-2). The first cell 2103 may transmit the first UL packet received in the step S2169-1 to the CN 2107 (S2169-3). The second cell 2105 may transmit the second UL packet received in the step S2169-2 to the CN 2107 (S2169-4).

The signal transmitted in the step S2164-1 may be included in a DPC packet handling request indication. The response transmitted in the step S2164-2 may be included in a DPC packet handling request ACK. The signals transmitted in the steps S2165-1 and S2165-2 may be included in a NAS packet handling request. The responses transmitted in steps S2165-3 and S2165-4 may be included in a NAS packet handling response. In the step S2165-1, the NAS packet handling request may be included in a DL NAS transport message. In the step S2165-2, the NAS packet handling request may be included in a DL information transfer message. In the step S2165-3, the NAS packet handling response may be included in a UL information transfer message. In the step S2165-4, the NAS packet handling response may be included in a UL NAS transport message.

In an exemplary embodiment of the cell operation method according to the second joint operation scheme, the first cell 2103, which is a PCell connected to the UE 2101 and the CN 2107, may receive a first signal indicating that the second cell 2105, which is a PCell connected to the UE 2101 and the CN 2107, is to be jointly operated with the first cell 2103 as coordinative PCells. This may be the same as or similar to those described with reference to FIG. 21A.

Based on the received first signal, the first cell 2103 may transmit to the CN 2107 a second signal requesting to configure the first cell 2103 as an authority cell for joint operations with respect to the coordinative PCells. This may be the same as or similar to those described with reference to FIG. 21B.

The first cell 2103 may transmit, to the UE 2101, a third signal including information on joint operations of the coordinative PCells by the first cell 2103. Through this, the UE 2101 may identify that the first cell 2103 and the second cell 2105 are jointly operated by the CN 2107 as coordinative PCells. This may be the same as or similar to those described with reference to FIG. 20C.

When joint operations of the first cell 2103 and the second cell 2105, which are the coordinative PCells, a first CP interface may be configured between the CN 2107 and the first cell 2103, and a second CP interface may be configured between the CN 2107 and the second cell 2105. The first cell 2103 may perform communication with the CN 2107 and the UE 2101 based on joint operations of the coordinative PCells. This may be the same as or similar to those described with reference to FIGS. 21C to 21I.

FIGS. 22A to 22H are sequence charts for describing exemplary embodiments of a cell operation method according to the third joint operation scheme.

Referring to FIGS. 22A to 22H, a communication system 2200 may support the second exemplary embodiment of the cell operation method. Communication nodes constituting the communication system 2200 may support at least the third joint operation scheme (i.e., DC-based joint operation scheme) in the second exemplary embodiment of the cell operation method. The communication system 2200 may include a UE 2201, a first cell 2203, a second cell 2205, and a CN 2207. The first cell 2203 may be formed by a first communication node. The first cell 2203 may be referred to as a PCell-a when it is a PCell, and may be referred to as a PSCell-a when it is a PSCell. The second cell 2205 may be formed by a second communication node. The second cell 2205 may be referred to as a PCell-b when it is a PCell, and may be referred to as a PSCell-b when it is a PSCell. The communication system 2200, UE 2201, first and second cells 2203 and 2205, and CN 2207 may be the same as or similar to the communication system 1700, UE 1790, first cell 1731, second cell 1751, and CN 1710 described with reference to FIGS. 17A to 17D, respectively. An interface DPC IF may be configured between the first cell 2203 and the second cell 2205. In an exemplary embodiment of the communication system 2200, a CP interface (e.g., Xn-C, X2-C, etc.) directly connecting the first cell 2203 and the second cell 2205 may correspond to the DPC IF. Hereinafter, in describing exemplary embodiments of the cell operation method according to the third joint operation scheme with reference to FIGS. 22A to 22H, description overlapping those described with reference to FIGS. 1 to 21I may be omitted.

Figure 22A:
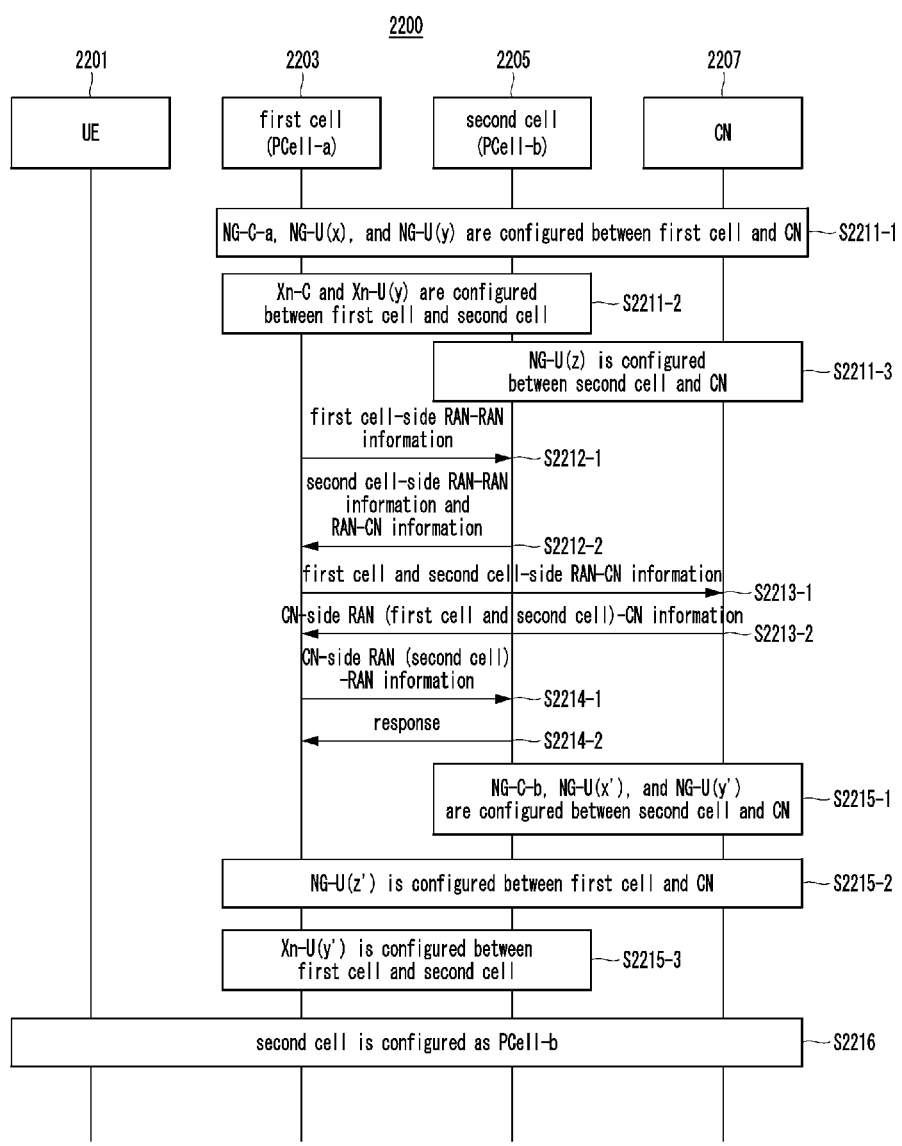
FIGS. 22A to 22H are sequence charts for describing exemplary embodiments of a cell operation method according to the third joint operation scheme.

Referring to FIG. 22A, the first cell 2203 may be configured as a PCell (i.e., PCell-a). The second cell 2205 may be configured as a PSCell (i.e., PSCell-b) based on DC for the first cell 2203. Accordingly, a CP interface and a UP interface may be configured between the first cell 2203 and the CN 2207 (S2211-1). For example, a CP interface NG-C-a, and UP interfaces NG-U(x) and NG-U(y) may be configured between the first cell 2203 and the CN 2207.

Meanwhile, a CP interface and a UP interface may be configured between the first cell 2203 and the second cell 2205 (S2211-2). For example, a CP interface Xn-C (or X2-C, etc.), a UP interface Xn-U(y) (or X2-U(y), etc.), and the like may be configured between the first cell 2203 and the second cell 2205. Here, the CP interface between the first cell 2203 and the second cell 2205 may correspond to the DPC IF.

Meanwhile, a UP interface may be configured between the second cell 2205 and the CN 2207 (S2211-3). For example, NG-U(z) or the like may be configured between the second cell 2205 and the CN 2207. Similarly to those described with reference to FIGS. 19A to 19H, a CP interface and a UP interface may be configured between the first cell 2203 and the CN 2207 (S2211-1). Similarly to those described with reference to FIGS. 19A to 19H, the UP interfaces NG-U(x), NG-U(y), Xn-U(y), and NG-U(z) may be referred to as (x), (y-c), (y-r), and (z), respectively, and (y-c) and (y-r) may be collectively referred to as (y).

The first cell 2203, the second cell 2205, and the CN 2207 may perform a procedure for transitioning the second cell 2205 to a PCell according to the third joint operation scheme. To this end, based on the operations such as the steps S2212-1 to S2214-2, at least some of the information groups described with reference to FIGS. 7A and 7B may be signaled.

Specifically, the first cell 2203 may transmit a signal requesting to additionally create an interface to the second cell 2205 (S2212-1). The signal transmitted in step S2212-1 may include at least part of the first cell configuration information. For example, the signal transmitted in the step S2212-1 may include RAN-RAN information that first cell 2203 has (hereinafter, first cell-side RAN-RAN information).

The first cell-side RAN-RAN information may include identification information for creating a new UP interface between the first cell 2203 and the second cell 2205. The first cell-side RAN-RAN information may include information of an ID (e.g., tunnel ID) of the first cell 2203 to be used when the second cell 2205 transmits packets to the first cell 2203 through the new UP interface.

The second cell 2205 may transmit a response to the signal received in the step S2212-1 to the first cell 2203 (S2212-2). The response transmitted in the step S2212-2 may include at least part of the second cell configuration information. For example, the response transmitted in the step S2212-2 may include RAN-RAN information that the second cell 2205 has (hereinafter, second cell-side RAN-RAN information) and RAN-CN information that the second cell 2205 has (hereinafter, second cell-side RAN-CN information).

The second cell-side RAN-RAN information may include identification information for creating a new UP interface between the first cell 2203 and the second cell 2205. The second cell-side RAN-RAN information may include information on an ID (e.g., tunnel ID) of the second cell 2205 to be used when the first cell 2203 transmits packets to the second cell 2205 through the new UP interface. The second cell-side RAN-CN information may include information on a new CP interface between the second cell 2205 and the CN 2207, and identification information for creating the new CP interface.

The second cell-side RAN-CN information may include an ID (e.g., gNB UE ID, RAN UE ID, etc.) of the second cell 2205 to be used when the CN 2207 transmits packets to the second cell 2205 through the new CP interface. In addition, the second cell-side RAN-CN information may include information on an ID (e.g., UP (DL) TE ID, etc.) of the second cell 2205 to be used when the CN 2207 transmits packets to the second cell 2205 through the new UP interface.

The first cell 2203 may transmit a signal requesting information for additional interface creation to the CN 2207 (S2213-1). The signal transmitted in the step S2213-1 may include at least part of the first cell configuration information and the second cell configuration information. For example, the signal transmitted in the step S2213-1 may include the second cell-side RAN-CN information included in the response received in the step S2212-2. Meanwhile, the signal transmitted in the step S2213-1 may include the RAN-CN information that the first cell 2203 has (hereinafter, first cell-side RAN-CN information).

The first cell-side RAN-CN information may include identification information for creating a new UP interface between the first cell 2203 and the CN 2207. The first cell-side RAN-CN information may include information on an ID of the first cell 2203 to be used when the CN 2207 transmits packets to the first cell 2203 through the new UP interface.

The CN 2207 may transmit a response to the signal received in the step S2213-1 to the first cell 2203 (S2213-2). The response transmitted in the step S2213-2 may include RAN-CN information that the CN 2207 has (hereinafter, CN-side RAN-CN information). The CN-side RAN-CN information may include RAN-CN information for the first cell (hereinafter, CN-side first cell-CN information) and RAN-CN information for the second cell (hereinafter, CN-side second cell-CN information).

The CN-side first cell-CN information may include identification information for creating a new UP interface between the first cell 2203 and the CN 2207. The CN-side first cell-CN information may include information on an ID (e.g., UP (UL) TE ID, etc.) of the CN 2207 to be used when the first cell 2203 transmits packets to the CN 2207 through the new UP interface.

The CN-side second cell-CN information may include information on a new UP interface between the second cell 2205 and the CN 2207 and identification information for creating the new CP interface. The CN-side second cell-CN information may include information on an ID (e.g., CN UE ID, CN UE NGAP ID, etc.) of the CN 2207 to be used when the second cell 2205 transmits packets to the CN 2207 through the new CP interface. Also, the CN-side second cell-CN information may include information on an ID of the CN 2207 to be used when the second cell 2205 transmits packets to the CN 2207 through the new UP interface.

Based on the response received in the step S2213-2, the first cell 2203 may transmit a signal requesting additional interface creation to the second cell 2205 (S2214-1). The signal transmitted in the step S2214-1 may include the CN-side second cell-CN information among the information received in the step S2213-2. The second cell 2205 may transmit a response to the signal received in the step S2214-1 to the first cell 2203 (S2214-2).

Based on the RAN-RAN information and the RAN-CN information transmitted and received based on the operations such as the steps S2212-1 to S2214-2, new interfaces may be created between the first cell 2203, the second cell 2205, and the CN 2207. A new CP interface and a new UP interface may be configured between the second cell 2205 and the CN 2207 (S2215-1). For example, a new CP interface NG-C-b, new UP interfaces NG-U(x') and NG-U (y') may be configured between the second cell 2203 and the CN 2207. The new CP interface and the new UP interface may be configured based on the second cell-side RAN-CN information and the CN-side second cell-CN information.

Meanwhile, a new UP interface may be configured between the first cell 2203 and the CN 2207 (S2215-2). For example, a new UP interface NG-U(z') may be configured between the first cell 2203 and the CN 2207. The new UP interface may be configured based on the first cell-side RAN-CN information and the CN-side first cell-CN information Meanwhile, a new UP interface may be configured between the first cell 2203 and the second cell 2205 (S2215-3). For example, a new UP interface Xn-U(y') (or X2-U(y'), etc.) may be configured between the first cell 2203 and the second cell 2205. The new UP interface may be configured based on the first cell-side RAN-RAN information and the second cell-side RAN-RAN information. Similarly to those described with reference to FIGS. 19A to 19H, the new interfaces NG-U(x'), NG-U(y'), Xn-U(y'), and NG-U(z') may be referred to as (x'), (y'-c), (y'-r), and (z'), respectively, and (y'-c) and (y'-r) may be collectively referred to as (y').

When new interfaces are configured as in the steps S2215-1 to S2215-3, the second cell 2205 may be regarded as being configured as a PCell-b (S2216). Here, the first cell 2203 may be regarded as corresponding to an authority cell for joint operations of the first cell 2203 and the second cell 2205, which are PCells.

The signals transmitted in the steps S2212-1 and S2214-1 may be included in a 'DPC NG IF create request' transmitted through the DPC IF. The responses transmitted in the steps S2212-2 and S2214-2 may be included in a 'DPC NG IF creation response' transmitted through the DPC IF. The signal transmitted in the step S2213-1 may be included in a 'DPC NG IF information request' transmitted through the NG-C. The response transmitted in the step S2213-2 may be included in a 'DPC NG IF information response' transmitted through the NG-C.

Figure 22B:
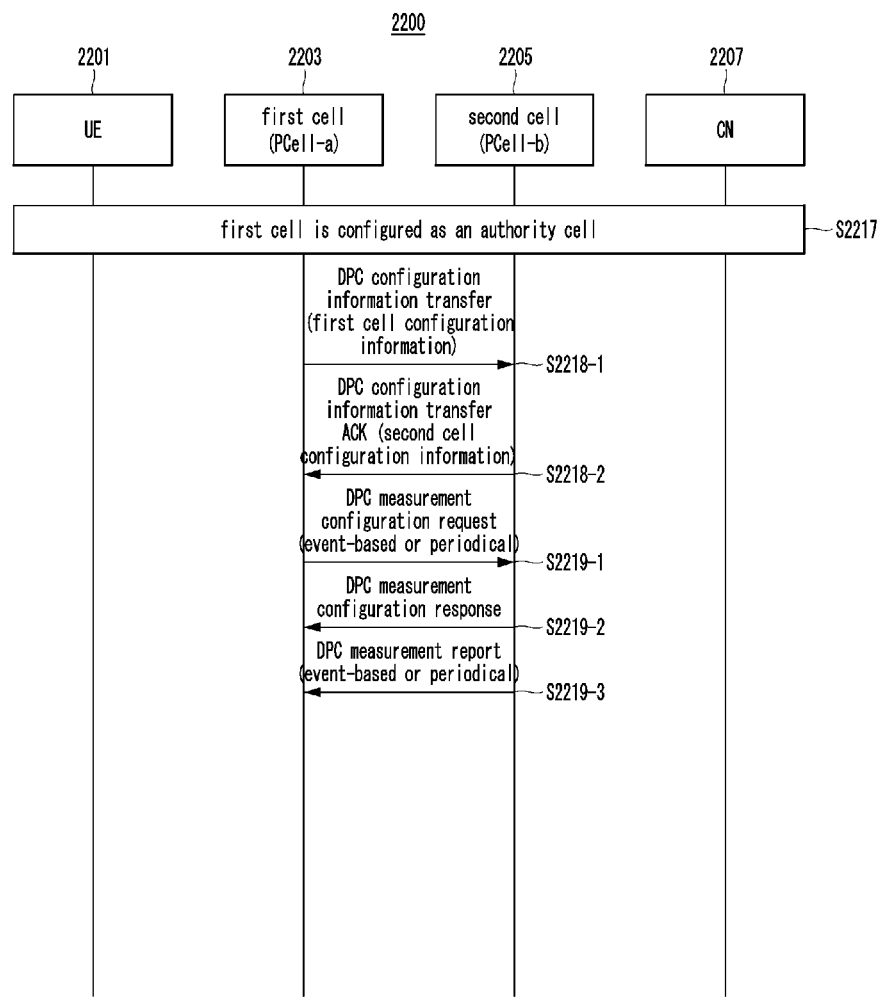

Referring to FIG. 22B, in an exemplary embodiment of the communication system 2200, the first cell 2203 and the second cell 2203 may be configured as PCells for the UE 2201, and the first cell 2203 may be configured as an authority cell (S2217). Here, the first cell 2203 and the second cell 2205 may perform a signaling procedure for information for joint operations.

Specifically, the first cell 2203 may transmit a signal including at least part of first cell configuration information to the second cell 2205 (S2218-1). The second cell 2205 may transmit a response to the signal received in the step S2218-1 to the first cell 2203 (S2218-2). The response transmitted in the step S2218-2 may include at least part of second cell configuration information. Through the steps S2218-1 and S2218-2, the first cell 2203 and the second cell 2205 may obtain configuration information of the counterpart. Through this, information asymmetry between the first cell 2203 and the second cell 2205 may be resolved. Alternatively, when its own configuration information is changed, the first cell or the second cell may easily notify the other party of the changed configuration information.

Meanwhile, the first cell 2203 and the second cell 2205 may perform a signaling procedure for second cell measurement information. Specifically, the first cell 2203 may transmit a signal requesting a configuration for reporting second cell measurement information to the second cell 2205 (S2219-1). The second cell 2205 may transmit a response to the signal received in the step S2219-1 to the first cell 2203 (S2219-2). Thereafter, the second cell 2205 may report second cell measurement information to the first cell 2203 (S2219-3).

The signal transmitted in the step S2218-1 may be included in a DPC configuration information transfer. The response transmitted in the step S2218-2 may be included in a DPC configuration information transfer or DPC configuration information transfer ACK. The signal transmitted in the step S2219-1 may be included in a DPC measurement configuration request. The response transmitted in the step S2219-2 may be included in a DPC measurement configuration response. The signal transmitted in the step S2219-3 may be included in a DPC measurement report. The signals and responses transmitted in the steps S2218-1 to S2219-3 may be transmitted through the DPC IF.

Figure 22C:
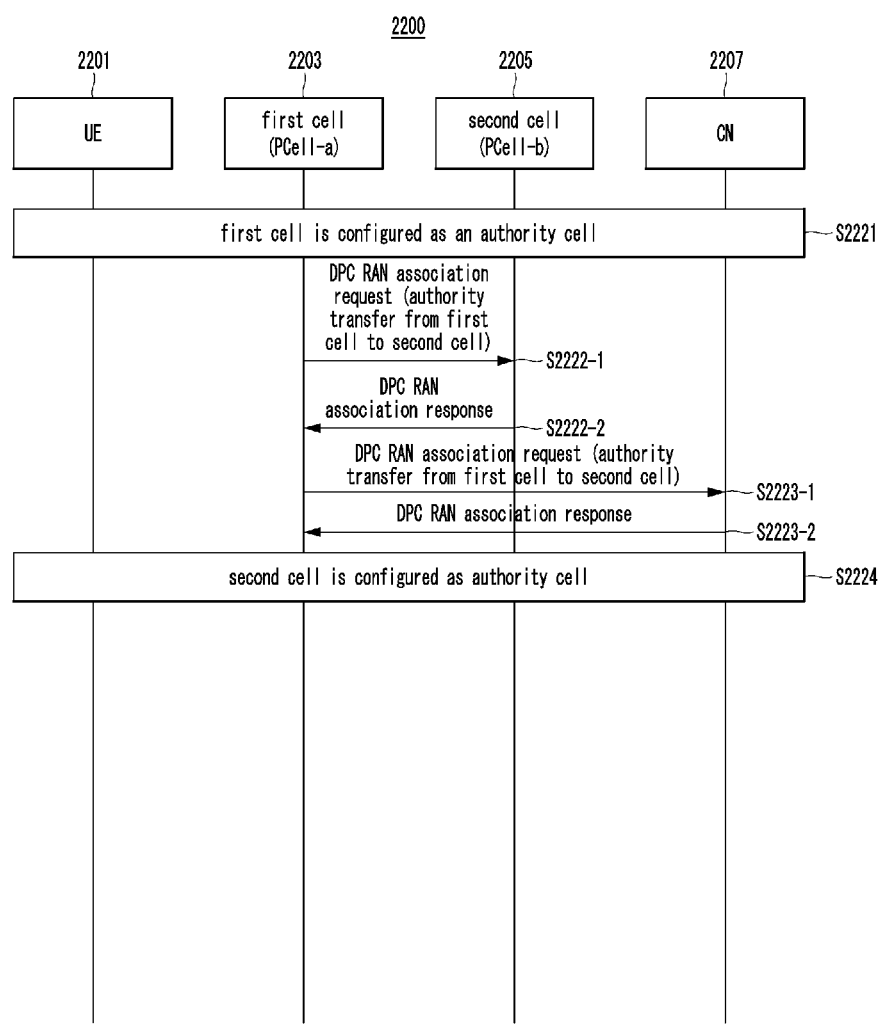

Referring to FIG. 22C, in an exemplary embodiment of the communication system 2200, the first cell 2203 and the second cell 2203 may be configured as PCells for the UE 2201, and the first cell 2203 may be configured as an authority cell (S2221). Here, a signaling procedure for changing the authority cell may be performed according to the third joint operation scheme.

Specifically, the first cell 2203 may transmit to the second cell 2205 a signal requesting to change the authority cell to the second cell 2205 (S2222-1). In other words, the first cell 2203 may transmit a signal informing the second cell 2205 that it intends to transfer the authority for joint operations, which it has as the authority cell, to the second cell 2205.

The second cell 2205 may identify that the first cell 2203 requests to change the authority cell to the second cell 2205 based on the relay signal received in the step S2222-2. In other words, the second cell 2205 may identify that the first cell 2203 intends to transfer the authority for joint operations that the first cell 2203 has as an authority cell to the second cell 2205. The second cell 2205 may transmit a response to the signal received in the step S2222-1 to the first cell 2203 (S2222-2). The response transmitted in the step S2222-2 may indicate whether the second cell 2205 accepts the request of the first cell 2203 or not.

When the second cell 2205 accepts the request of the first cell 2203, the first cell 2203 may transmit to the CN 2207 a signal indicating that the authority cell for joint operations has changed from the first cell 2203 to the second cell 2205 (S2223-1). The CN 2207 may transmit a response to the signal received in the step S2223-1 to the first cell 2203 (S2223-2).

Through the steps S2222-1 to S2223-2, the authority cell for joint operations of the PCells 2203 and 2205 including the first cell 2203 and the second cell 2205 may be changed from the first cell 2203 to the second cell 2205 (S2224).

Also, through the steps S2222-1 to S2223-2, the second cell 2205 and the CN 2207 may identify that the authority cell has been changed from the first cell 2203 to the second cell 2205.

The signals transmitted in the steps S2222-1 and S2223-1 may be included in a DPC RAN association request transmitted through the DPC IF. The responses transmitted in the steps S2223-2 and S2223-2 may be included in a DPC RAN association response transmitted through the NG-C.

Figure 22D:
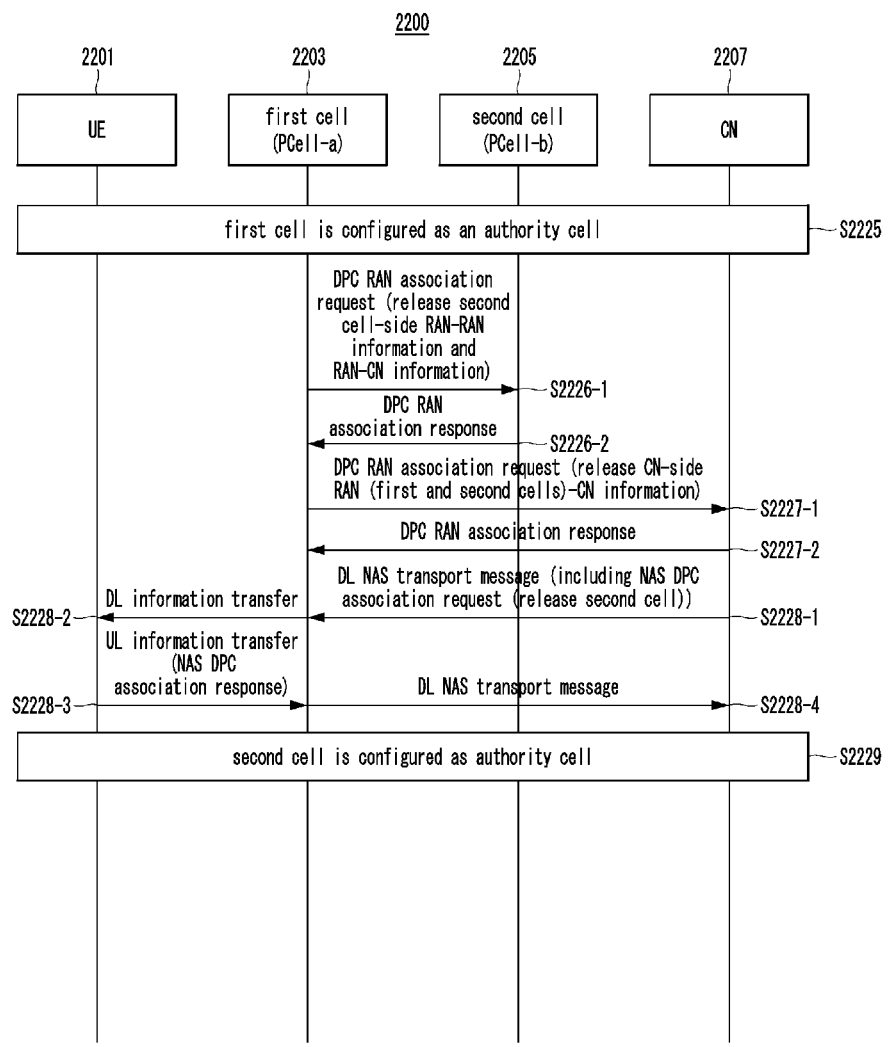

Referring to FIG. 22D, in an exemplary embodiment of the communication system 2200, the first cell 2203 and the second cell 2203 may be configured as PCells for the UE 2201, and the first cell 2203 may be configured as an authority cell (S2225). Here, the first cell 2203, the second cell 2205, and the CN 2207 may perform a signaling procedure for transitioning the second cell 2207 to a PSCell (i.e., PS-b). In other words, the first cell 2203, the second cell 2205, and the CN 2207 may perform a signaling procedure for releasing the interfaces NG-C-b, (x'), (y'-c), (y'-r), (z'), and the like.

Specifically, the first cell 2203 may transmit, to the second cell 2205, a signal requesting to release or delete the second cell-side RAN-CN information corresponding to the interfaces NG-C-b, (x'), and (y'-c), and the second cell-side RAN-RAN information corresponding to the interface (y'-r) (S2226-1). The second cell 2205 may remove the interfaces NG-C-b, (x') and (y'-c) and (y'-r) based on the signal received in the step S2226-1. The second cell 2205 may transmit a response to the signal received in the step S2226-1 to the first cell 2203 (S2226-2). The first cell 2203 may remove the interface (y'-r) based on the response received in the step S2226-2.

The first cell 2203 may transmit, to the CN 2207, a signal requesting to release or delete the CN-side second cell-CN information corresponding to the interfaces NG-C-b, (x'), and (y'-c), and the CN-side first cell-CN information corresponding to the interface (z') (S2227-1). The CN 2207 may remove the interfaces NG-C-b, (x'), (y'-c), and (z') based on the signal received in the step S2227-1. The CN 2207 may transmit a response to the signal received in the step S2227-1 to the first cell 2203 (S2227-2). The first cell 2203 may remove the interface (z') based on the response received in the step S2227-2.

The CN 2207 may transmit to the first cell 2203 a signal informing the UE 2201 that the second cell has been released from the PCell and transitioned to the PSCell (S2228-1). The first cell 2203 may transmit the signal received in the step S2228-1 to the UE 2201 (S2228-2). The UE 2201 may transmit a response to the signal received in the step S2228-2 to the first cell 2203 (S2228-3). The first cell 2203 may transmit the response received in the step S2228-3 to the CN 2207 (S2228-4). Based on the steps S2226-1 to S2228-4, the second cell 2205 may be released from the PCell and configured as a PSCell (S2229). In other words, the second cell 2205 may be transitioned from the PCell-b to a PSCell-b.

The signal transmitted in the step S2226-1 may be included in a DPC RAN association request transmitted through the DPC IF. The response transmitted in the step S2226-2 may be included in a DPC RAN association response transmitted through the DPC IF. The signal transmitted in the step S2227-1 may be included in a DPC association request or a DPC NG IF information request transmitted through the NG-C. The response transmitted in the step S2227-2 may be included in a DPC association response or a DPC NG IF information response transmitted through the NG-C.

The signals transmitted in the steps S2228-1 and S2228-2 may be included in a NAS DPC association request. The response transmitted in the steps S2228-3 and S2228-4 may be included in a NAS DPC association response. In the step S2228-1, the NAS DPC association request may be included in a DL NAS transport message. In the step S2228-2, the NAS DPC association request may be included in a DL information transfer message. In the step S2228-3, the NAS DPC association response may be included in a UL information transfer message. In the step S2228-4, the NAS DPC association response may be included in a UL NAS transport message.

Figure 22E:
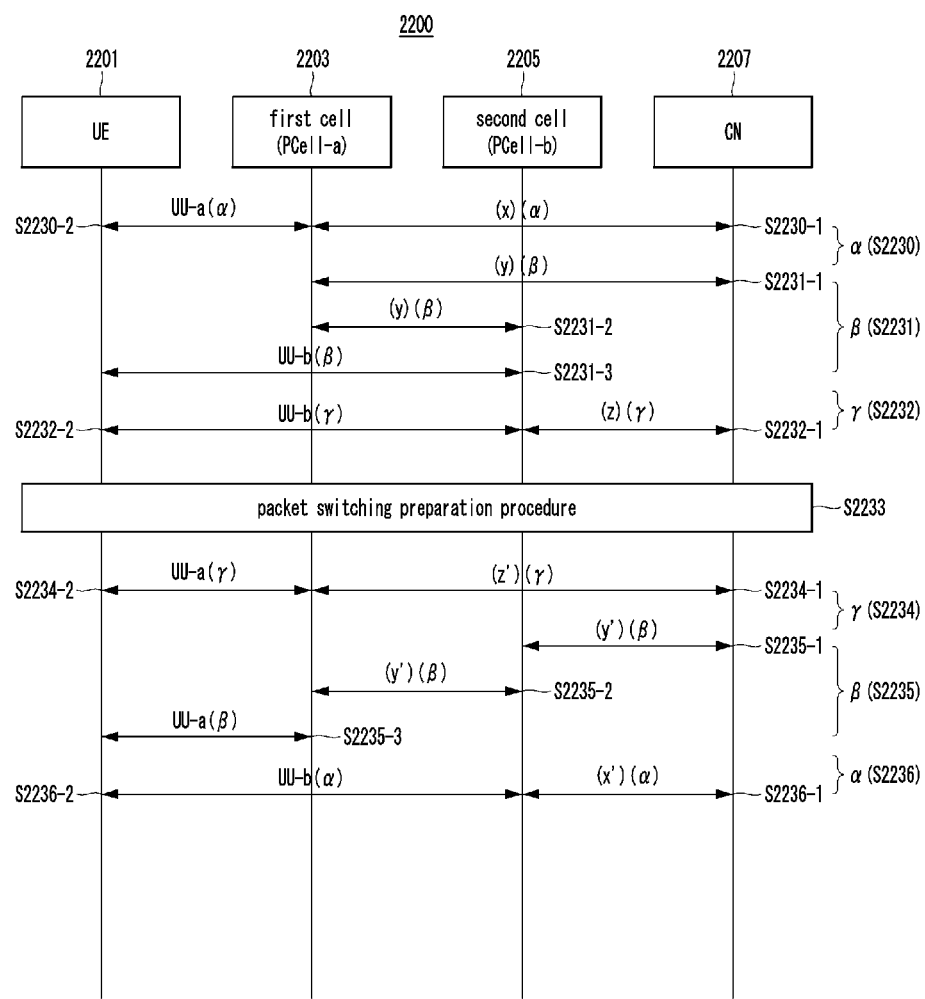

Referring to FIG. 22E, in an exemplary embodiment of the communication system 2200, the first cell 2203 and the second cell 2203 may be configured as PCells for the UE 2201, and the first cell 2203 may be configured an authority cell. In this case, DL/UL packets may be transmitted and received through a first path, a second path, and a third path. Here, the first to third paths may be the same as or similar to the first to third paths described with reference to FIGS. 19A to 19H.

Specifically, among DL/UL packets, a packet group α may be transmitted and received through the first path (S2230). The packet group α may be transmitted between the first cell 2203 and the CN 2207 through an interface (x) (S2230-1). The packet group α may be transmitted between the UE 2201 and the first cell 2203 through an interface UU-a (S2230-2).

Among DL/UL packets, a packet group β may be transmitted and received through the first path or the second path (S2231). The packet group β may be transmitted between the first cell 2203 and the CN 2207 through an interface (y-c) (S2231-1). The packet group β may be split in the first cell 2203. A part of the packet group (3 may be transmitted between the UE 2201 and the first cell 2203 through the interface UU-a corresponding to the first path. On the other hand, the other part of the packet group β may be transmitted between the first cell 2203 and the second cell 2205 through an interface (y-r) corresponding to the second path (S2231-2), and transmitted between the UE 2201 and the second cell 2205 through an interface UU-b (S2231-3).

Among DL/UL packets, a packet group γ may be transmitted and received through the third path (S2232). The packet group γ may be transmitted between the second cell 2205 and the CN 2207 through an interface (z) (S2232-1). The packet group γ may be transmitted between the UE 2201 and the second cell 2205 through the interface UU-b (S2232-2).

Here, a packet switching procedure through joint operations of the first cell 2203 and the second cell 2205 may be performed. Here, the packet switching means transmission of DL/UL packets to be transmitted through the first cell 2203 through the second cell 2205, and/or transmission of DL/UL packets to be transmitted through the second cell 2205 through the first cell 2203. In other words, the packet switching means that DL/UL packets to be transmitted through the first to third paths are transmitted through the fourth to sixth paths, and/or that DL/UL packets to be transmitted through the fourth to sixth paths are transmitted through the first to third paths. Here, the fourth to sixth paths may be the same as or similar to the fourth to sixth paths described with reference to FIGS. 19A to 19H.

For packet switching, a packet switching preparation procedure may be performed (S2233). The packet switching preparation procedure according to the step S2233 will be described in more detail with reference to FIG. 22F. As a result of the packet switching preparation procedure according to the step S2233, the packet switching may be performed. When the packet switching is performed, transmission paths of the packet groups α, β, and γ may be changed from the first to third paths to the fourth to sixth paths.

The packet group γ may be transmitted and received through the sixth path (S2234). The packet group γ may be transmitted between the first cell 2203 and the CN 2207 through an interface (z') (S2234-1). The packet group γ may be transmitted between the UE 2201 and the first cell 2203 through the interface UU-a (S2234-2).

The packet group β may be transmitted and received through the fourth path or the fifth path (S2235). The packet group β may be transmitted between the second cell 2205 and the CN 2207 through an interface (y'-c) (S2235-1). The packet group β may be split in the second cell 2205. A part of the packet group β may be transmitted between the UE 2201 and the second cell 2205 through the interface UU-b corresponding to the fourth path. On the other hand, the other part of the packet group β may be transmitted between the first cell 2203 and the second cell 2205 through the interface (y'-r) corresponding to the fifth path (S2235-2), and may be transmitted between the UE 2201 and the first cell 2203 through the interface UU-a (S2235-3).

The packet group α may be transmitted and received through the fourth path (S2236). On the fourth path, the packet group α may be transmitted between the second cell 2205 and the CN 2207 through the interface (x') (S2236-1). The packet group α may be transmitted between the UE 2201 and the second cell 2205 through the interface UU-b (S2236-2).

Figure 22F:
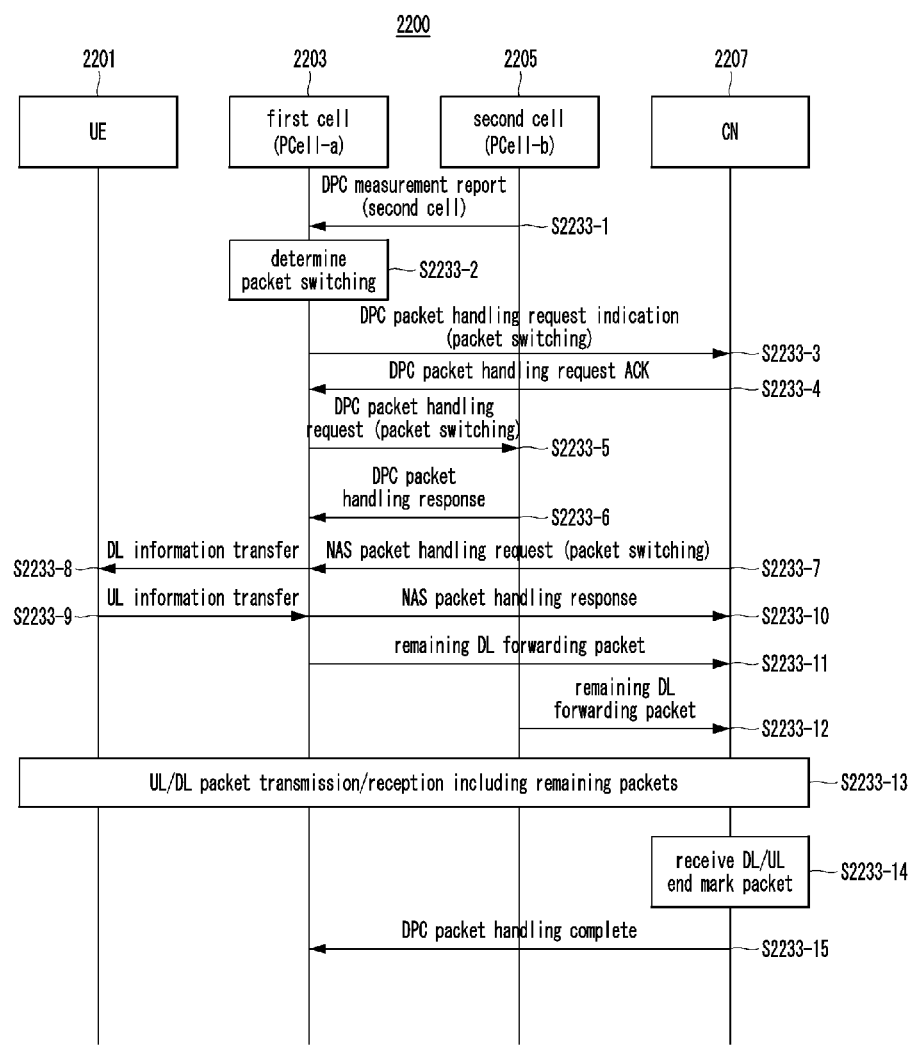

Referring to FIG. 22F, for the packet switching preparation procedure according to the step S2233, the second cell 2205 may report second cell measurement information. For example, the second cell 2205 may transmit second cell measurement information to the first cell 2203 (S2233-1). The first cell 2203 may determine packet switching based on the second cell measurement information received in the step S2233-1 (S2233-2).

The first cell 2203 may transmit to the CN 2207 a signal indicating requesting the CN 2207 to perform packet handling according to the packet switching described with reference to FIG. 22E (S2233-3). Here, the signal transmitted in the step S2233-3 may indicate that the first cell 2203 is to forward the remaining DL/UL packets not yet transmitted to the CN 2207. Alternatively, the signal transmitted in the step S2233-3 may correspond to a signal informing the CN 2207 that the first cell 2203 is to request packet handling according to the packet switching from the second cell 2205. The CN 2207 may transmit a response to the signal received in the step S2233-3 to the first cell 2203 (S2233-4). Here, the response transmitted in the step S2233-4 may indicate whether the CN 2207 accepts the packet handling request of the first cell 2203. The response transmitted in the step S2233-4 may include information a DL forwarding tunnel ID configured for the remaining DL forwarding packets forwarded from the first cell 2203 to the CN 2207, and a UL forwarding tunnel ID configured for the remaining UL forwarding packets from the first cell 2203 to the CN 2207. In addition, the response transmitted in the step S2233-4 may include information on a DL forwarding tunnel ID configured for the remaining DL forwarding packets forwarded from the second cell 2205 to the CN 2207, and a UL forwarding tunnel ID configured for the remaining UL forwarding packets from the second cell 2205 to the CN 2207.

The first cell 2203 may transmit, to the second cell 2205, a signal requesting the second cell 2205 to perform packet handling according to the packet switching described with reference to FIG. 22E (S2233-5). Here, the signal transmitted in the step S2233-5 may include at least some of the information received from the CN 2207 in the step S2233-4. That is, the signal transmitted in the step S2233-5 may include information on the DL forwarding tunnel ID and the UL forwarding tunnel ID configured for the second cell 2205. The second cell 2205 may transmit a response to the signal received in the step S2233-5 to the first cell 2203 (S2233-6). Here, the response transmitted in the step S2233-6 may indicate whether the second cell 2205 accepts the packet handling request of the first cell 2203.

The CN 2207 may transmit, to the first cell 2203, a signal requesting the UE 2201 to perform packet handling according to the packet switching described with reference to FIG. 22E (S2233-7). The first cell 2203 may transmit the signal received in the step S2233-7 to the UE 2201 (S2233-8). The UE 2201 may transmit a response to the signal received in the step S2233-8 to the first cell 2203 (S2233-9). The first cell 2203 may transmit the response received in the step S2233-9 to the CN 2207 (S2233-10).

The first cell 2203 and the second cell 2205 may perform packet forwarding according to the packet switching. Specifically, the first cell 2203 may transmit the remaining DL forwarding packets to the CN 2207 (S2233-11). Also, the first cell 2203 may transmit remaining the UL forwarding packets to the CN 2207. The second cell 2205 may transmit the remaining DL forwarding packets to the CN 2207 (S2233-12). Also, the second cell 2205 may transmit the remaining UL forwarding packets to the CN 2207.

The UE 2201, the first cell 2203, the second cell 2205, and the CN 2207 may transmit and receive UL/DL packets (S2233-13). In the step S2233-13, transmission and reception of the remaining forwarding packets transmitted from the first cell 2203 and the second cell 2205 may be performed together. The CN 2203 may transmit the remaining DL forwarding packets received from the first cell 2203 to the second cell 2205. On the other hand, the CN 2203 may transmit the remaining DL forwarding packets received from the second cell 2205 to the first cell 2203. The CN 2207 may receive a DL end mark packet and a UL end mark packet from the first cell 2203 (S2233-14). In this case, the CN 2207 may transmit a signal indicating completion of the packet handling according to packet switching to the first cell 2203 (S2233-15). Thus, the packet switching preparation procedure according to the step S2233 may be completed.

The signal transmitted in the step S2233-3 may be included in a DPC packet handling request indication. The response transmitted in the step S2233-4 may be included in a DPC packet handling request ACK. The signal transmitted in the step S2233-5 may be included in a DPC packet handling request transmitted through a DPC IF. The response transmitted in the step S2233-6 may be included in a DPC packet handling response transmitted through the DPC IF. The signals transmitted in the steps S2233-7 and S2233-8 each may be included in a NAS packet handling request. The responses transmitted in the steps S2233-9 and S2233-10 each may be included in a NAS packet handling response. In the step S2233-7, the NAS packet handling request may be included in a DL NAS transport message. In the step S2233-8, the NAS packet handling request may be included in a DL information transfer message. In the step S2233-9, the NAS packet handling response may be included in a UL information transfer message. In the step S2233-10, the NAS packet handling response may be included in a UL NAS transport message.

Figure 22G:
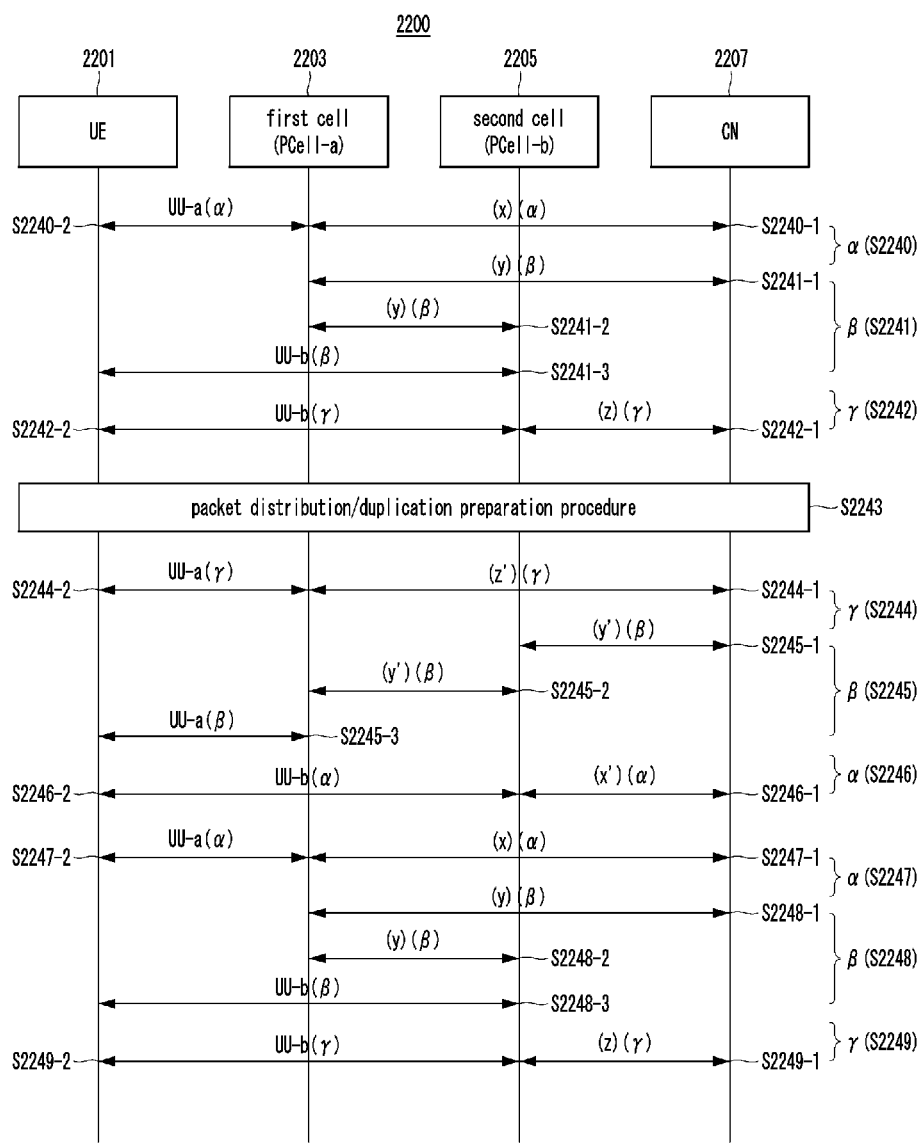

Referring to FIG. 22G, in an exemplary embodiment of the communication system 2200, the first cell 2203 and the second cell 2203 may be configured as PCells for the UE 2201, and the first cell 2203 may be configured as an authority cell. In this case, DL/UL packets may be transmitted and received through the first path, the second path, and the third path.

Among DL/UL packets, a packet group α may be transmitted and received through the first path (S2240), a packet group β may be transmitted and received through the first path or the second path (S2241), and a packet group γ may be transmitted and received through the third path (S2232). The transmission and reception operations (i.e., S2240, S2240-1, and S2240-2) of the packet group α through the first path may be performed identically or similarly to the steps S2230, S2230-1, and S2230-2 described with reference to FIG. 22E. The transmission and reception operations (i.e., S2241, S2241-1, S2241-2, and S2241-3) of the packet group β through the first path or the second path may be performed identically or similarly to the steps S2231, S2231-1, and S2231-2 described with reference to FIG. 22E. The transmission and reception operations (i.e., S2242, S2242-1, and S2242-2) of the packet group γ through the third path may be performed identically or similarly to the steps S2232, S2232-1, and S2232-2 described with reference to FIG. 22E.

Here, a packet distribution procedure or a packet duplication procedure through joint operations of the first cell 2203 and the second cell 2205 may be performed. Here, the packet distribution may mean that some of packets of the first cell 2203 are distributed to the second cell 2205. Also, the packet distribution may mean that some of packets of the second cell 2205 are distributed to the first cell 2203. In other words, packet distribution means that DL/UL packets to be transmitted through the first to third paths are distributed to the fourth to sixth paths, and/or that DL/UL packets to be transmitted through the fourth to sixth paths are distributed to the first to third paths.

On the other hand, the packet duplication means that the packets of the first cell 2203 are controlled to be duplicated and transmitted to both the first cell 2203 and the second cell 2205, and/or that the packets of the second cell 2205 are controlled to be duplicated and transmitted to both the first cell 2203 and the second cell 2205.

For packet distribution or packet duplication, a packet distribution/duplication preparation procedure may be performed (S2243). The packet distribution/duplication preparation procedure according to the step S2243 will be described in more detail with reference to FIG. 22H. As a result of the packet distribution/duplication preparation procedure according to the step S2243, packet distribution or packet duplication may be performed.

When packet distribution is performed, the packet groups α, β, and γ may be distributed and transmitted through the first to third paths or the fourth to sixth paths. For example, the packet group α to be transmitted through the first path may be distributed and transmitted through the first path (S2247) or transmitted through the fourth path (S2246). The packet group β to be transmitted through the first path or the second path may be distributed and transmitted through the first path or the second path (S2248) or transmitted through the fourth or fifth path (S2245). The packet group γ to be transmitted through the third path may be distributed and transmitted through the third path (S2249) or transmitted through the sixth path (S2244).

On the other hand, when packet duplication is performed, the packet groups α, β, and γ may be duplicated and transmitted through the first to third paths and the fourth to sixth paths. For example, the packet group α to be transmitted through the first path may be duplicated and transmitted through the first path (S2247), and may also be transmitted through the fourth path (S2246, S2247). The packet group β to be transmitted through the first path or the second path may be duplicated and transmitted through the first path or the second path (S2248), and may also be transmitted through the fourth and fifth paths (S2245). The packet group γ to be transmitted through the third path may be duplicated and transmitted through the third path (S2249) and also transmitted through the sixth path (S2244).

The transmission and reception operations (i.e., S2244, S2244-1, and S2244-2) of the packet group γ through the sixth path may be performed identically or similarly to the steps S2234, S2234-1, and S2234-2 described with reference to FIG. 22E. The transmission and reception operations (i.e., S2245, S2245-1, S2245-2, and S2245-3) of the packet group through the fourth or fifth path may be performed identically or similarly to the steps S2235, S2235-1, and S2235-2 described with reference to FIG. 22E. The transmission and reception operations (i.e., S2246, S2246-1, and S2246-2) of the packet group α through the fourth path may be performed identically or similarly to the steps S2236, S2236-1, and S2236-2 described with reference to FIG. 22E.

The transmission and reception operations (i.e., S2247, S2247-1, and S2247-2) of the packet group α through the first path may be performed identically or similarly to the steps S2240, S2240-1, and S2240-2 prior to the step S2243. The transmission and reception operations (i.e., S2248, S2248-1, S2248-2, and S2248-3) of packet group β through the first path or the second path may be performed identically or similarly to the steps S2241, S2241-1, S2241-2, and S2241 prior to the step S2243. The transmission and reception operations (i.e., S2249, S2249-1, and S2249-2) of the packet group γ through the third path may be performed identically or similarly to the steps S2242, S2242-1, and S2242-2 prior to the step S2243.

Figure 22H:
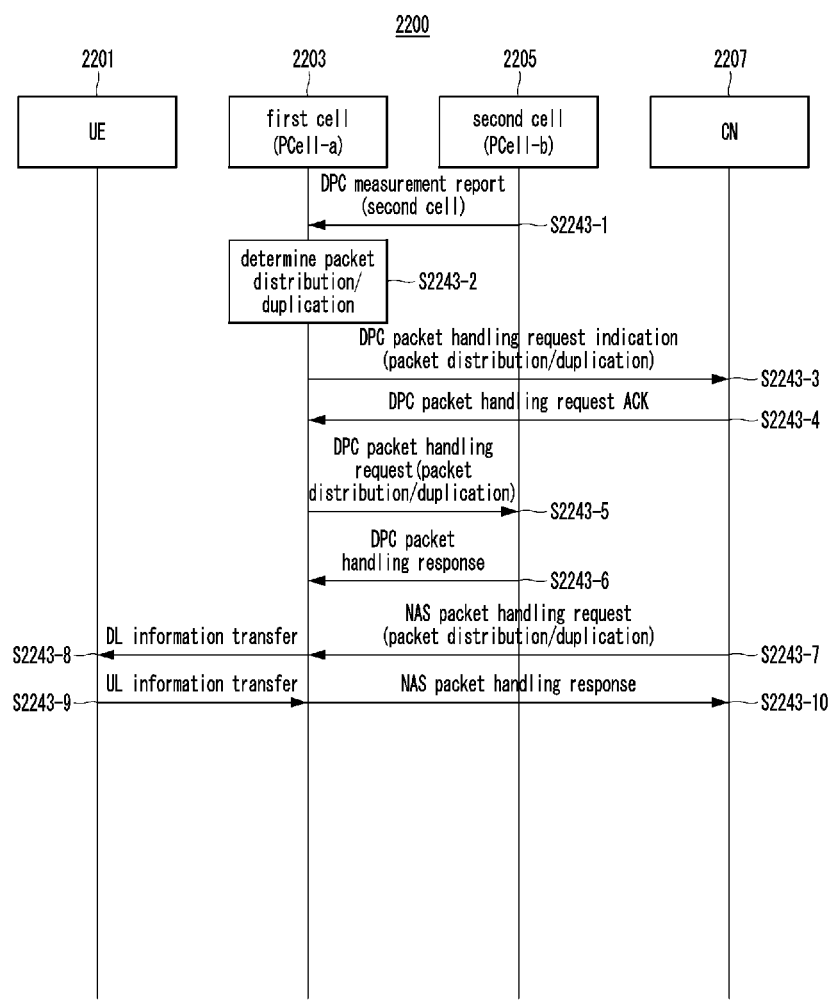

Referring to FIG. 22H, for the packet distribution/duplication preparation procedure according to the step S2243, the second cell 2205 may report second cell measurement information. For example, the second cell 2205 may transmit second cell measurement information to the first cell 2203 (S2243-1). The first cell 2203 may determine packet distribution or packet duplication based on the second cell measurement information received in the step S2243-1 (S2243-2).

The first cell 2203 may transmit to the CN 2207 a signal indicating requesting the CN 2207 to perform packet handling according to the packet distribution or packet duplication described with reference to FIG. 22G (S2243-3). The CN 2207 may transmit a response to the signal received in the step S2243-3 to the first cell 2203 (S2243-4).

The first cell 2203 may transmit, to the second cell 2205, a signal requesting the second cell 2205 to perform packet handling according to the packet distribution or packet duplication described with reference to FIG. 22G (S2243-5). The second cell 2205 may transmit a response to the signal received in the step S2243-5 to the first cell 2203 (S2243-6).

The CN 2207 may transmit, to the first cell 2203, a signal requesting the UE 2201 to perform packet handling according to the packet distribution or packet duplication described with reference to FIG. 22G (S2243-7). The first cell 2203 may transmit the signal received in the step S2243-7 to the UE 2201 (S2243-8). The UE 2201 may transmit a response to the signal received in the step S2243-8 to the first cell 2203 (S2243-9). The first cell 2203 may transmit the response received in the step S2243-9 to the CN 2207

(S2243-10). Accordingly, the packet distribution/replication preparation procedure according to the step S2243 may be completed.

The signal transmitted in the step S2243-3 may be included in a DPC packet handling request indication. The response transmitted in the step S2243-4 may be included in a DPC packet handling request ACK. The signal transmitted in the step S2243-5 may be included in a DPC packet handling request transmitted through the DPC IF. The response transmitted in the step S2243-6 may be included in a DPC packet handling response transmitted through the DPC IF. The signals transmitted in the steps S2243-7 and S2243-8 may be included in a NAS packet handling request. The responses transmitted in the steps S2243-9 and S2243-10 may be included in a NAS packet handling response. In the step S2243-7, the NAS packet handling request may be included in a DL NAS transport message. In the step S2243-8, the NAS packet handling request may be included in a DL information transfer message. In the step S2243-9, the NAS packet handling response may be included in a UL information transfer message. In the step S2243-10, the NAS packet handling response may be included in a UL NAS transport message.

In an exemplary embodiment of the cell operation method according to the third joint operation scheme, the first cell 2203, which is a PCell connected to the UE 2201 and the CN 2207, may perform a first signaling procedure for transitioning the second cell 2205, which is a PSCell connected to the UE 2201 and the CN 2207, to a PCell. Based on a result of the first signaling procedure, the first cell 2203 may identify that the first cell 2203 and the second cell 2205 are to be jointly operated as coordinative PCells. This may be the same as or similar to those described with reference to FIG. 22A.

The first cell 2203 may transmit, to the UE 2201, a first signal including information on joint operations of the coordinative PCells. Through this, the UE 2201 may identify that the first cell 2203 and the second cell 2205 are jointly operated by the CN 2207 as the coordinative PCells. This may be the same as or similar to those described with reference to FIG. 20C.

When joint operations of the first cell 2203 and the second cell 2205, which are the coordinative PCells, are performed, a first CP interface may be configured between the CN 2207 and the first cell 2203, and a second CP interface may be configured between the CN 2207 and the second cell 2205. The first cell 2203 may communicate with the CN 2207 and the UE 2201 based on the joint operations of the coordinative PCells. This may be the same as or similar to those described with reference to FIGS. 22B to 22H.

Figure 23A:
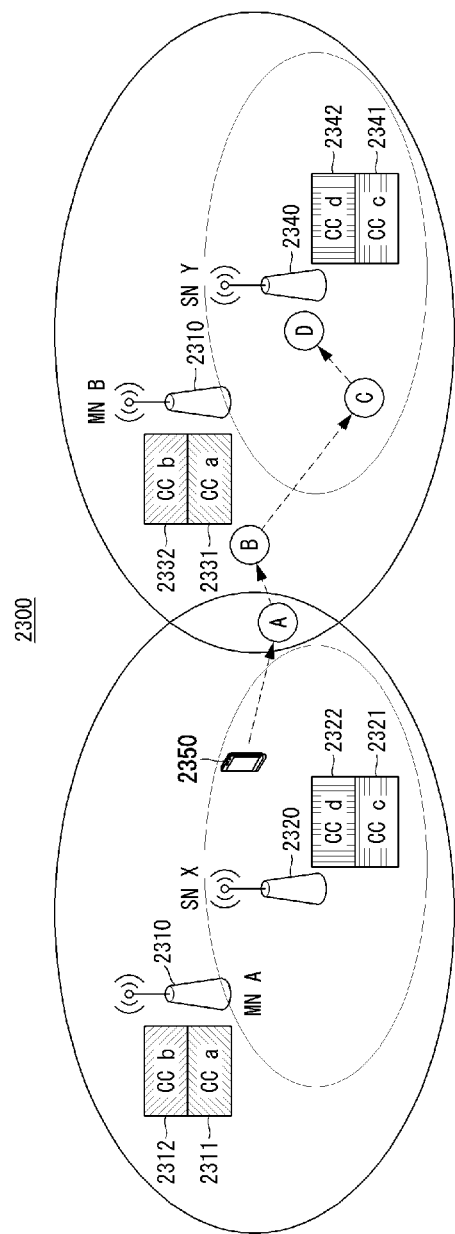
FIGS. 23A and 23B are conceptual diagrams for describing a first exemplary embodiment of a change in data rate according to UE movement in the first exemplary embodiment of the cell operation method.
Figure 23B:
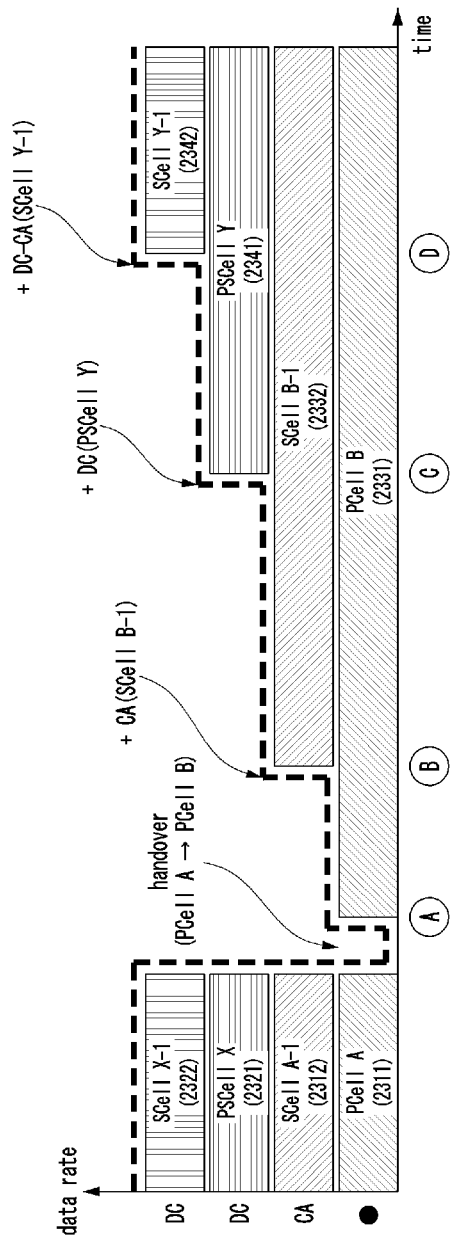

FIGS. 23A and 23B are conceptual diagrams for describing a first exemplary embodiment of a change in data rate according to UE movement in the first exemplary embodiment of the cell operation method.

Referring to FIGS. 23A and 23B, a communication system 2300 may include a first communication node 2310, a second communication node 2320, a third communication node 2330, a fourth communication node 2340, and a fifth communication node 2350. The communication system 2300 may support at least the first exemplary embodiment of the cell operation method.

The first communication node 2310 may be referred to as an MN A that forms a PCell A 2311 using a CC a. The first communication node 2310 may further form an SCell A-1 2312 using a CC b. The second communication node 2320 may be referred to as an SN X forming a PSCell X 2321 using a CC c. The second communication node 2320 may further form an SCell X-1 2312 using a CC d. The PSCell X 2321 may be regarded as being extended from the PCell A 2311 based on DC.

The third communication node 2330 may be referred to as an MN B forming a PCell B 2331 using the CC a. The third communication node 2330 may further form an SCell B-1 2332 using the CC b. The fourth communication node 2340 may be referred to as an SN Y forming a PSCell Y 2341 using the CC c. The fourth communication node 2340 may further form an SCell Y-1 2332 using the CC d. The PSCell Y 2341 may be regarded as being extended from the PCell B 2331 based on DC.

The fifth communication node 2350 may correspond to a UE. The fifth communication node 2350 may be located within a coverage of the first communication node 2310 and a coverage of the second communication node 2320. The fifth communication node 2350 may move to a point A, point B, point C, point D, and the like. FIG. 23A shows positions of the points A to D and a moving path of the fifth communication node 2350 in accordance therewith.

Meanwhile, a graph of FIG. 23B shows a change in data rate (or data transmission rate) experienced by the fifth communication node 2350 according to the movement of the fifth communication node 2350. For example, the fifth communication node 2350 may be connected to the PCell A 2311 and the SCell A-1 2312 formed by the first communication node 2310 at the initial position. Also, the connection to the fifth communication node 2350 may be extended based on DC. The fifth communication node 2350 may be connected to the PSCell X 2321 and the SCell X-1 2322 formed by the second communication node 2320 through the PCell A 2311. In this case, the data rate may be kept high.

As the fifth communication node 2350 moves to the point A, it may depart from the coverage of the first communication node 2310. In this case, the fifth communication node 2350 may lose connections with the cells 2311 and 2312 formed by the first communication node 2310 and the cells 2321 and 2322 formed by the second communication node 2320. In this case, data transmission may be interrupted.

Accordingly, the fifth communication node 2350 may be connected to a cell formed by the third communication node 2330 through a handover procedure. That is, the fifth communication node 2350 may be connected to the PCell B 2331. In this case, data transmission may be resumed. Then, the connection to the fifth communication node 2350 may be extended based on CA, and the SCell B-1 2332 may be added. Accordingly, the data transmission rate may be improved.

As the fifth communication node 2350 moves to the point C via the point B, the connection to the fifth communication node 2350 may be extended based on DC. That is, the fifth communication node 2350 may be connected to the PSCell Y 2341 formed by the fourth communication node 2340. In this case, the data transmission rate may be improved. Then, the connection to the fifth communication node 2350 may be extended based on DC and CA, and the SCell Y-1 2342 may be added. Accordingly, the data transmission rate may be improved.

Figure 24A:
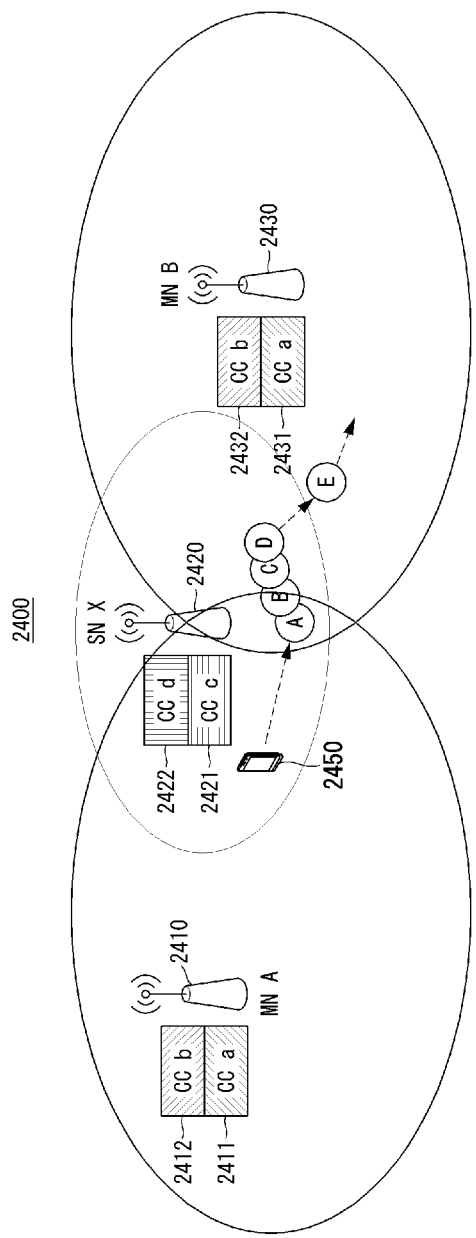
FIGS. 24A and 24B are conceptual diagrams for describing a second exemplary embodiment of a change in data rate according to UE movement in the first exemplary embodiment of the cell operation method.
Figure 24B:
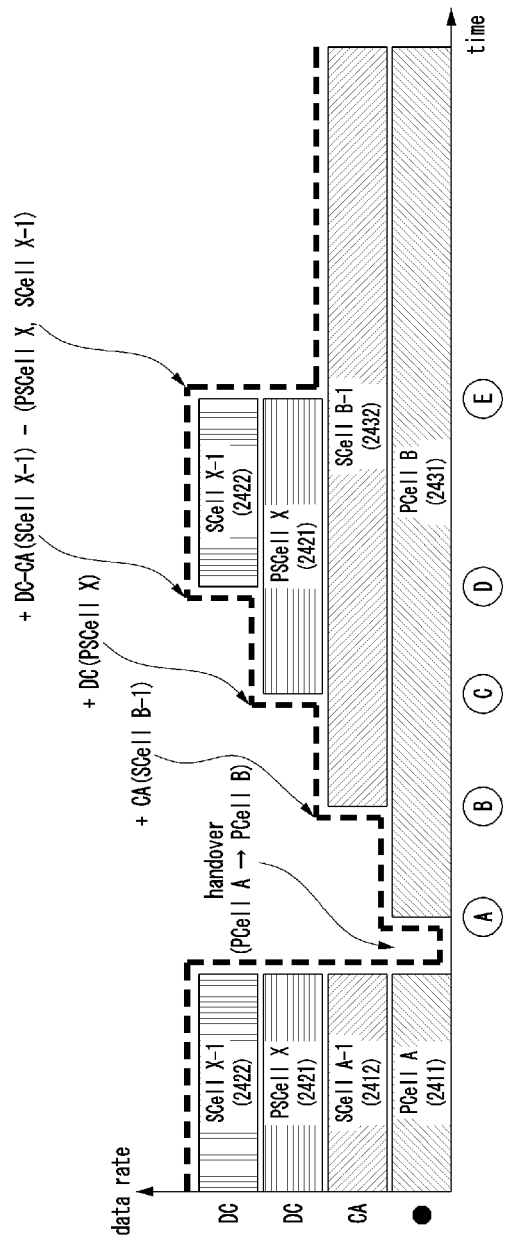

FIGS. 24A and 24B are conceptual diagrams for describing a second exemplary embodiment of a change in data rate according to UE movement in the first exemplary embodiment of the cell operation method.

Referring to FIGS. 24A and 24B, a communication system 2400 may include a first communication node 2410, a second communication node 2420, a third communication node 2430, and a fourth communication node 2450. The communication system 2400 may support at least the first exemplary embodiment of the cell operation method. The first to third communication nodes 2410, 2420, and 2430 may be the same as or similar to the first to third communication nodes 2310, 2320, and 2330 described with reference to FIGS. 23A and 23B. Here, the second communication node 2420 may be located at a point where a coverage of the first communication node 2410 and a coverage of the third communication node 2430 overlap.

The fourth communication node 2450 may be the same as or similar to the fifth communication node described with reference to FIGS. 23A and 23B. The fourth communication node 2450 may be located within the coverage of the first communication node 2410 and the coverage of the second communication node 2420. The fourth communication node 2450 may move to a point A, point B, point C, point D, point E, and the like. FIG. 24A shows positions of the points A to E and a moving path of the fourth communication node 2450 in accordance therewith.

Meanwhile, a graph of FIG. 24B shows a change in data rate (or data transmission rate) experienced by the fourth communication node 2450 according to the movement of the fourth communication node 2450. For example, the fourth communication node 2450 may be connected to the PCell A 2411 and the SCell A-1 2412 formed by the first communication node 2410 at the initial position. Also, the connection to the fourth communication node 2450 may be extended based on DC. The fourth communication node 2450 may be connected to the PSCell X 2421 and the SCell X-1 2422 formed by the second communication node 2420 through the PCell A 2411. In this case, the data rate may be kept high.

As the fourth communication node 2450 moves to the point A, it may depart from the coverage of the first communication node 2410. In this case, the fourth communication node 2450 may lose connections with the cells 2411 and 2412 formed by the first communication node 2410. Here, as the fourth communication node 2450 loses the connection with the PCell A 2411, the fourth communication 2450 may further lose connections with the cells 2421 and 2422 formed by the second communication node 2420 through the PCell A 2411 even though it is still within the coverage of the second communication node 2410. In this case, data transmission may be interrupted.

Accordingly, the fourth communication node 2450 may be connected to a cell formed by the third communication node 2430 through a handover procedure. That is, the fourth communication node 2450 may be connected to the PCell B 2431. In this case, data transmission may be resumed. Then, the connection to the fourth communication node 2450 may be extended based on CA, and the SCell B-1 2432 may be added. Accordingly, the data transmission rate may be improved.

Here, the fourth communication node 2450 may be reconnected to the second communication node 2420 based on DC at a point where the coverage of the second communication node 2420 and the coverage of the third communication node 2430 overlap. That is, the fourth communication node 2450 may be connected to the PSCell X through the PCell B 2431. Accordingly, the data transmission rate may be improved. Also, the connection to the fourth communication node 2450 may be extended based on DC and CA, and the SCell X-1 2432 may be added. Accordingly, the data transmission rate may be improved.

As the fourth communication node 2450 moves to the point E, it may depart from the coverage of the second communication node 2420. In this case, the fourth communication node 2450 may depart from the coverage of the second communication node 2420. In this case, the fourth communication node 2450 may lose connections with the cells 2421 and 2422 formed by the second communication node 2420.

As described with reference to FIGS. 23A and 24B, the connection to the UE may be extended based on CA and/or DC, and thus the data transmission rate may be improved. However, when the connection with the previously connected PCell is disconnected due to a cause such as movement of the UE, data transmission may be completely stopped temporarily.

Figure 25A:
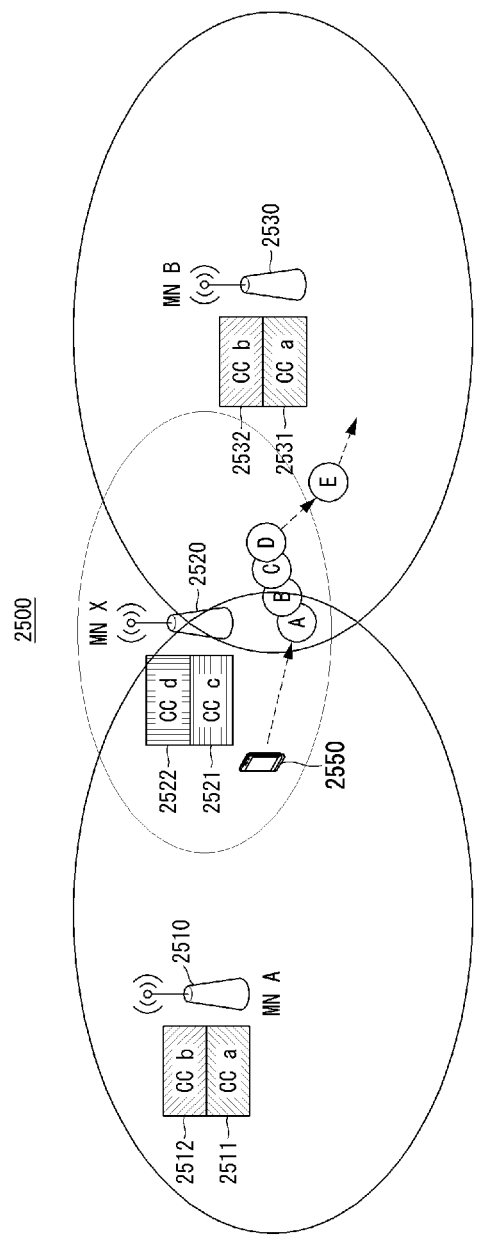
FIGS. 25A and 25B are conceptual diagrams for describing an exemplary embodiment of a change in data rate according to UE movement in the second exemplary embodiment of the cell operation method.
Figure 25B:
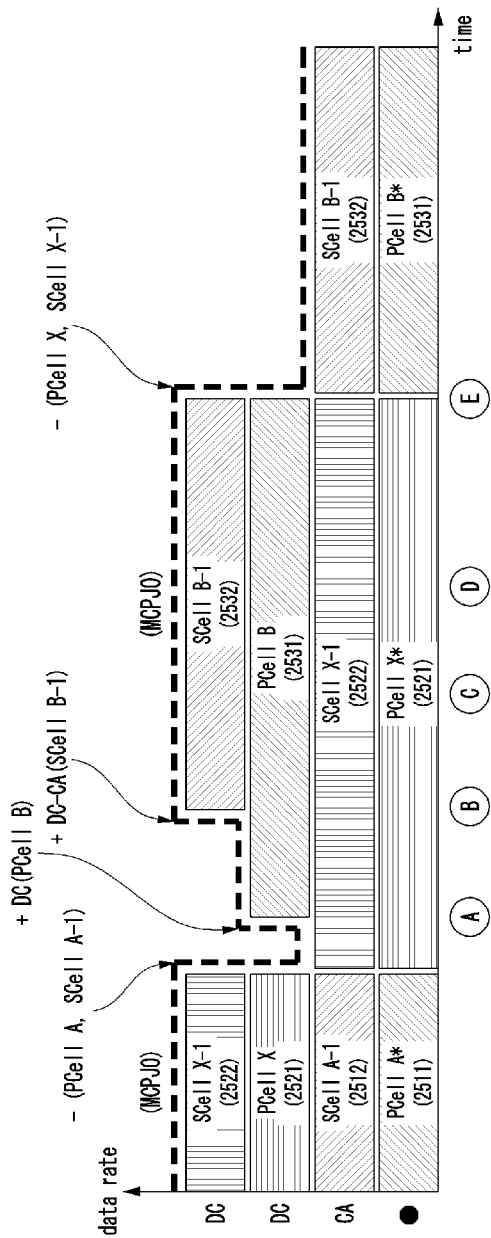

FIGS. 25A and 25B are conceptual diagrams for describing an exemplary embodiment of a change in data rate according to UE movement in the second exemplary embodiment of the cell operation method.

Referring to FIGS. 25A and 25B, a communication system 2500 may include a first communication node 2510, a second communication node 2520, a third communication node 2530, and a fourth communication node 2550. The first to third communication nodes 2510, 2520, and 2530 may be arranged identically or similarly to the first to third communication nodes 2410, 2420, and 2430 described with reference to FIGS. 24A and 24B. The fourth communication node 2550 may move identically or similarly to the fourth communication node 2450 described with reference to FIGS. 24A and 24B. FIG. 25A shows positions of the points A to E and a moving path of the fourth communication node 2550 in accordance therewith.

Meanwhile, a graph of FIG. 25B shows a change in data rate (or data transmission rate) experienced by the fourth communication node 2550 according to the movement of the fourth communication node 2550. Here, unlike the communication system 2400 described with reference to FIGS. 24A and 24B, the communication system 2500 may support at least the second exemplary embodiment of the cell operation method. Accordingly, a trend of the change in data rate experienced by the fourth communication node 2550 may be different from that shown in FIG. 25B.

Specifically, the fourth communication node 2550 may be connected to the PCell A 2511 and the SCell A-1 2512 formed by the first communication node 2510 at the initial position. In addition, the fourth communication node 2550 may be connected to the PCell X 2521 and the SCell X-1 2522 formed by the second communication node 2520 based on the second exemplary embodiment of the cell operation method. That is, the fourth communication node 2550 may be in a dual PCell or multi-PCell state. Here, the PCell A 2511 may correspond to an authority cell.

As the fourth communication node 2550 moves to the point A, it may depart from the coverage of the first communication node 2510. In this case, the fourth communication node 2550 may lose connections with the cells 2511 and 2512 formed by the first communication node 2510. However, the fourth communication node 2550 may not lose connections with the cells 2521 and 2522 formed by the second communication node 2520 based on the second exemplary embodiment of the cell operation method. Accordingly, data transmission may not be interrupted. In this case, the fourth communication node 2550 may be in a single PCell state, and the PCell X 2521 may correspond to an authority cell.

Based on the second exemplary embodiment of the cell operation method, the fourth communication node 2450 may be connected to the PCell A 2531 formed by the third communication node 2530. In this case, the fourth communication node 2550 may be in a dual PCell or multi-PCell state. Then, the connection to the fourth communication node 2550 may be extended based on CA, and the SCell B-1 2532 may be added. Accordingly, the data transmission rate may be improved.

As the fourth communication node 2550 moves to the point E, it may depart from the coverage of the second communication node 2520. In this case, the fourth communication node 2550 may depart from the coverage of the second communication node 2520. In this case, the fourth communication node 2550 may lose connections with the cells 2521 and 2522 formed by the second communication node 2520. In this case, the fourth communication node 2550 may be in a single PCell state, and the PCell B 2531 may correspond to an authority cell.

As described with reference to FIGS. 25A and 25B, the UE may be connected to a plurality of PCells based on the second exemplary embodiment of the cell operation method. In this case, even when connections to some PCells are disconnected, if connections to other PCells are maintained, temporary interruption of data transmission may not occur and the data transmission rate may be maintained reliably.

Figure 26:
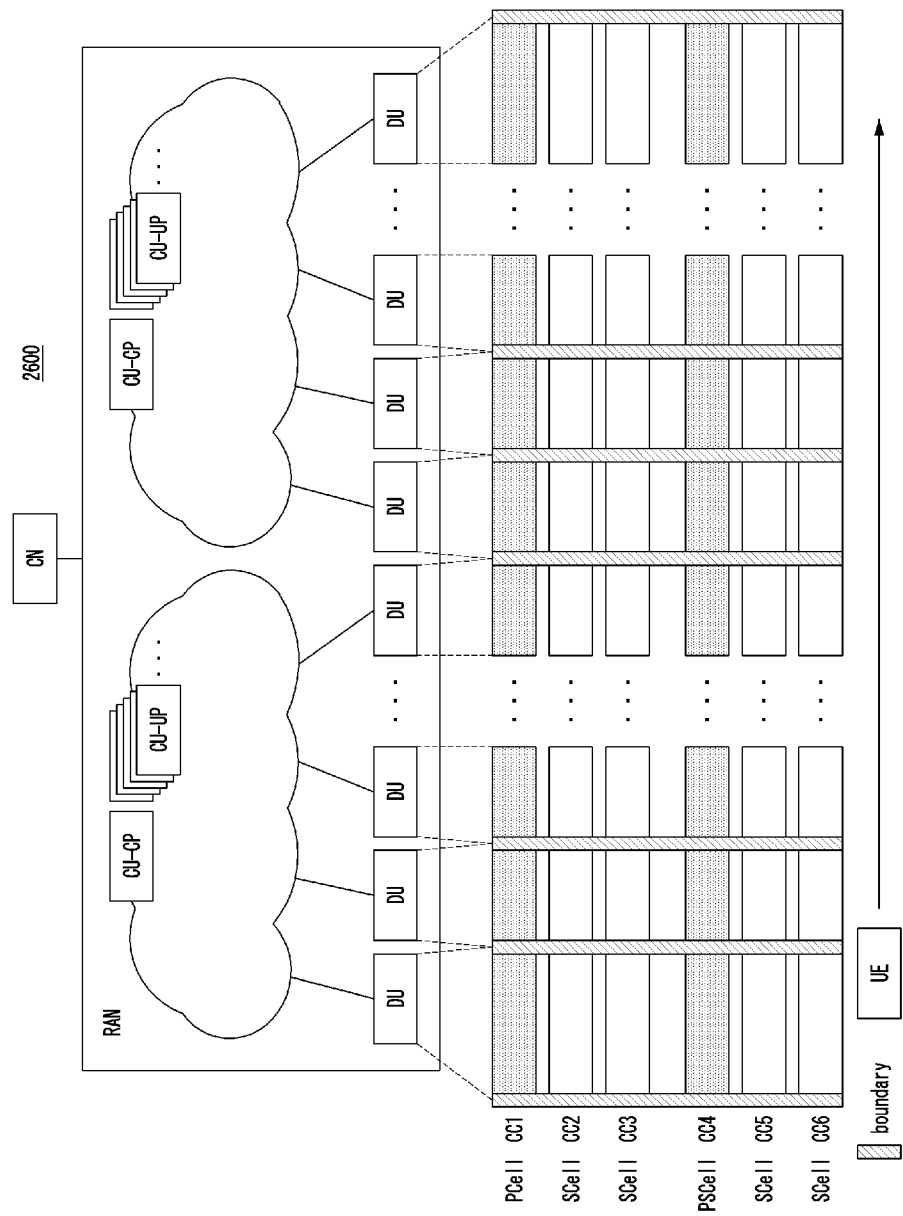
FIG. 26 is a conceptual diagram for describing an exemplary embodiment of cell planning according to the first exemplary embodiment of the cell operation method.

FIG. 26 is a conceptual diagram for describing an exemplary embodiment of cell planning according to the first exemplary embodiment of the cell operation method.

Referring to FIG. 26, in an exemplary embodiment of the communication system 2600, a functional split scheme may be applied to the RAN. Accordingly, the functions of the RAN may be split into one or more CU-CPs, one or more CU-UPs, and a plurality of DUs. The communication system 2600 may support the first exemplary embodiment of the cell operation method. Accordingly, in the communication system 2600, a UE may be connected to only one PCell.

In an exemplary embodiment of the communication system 2600, a plurality of DUs may be arranged in a line along a road. When a UE accesses, a plurality of DUs may form a PCell using a CC1, and may form SCells extended from the PCell using a CC2 and CC3. Meanwhile, a plurality of DUs may form a PSCell using a CC4, and may form SCells extended from the PSCell using the CC2 and CC3. A cell boundary may exist between the plurality of DUs.

The UE may move along a road where the plurality of DUs are arranged in a line. As the UE moves, it may be connected to one PCell, one PSCell, and SCells formed by the DUs. Here, the UE may handover from one DU to another DU each time it crosses a cell boundary. In the exemplary embodiment of cell planning shown in FIG. 26, whenever the UE performs handover between the DUs, data transmission may be temporarily interrupted while disconnecting from the previously connected cells.

Figure 27A:
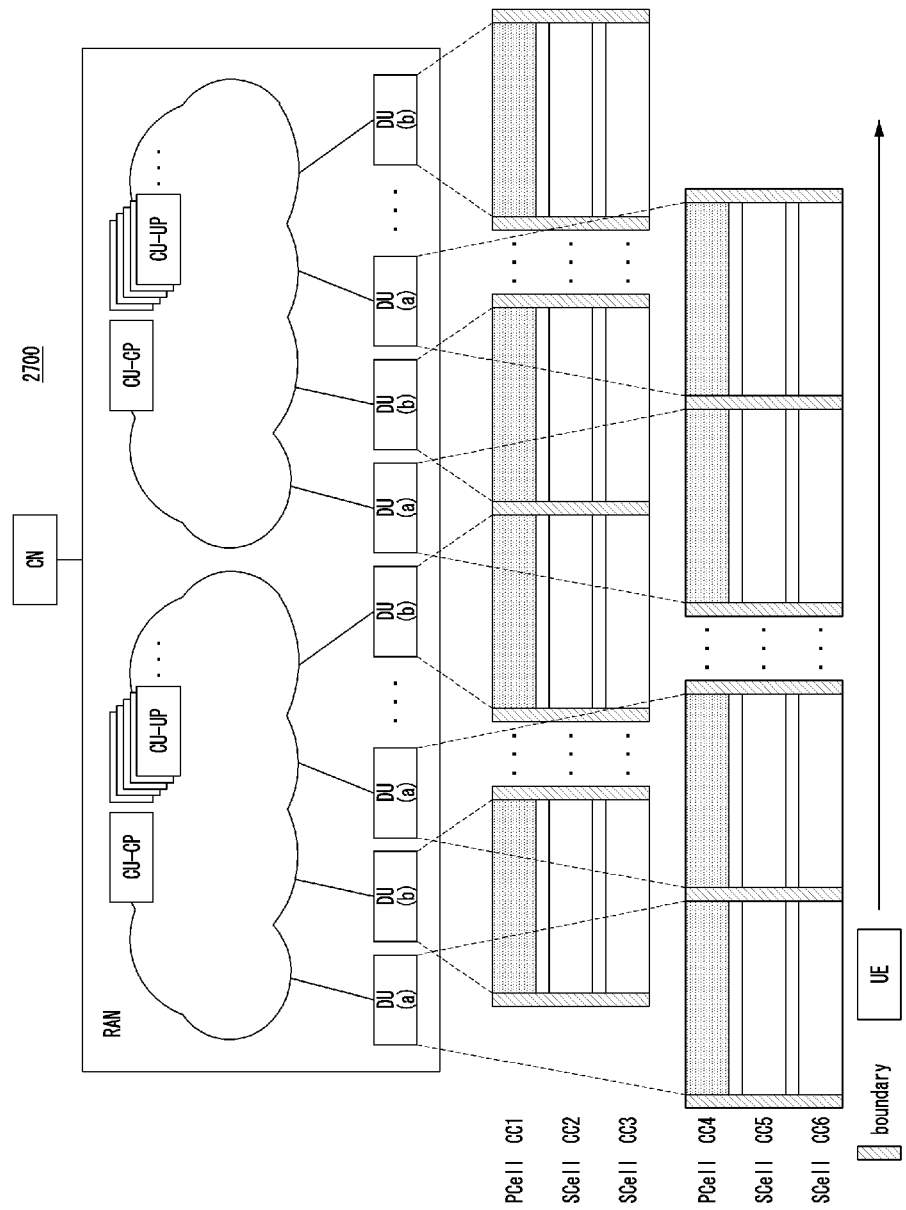
FIGS. 27A and 27B are conceptual diagrams for describing exemplary embodiments of cell planning according to the second exemplary embodiment of the cell operation method.
Figure 27B:
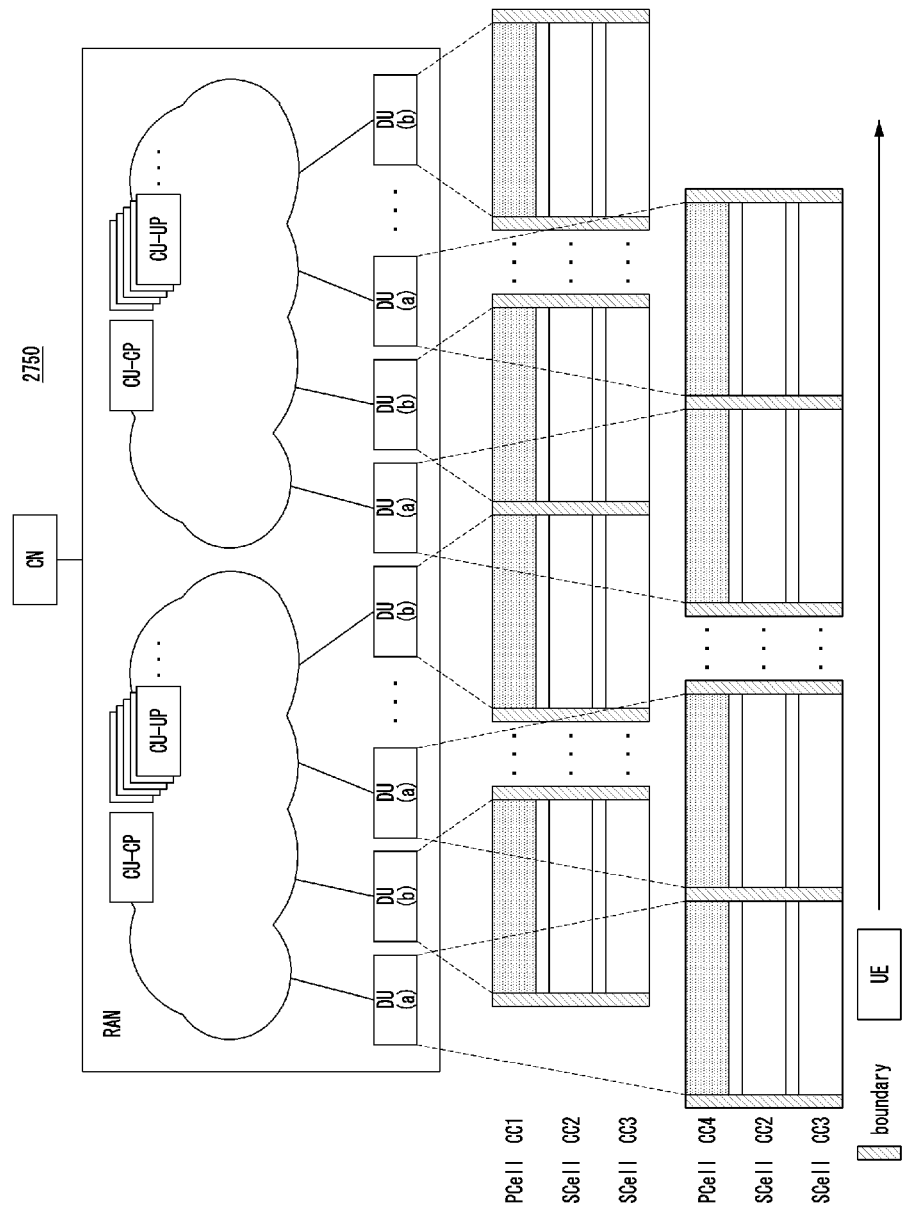

FIGS. 27A and 27B are conceptual diagrams for describing exemplary embodiments of cell planning according to the second exemplary embodiment of the cell operation method.

Referring to FIGS. 27A and 27B, in an exemplary embodiment of the communication system 2700 or 2750, a functional split scheme may be applied to the RAN. Accordingly, the functions of the RAN may be split into one or more CU-CPs, one or more CU-UPs, and a plurality of DUs. The communication systems 2700 and 2750 may support the second exemplary embodiment of the cell operation method. Accordingly, in the communication systems 2700 and 2750, a UE may be simultaneously connected to a plurality of PCells.

Referring to FIG. 27A, in an exemplary embodiment of the communication system 2700, a plurality of DUs may be arranged in a line along a road. Odd-numbered DUs among the plurality of DUs may be referred to as DU (a), respectively, and even-numbered DUs among the plurality of DUs may be referred to as DU (b), respectively. When the UE accesses, the DU (a) and DU (b) may form cells using different CCs. For example, the DU (a) may form a PCell using CC4, and may form SCells extended from the PCell of CC4 using CC5 and CC6. On the other hand, the DU (b) may form a PCell using CC1, and may form SCells extended from the PCell of CC1 using CC2 and CC3. A cell boundary may exist between the plurality of DUs (a). A cell boundary may exist between the plurality of DUs (b). A cell boundary between the plurality of DUs (a) and a cell boundary between the plurality of DUs (b) may be formed at different positions.

The UE may move along a road where the plurality of DUs are arranged in a line. As the UE moves, it may be connected to one PCell, one PSCell, and SCells formed by the DUs. Depending on the position, the UE may be simultaneously connected to the PCell formed by the DU (a) using CC4 and the PCell formed by the DU (b) using CC1. This may correspond to a dual PCell situation.

When the UE passes a cell boundary between the plurality of DUs (a), it may temporarily lose a connection with a PCell formed by one DU (a) using CC4. The UE may again connect to a PCell formed by another DU (a) using CC4. On the other hand, when the UE passes a cell boundary between the plurality of DUs (b), it may temporarily lose a connection with a PCell formed by one DU (b) using CC1. The UE may again connect to a PCell formed by another DU (b) using CC1. Whenever the UE loses the connection with the PCell, it may lose connections with SCells connected through the corresponding PCell. Whenever the UE is connected to the PCell, it may be connected to the SCells again through the corresponding PCell.

That is, in an exemplary embodiment of the cell planning shown in FIG. 27A, a time at which the UE loses the connection to the PCell of CC1 and a time at which the UE loses the connection to the PCell of CC4 may be different. In other words, the UE may maintain a connection with at least one of the PCell of CC1 or the PCell of CC4 at all times. Accordingly, the UE may stably receive services from DUs while moving without data interruption.

Referring to FIG. 27B, communication nodes constituting an exemplary embodiment of the communication system 2750 may be configured similarly to the communication nodes constituting an exemplary embodiment of the communication system 2700 described with reference to FIG. 27A. Here, DU (a) may form a PCell using CC4, and may form SCells extended from the PCell of CC4 using CC2 and CC3. Meanwhile, DU (b) may form a PCell using CC1, and may form SCells extended from the PCell of CC1 using CC2 and CC3. That is, in an exemplary embodiment of cell planning shown in FIG. 27B, DU (a) and DU (b) may form SCells using the same CCs (i.e., CC2, CC3).

While moving, the UE may maintain a connection with at least one of the PCell formed by DU (a) using CC4 and the PCell formed by DU (b) using CC1. Meanwhile, whenever the UE loses the connection with the PCell, it may lose connections with SCells connected through the corresponding PCell. Whenever the UE is connected to the PCell, it may be connected to the SCells again through the corresponding PCell. Here, DU (a) and DU (b) may form SCells using the same CC2 and CC3. Accordingly, interference or collision may occur between the SCells of DU (a) and the SCells of DU (b).

To solve this problem, in an exemplary embodiment of the communication system 2750, a bandwidth part (BWP) division may be applied to the SCells of the DUs. For example, the SCells of DU (a) and the SCells of DU (b) may avoid interference or collision by operating to occupy different BWPs within the same CC.

Meanwhile, in another exemplary embodiment of the communication system 2750, a technique such as dynamic spectrum sharing (DSS), which is a control region design mechanism for jointly using a data region by different management entities, may be applied. The SCells of DU (a) and the SCells of DU (b) may avoid interference or collision by sharing a data region based on DSS.

According to the exemplary embodiments of the cell operation method and apparatus, in the communication system, a plurality of PCells may be configured simultaneously for one UE, and a plurality of control plane (CP) interfaces may be configured between a core network (CN) and a radio access network (RAN). The communication system may support joint operations of the plurality of configured PCells and the plurality of CP interfaces. Such the joint operations may be implemented in a CN-based, RAN-based, or dual connectivity (DC)-based manner. The plurality of PCells configured for one UE can efficiently support switching, distribution, and duplication of packets between the UE and the network. Accordingly, the reliability of the connection between the UE and the network can be improved, the reliability of data can be improved, and problems such as a decrease in data transmission rate and data delay can be minimized.

However, the effects that can be achieved by the cell operation method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first cell in a communication system, the operation method comprising:
receiving, from a first communication node that is an upper node of the first cell, a first signal including second cell configuration information of a second cell connected with the first communication node and a second communication node that is a lower node of the first cell;
identifying, based on the first signal, that the first cell and the second cell are jointly operated by the first communication node as coordinative primary cells (PCells);
transmitting, to the second communication node, a second signal including information on joint operations of the coordinative PCells by the first communication node; and
performing communication with the first communication node and the second communication node based on the joint operations of the coordinative PCells,
wherein when the joint operations of the coordinative PCells are performed, a first control plane (CP) interface is configured between the first communication node and the first cell, and a second CP interface is configured between the first communication node and the second cell.

2. The operation method according to claim 1, wherein the performing of the communication comprises:
receiving, from the first communication node, a third signal requesting a report of first measurement information for the first cell; and
reporting the first measurement information to the first communication node,
wherein the first measurement information is used by the first communication node to determine at least one of packet switching, packet distribution, or packet duplication based on the joint operations of the coordinative PCells.

3. The operation method according to claim 1, wherein the performing of the communication comprises:
receiving, from the first communication node, a fourth signal including information on a packet switching procedure based on the joint operations of the coordinative PCells;
performing a forwarding operation of transmitting remaining packets of the first cell to the first communication node based on the packet switching procedure; and
when the forwarding operation ends, transmitting, to the first communication node, a fifth signal indicating that the forwarding operation ends, wherein after transmitting the fifth signal to the first communication node, a first downlink (DL) packet for the first cell and a first uplink (UL) packet for the first cell are transmitted and received between the first communication node and the second communication node through the second cell.

4. The operation method according to claim 1, wherein the performing of the communication comprises:
receiving, from the first communication node, a sixth signal including information on a first packet distribution procedure based on the joint operations of the coordinative PCells;
receiving, from the first communication node, a first DL packet group among DL packets for the first cell based on the first packet distribution procedure;
transmitting the received first DL packet group to the second communication node;
receiving, from the second communication node, a first UL packet group among UL packets for the first cell; and
transmitting the received first UL packet group to the first communication node,
wherein a second DL packet group excluding the first DL packet group among the DL packets for the first cell and a second UL packet group excluding the first UL packet group among the UL packets for the first cell are transmitted and received between the first communication node and the second communication node through the second cell.

5. The operation method according to claim 1, wherein the performing of the communication comprises:
receiving, from the first communication node, a seventh signal including information on a second packet distribution procedure based on the joint operations of the coordinative PCells;
monitoring whether a first forwarding condition for the second packet distribution procedure is satisfied; and
when the first forwarding condition is satisfied, performing a forwarding operation of transmitting remaining packets of the first cell to the first communication node,
wherein information of the first forwarding condition is included in the information on the second packet distribution procedure, and includes at least one reference value related to packet accumulation.

6. The operation method according to claim 1, wherein the performing of the communication comprises:
receiving, from the first communication node, an eighth signal including information on a packet duplication procedure based on the joint operations of the coordinative PCells;
receiving, from the first communication node, a second DL packet for the first cell based on the packet duplication procedure;
transmitting the received second DL packet to the second communication node;
receiving, from the second communication node, a second UL packet for the first cell; and
transmitting the received second UL packet to the first communication node,
wherein the second DL packet and the second UL packet are transmitted and received between the first communication node and the second communication node also through the second cell as well as through the first cell.

7. The operation method according to claim 1, wherein the performing of the communication comprises:
receiving a ninth signal indicating that the second cell is released from a PCell;

based on the ninth signal, releasing the joint operations of the coordinative PCells; and
performing communication with the first communication node and the second communication node as a single PCell.

8. The operation method according to claim 1, wherein the transmitting of the second signal comprises:
receiving, from the first communication node, a tenth signal to be transmitted to the second communication node; and
transmitting the tenth signal to the first communication node,
wherein the tenth signal includes at least part of the second cell configuration information, and based on the tenth signal, the second communication node identifies that the first cell and the second cell are jointly operated by the first communication node as the coordinative PCells.

9. An operation method of a first cell in a communication system, the operation method comprising:
receiving, from a first communication node that is an upper node of the first cell, a first signal indicating that a second cell connected with the first communication node and a second communication node that is a lower node of the first cell operates as one of coordinative primary cells (PCells) together with the first cell;
transmitting, to the first communication node and based on the received first signal, a second signal requesting to configure the first cell as an authority cell having authority for joint operations of the coordinative PCells;
transmitting, to the second communication node, a third signal including information on the joint operations of the coordinative PCells by the first cell; and
performing communication with the first communication node and the second communication node based on the joint operations of the coordinative PCells by the first cell,
wherein when the joint operations of the coordinative PCells are performed, a first control plane (CP) interface is configured between the first communication node and the first cell, and a second CP interface is configured between the first communication node and the second cell.

10. The operation method according to claim 9, wherein the performing of the communication comprises:
transmitting, to the first communication node, a fourth signal including information on a packet switching procedure based on the joint operations of the coordinative PCells;
performing a forwarding operation of transmitting remaining packets of the first cell to the first communication node based on the packet switching procedure; and
when the forwarding operation ends, transmitting, to the first communication node, a fifth signal indicating that the forwarding operation ends,
wherein after transmitting the fifth signal to the first communication node, a first downlink (DL) packet for the first cell and a first uplink (UL) packet for the first cell are transmitted and received between the first communication node and the second communication node through the second cell.

11. The operation method according to claim 9, wherein the performing of the communication comprises:
- transmitting, to the first communication node, a sixth signal including information on a first packet distribution procedure based on the joint operation for the coordinative PCell;
- receiving, from the first communication node, a first DL packet group among DL packets for the first cell based on the first packet distribution procedure;
- transmitting the received first DL packet group to the second communication node;
- receiving, from the second communication node, a first UL packet group among UL packets for the first cell; and
- transmitting the received first UL packet group to the first communication node,
- wherein a second DL packet group excluding the first DL packet group among the DL packets for the first cell and a second UL packet group excluding the first UL packet group among the UL packets for the first cell are transmitted and received between the first communication node and the second communication node through the second cell.

12. The operation method according to claim 9, wherein the performing of the communication comprises:
- transmitting, to the first communication node, a seventh signal including information on a second packet distribution procedure based on the joint operations of the coordinative PCells;
- monitoring whether a first forwarding condition for the second packet distribution procedure is satisfied; and
- when the first forwarding condition is satisfied, performing a forwarding operation of transmitting remaining packets of the first cell to the first communication node,
- wherein information of the first forwarding condition is included in the information on the second packet distribution procedure, and includes at least one reference value related to packet accumulation.

13. The operation method according to claim 9, wherein the performing of the communication comprises:
- transmitting, to the first communication node, an eighth signal including information on a packet duplication procedure based on the joint operations of the coordinative PCells;
- receiving, from the first communication node, a second DL packet for the first cell based on the packet duplication procedure;
- transmitting the received second DL packet to the second communication node;
- receiving, from the second communication node, a second UL packet for the first cell; and
- transmitting the received second UL packet to the first communication node,
- wherein the second DL packet and the second UL packet are transmitted and received between the first communication node and the second communication node also through the second cell as well as through the first cell.

14. The operation method according to claim 9, wherein the performing of the communication comprises:
- transmitting, to the first communication node, a ninth signal requesting to change the authority cell from the first cell to the second cell; and
- performing communication with the first communication node and the second communication node based on the joint operations of the coordinative PCells by the second cell.

15. An operation method of a first cell in a communication system, the operation method comprising:
- performing a first signaling procedure for transitioning a second cell, which is a primary secondary cell (PSCell) connected with a first communication node and a second communication node, to a primary cell (PCell), the first communication node being an upper node of the first cell and the second communication node being a lower node of the first cell;
- identifying, based on a result of the first signaling procedure, that the first cell and the second cell are jointly operated as coordinative PCells;
- transmitting, to the second communication node, a first signal including information on joint operations of the coordinative PCells; and
- performing communication with the first communication node and the second communication node based on the joint operations of the coordinative PCells,
- wherein when the joint operations of the coordinative PCells are performed, a first control plane (CP) interface is configured between the first communication node and the first cell, and a second CP interface is configured between the first communication node and the second cell.

16. The operation method according to claim 15, wherein the performing of the first signaling procedure comprises:
- transmitting, to the second cell, a second signal including at least part of first cell configuration information for the first cell;
- receiving, from the second cell, a first response including at least part of second cell configuration information for the second cell;
- transmitting, to the first communication node, a third signal including at least part of information included in the received first response; and
- receiving, from the first communication node, a second response to the third signal.

17. The operation method according to claim 15, wherein when the joint operations of the coordinative PCells are performed:
- a first user plane (UP) interface and a second UP interface for a first path and a second path based on the first cell, and a third UP interface for a third path based on the second cell are configured between the first communication node and the first cell;
- a fourth UP interface and a fifth UP interface for a fourth path and a fifth path based on the second cell, and a sixth UP interface for a sixth path based on the first cell are configured between the first communication node and the second cell; and
- a seventh UP interface for the second path and an eighth UP interface for the fifth path are configured between the first communication node and the second cell.

18. The operation method according to claim 15, wherein the performing of the communication comprises:
- transmitting, to the first communication node, a fourth signal including information on a packet switching procedure based on the joint operations of the coordinative PCells;
- performing a forwarding operation of transmitting remaining packets of the first cell to the first communication node based on the packet switching procedure; and
- when the forwarding operation ends, transmitting, to the first communication node, a fifth signal indicating that the forwarding operation ends, wherein after transmitting the fifth signal to the first communication node, a first downlink (DL) packet for the first cell and a first uplink (UL) packet for the first cell are transmitted and received between the first communication node and the second communication node through the second cell.

19. The operation method according to claim 15, wherein the performing of the communication comprises:
    transmitting, to the first communication node, a sixth signal including information on a first packet distribution procedure based on the joint operations of the coordinative PCells;
    receiving, from the first communication node, a first DL packet group among DL packets for the first cell based on the first packet distribution procedure;
    transmitting the received first DL packet group to the second communication node;
    receiving, from the second communication node, a first UL packet group among UL packets for the first cell; and
    transmitting the received first UL packet group to the first communication node,
    wherein a second DL packet group excluding the first DL packet group among the DL packets for the first cell and a second UL packet group excluding the first UL packet group among the UL packets for the first cell are transmitted and received between the first communication node and the second communication node through the second cell.

20. The operation method according to claim 15, wherein the performing of the communication comprises:
    transmitting, to the first communication node, an eighth signal including information on a packet duplication procedure based on the joint operations of the coordinative PCells;
    receiving, from the first communication node, a second DL packet for the first cell based on the packet duplication procedure;
    transmitting the received second DL packet to the second communication node;
    receiving, from the second communication node, a second UL packet for the first cell; and
    transmitting the received second UL packet to the first communication node,
    wherein the second DL packet and the second UL packet are transmitted and received between the first communication node and the second communication node also through the second cell as well as through the first cell.

* * * * *